(12) United States Patent
Lettis et al.

(10) Patent No.: US 10,661,714 B2
(45) Date of Patent: May 26, 2020

(54) REARVIEW DEVICE WITH MOVEABLE HEAD ASSEMBLY AND METHOD

(71) Applicant: SMR Patents S.à.r.l., Luxembourg (LU)

(72) Inventors: Andrew Lettis, Donnington (GB); Graham Rehill, Chichester (GB); Callum Scott-Collins, Southsea (GB)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 15/922,366

(22) Filed: Mar. 15, 2018

(65) Prior Publication Data

US 2018/0265005 A1    Sep. 20, 2018

Related U.S. Application Data

(63) Continuation-in-part of application No. 15/800,413, filed on Nov. 1, 2017, which is a continuation-in-part of application No. 15/607,894, filed on May 30, 2017, which is a continuation-in-part of application No. 15/000,754, filed on Jan. 19, 2016, now Pat. No. 9,796,333, which is a continuation-in-part of application No. 14/022,896, filed on Sep. 10, 2013, (Continued)

(30) Foreign Application Priority Data

Jan. 24, 2012   (AU) ................................ 2012900267
Sep. 11, 2012   (DE) ......................... 10 2012 108 480
Nov. 14, 2016   (EP) ..................................... 16198759

(51) Int. Cl.
    B60R 1/072    (2006.01)
    B60R 1/12     (2006.01)
    B60R 1/08     (2006.01)
    B60R 1/074    (2006.01)

(52) U.S. Cl.
    CPC ............. *B60R 1/072* (2013.01); *B60R 1/074* (2013.01); *B60R 1/081* (2013.01); *B60R 1/1207* (2013.01); *B60R 2001/1223* (2013.01); *B60R 2001/1253* (2013.01); *B60R 2300/8026* (2013.01)

(58) Field of Classification Search
    CPC ........ B60R 1/072; B60R 1/1207; B60R 1/081
    See application file for complete search history.

(56) References Cited

U.S. PATENT DOCUMENTS

2009/0115631 A1* 5/2009 Foote .................... B60Q 1/2665
                                                                340/901
2017/0240114 A1* 8/2017 Brouwer ................. B60R 1/072
(Continued)

FOREIGN PATENT DOCUMENTS

| EP | 2253510 B1 | 1/2013 |
|---|---|---|
| EP | 2492144 B1 | 4/2014 |
| EP | 2492145 B1 | 4/2014 |

*Primary Examiner* — Eret C McNichols
(74) *Attorney, Agent, or Firm* — Jones Day

(57) ABSTRACT

A rearview device for a motor vehicle includes a moveable head assembly, an actuator assembly having a fixed part and a moveable part, the moveable part being attached to the head assembly, a motor cradle configured to attach the actuator assembly to the moveable head assembly. A method of assembling a rearview device comprises providing the rearview device and attaching the actuator assembly to the moveable head assembly using the motor cradle.

11 Claims, 41 Drawing Sheets

Related U.S. Application Data now abandoned, which is a continuation-in-part of application No. 15/439,188, filed on Feb. 22, 2017, which is a continuation-in-part of application No. 14/936,024, filed on Nov. 9, 2015, now Pat. No. 9,656,601, which is a continuation-in-part of application No. 14/374,376, filed as application No. PCT/AU2013/000047 on Jan. 24, 2013, now Pat. No. 9,181,616, which is a continuation-in-part of application No. 15/603,751, filed on May 24, 2017.

(56) References Cited

U.S. PATENT DOCUMENTS

2017/0282805 A1* 10/2017 Sugimura ............... B60R 1/072
2017/0361773 A1* 12/2017 van Stiphout .......... B60R 1/072

* cited by examiner

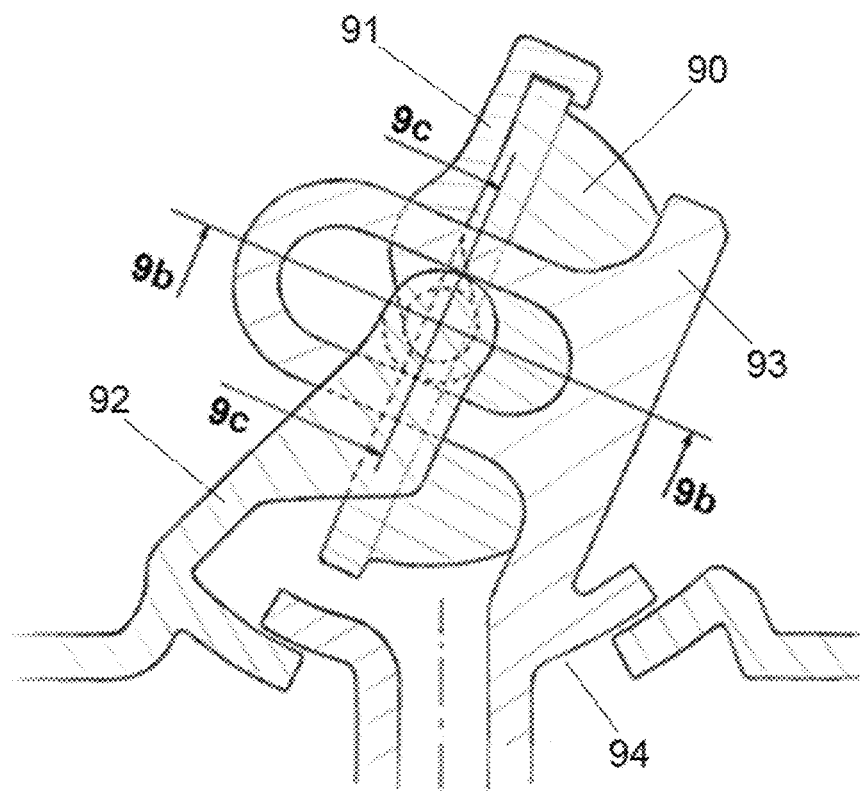
Fig. 34A
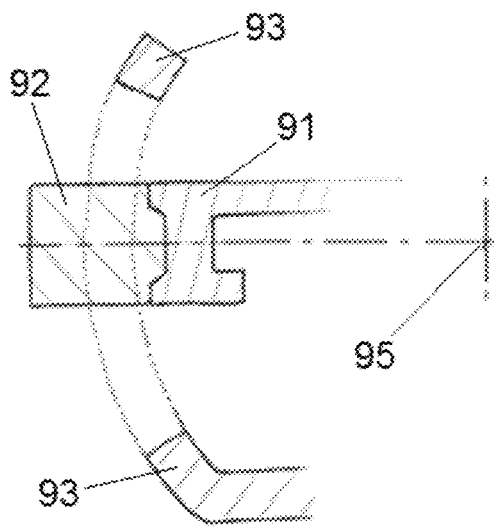 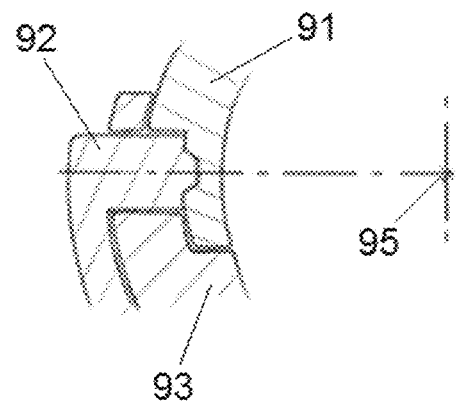
Fig. 34B          Fig. 34C

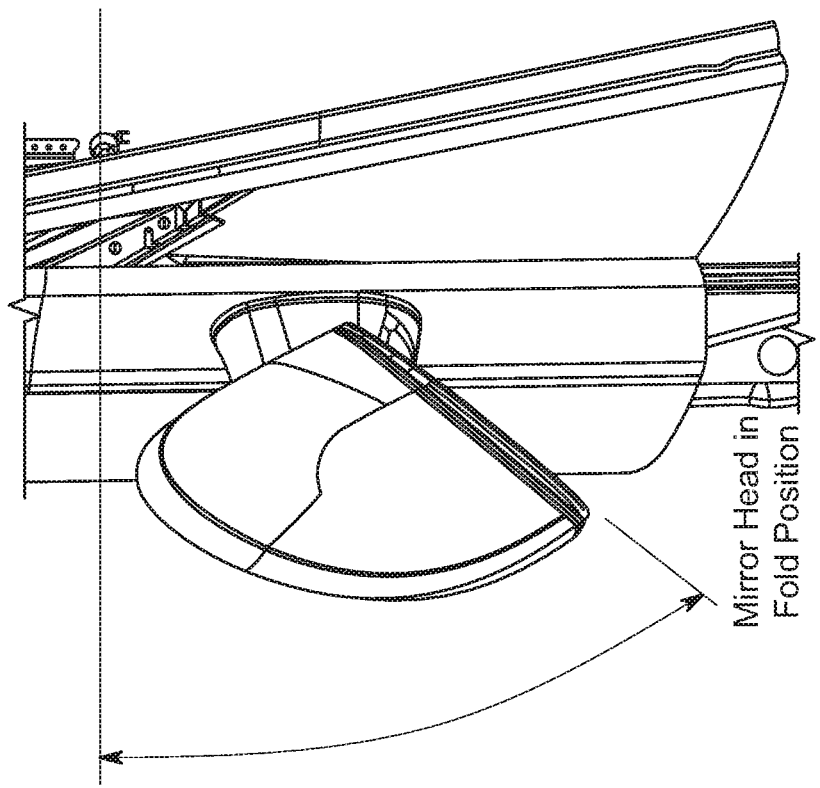
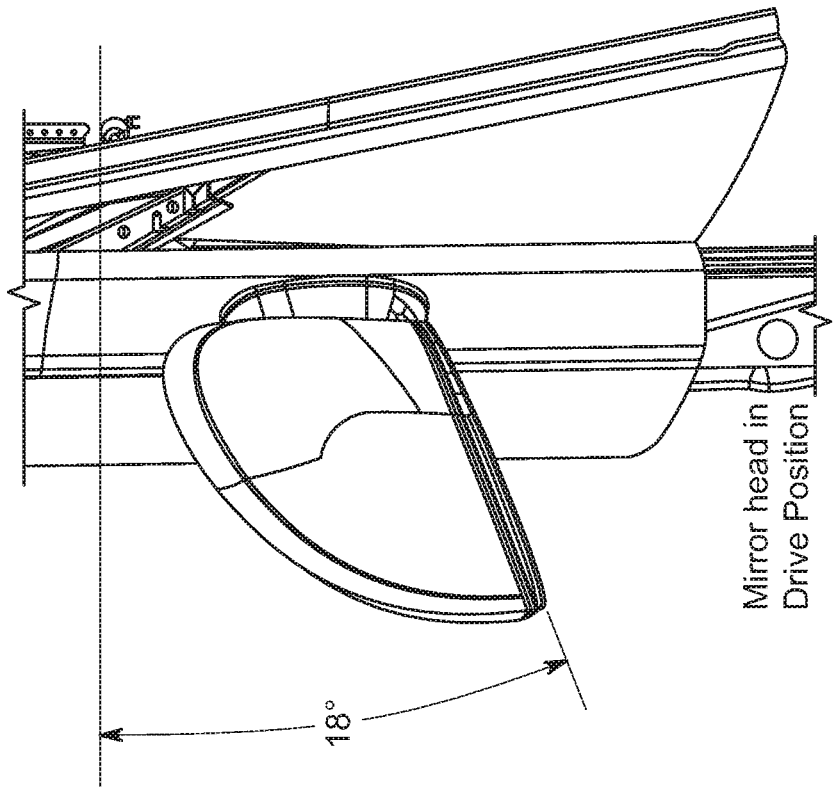
FIG. 37

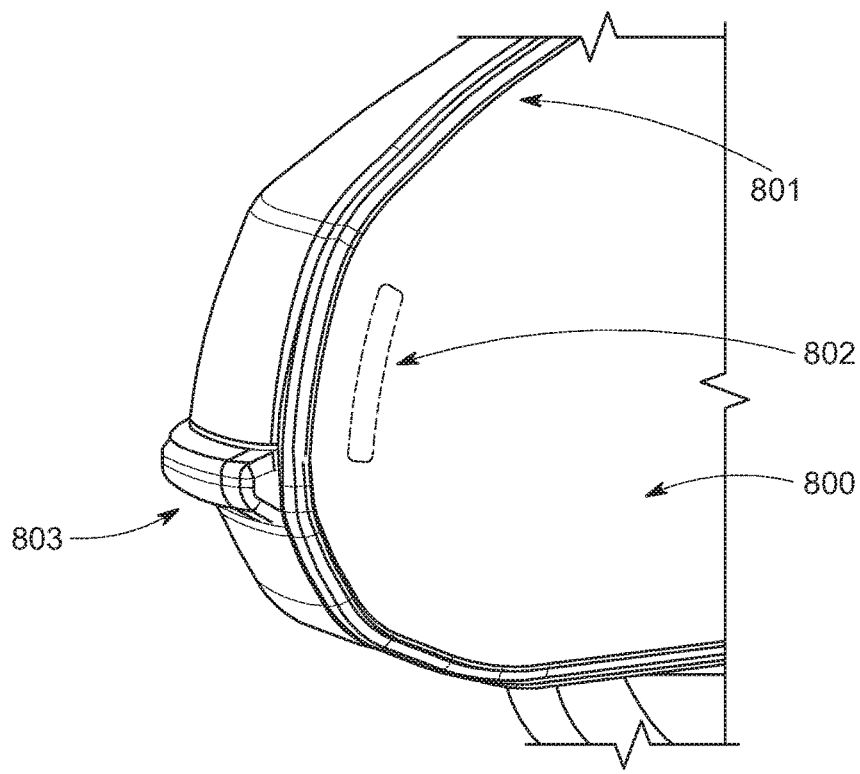
FIG. 38A
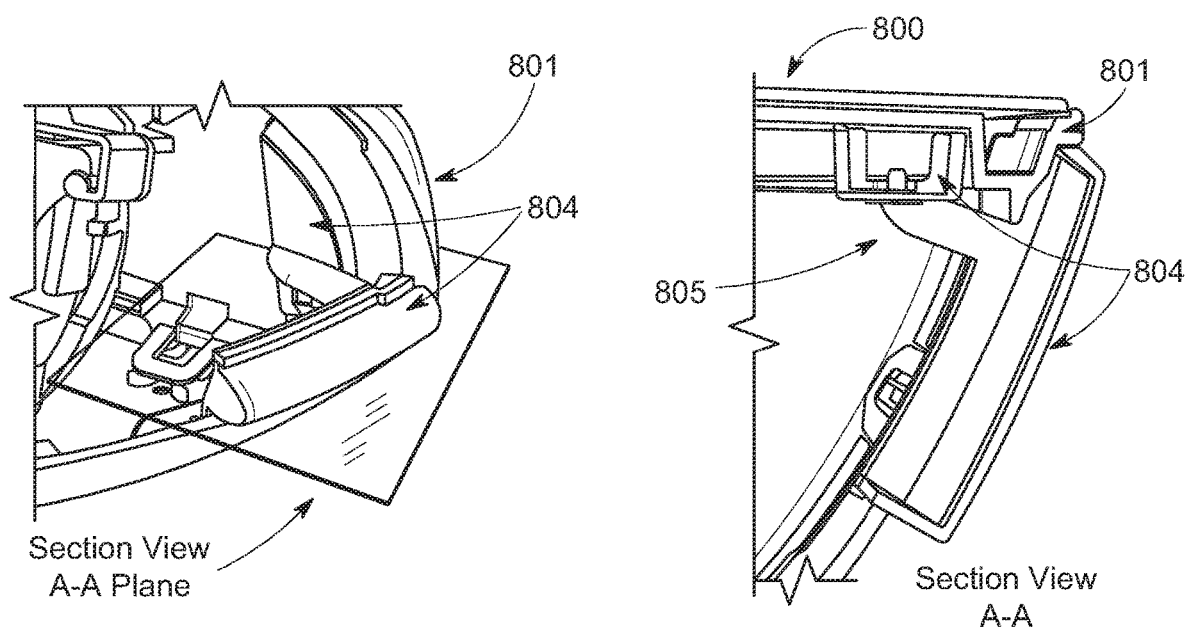
FIG. 38B
FIG. 38C

REARVIEW DEVICE WITH MOVEABLE HEAD ASSEMBLY AND METHOD

CROSS-REFERENCE TO RELATED APPLICATIONS

This application is a continuation-in-part of U.S. patent application Ser. No. 15/800,413, filed Nov. 1, 2017, which is a continuation-in-part of U.S. patent application Ser. No. 15/603,751, filed May 24, 2017, which claims the benefit of foreign priority to European Patent Application No. 16198759.9, filed Nov. 14, 2016, and is a continuation-in-part of U.S. patent application Ser. No. 15/607,894, filed May 30, 2017, which is a continuation-in-part of U.S. patent application Ser. No. 15/000,754, filed Jan. 19, 2016, which is a continuation-in-part of U.S. patent application Ser. No. 14/022,896, filed Sep. 10, 2013, which claims the benefit of foreign priority to German Patent Application No. 102012108480.7, filed Sep. 11, 2012, and is a continuation-in-part of U.S. patent application Ser. No. 15/439,188, filed Feb. 22, 2017, which is a continuation-in-part of U.S. patent application Ser. No. 14/936,024, filed Nov. 9, 2015, which is a continuation-in-part of U.S. patent application Ser. No. 14/374,376, filed Jul. 24, 2014 and now issued as U.S. Pat. No. 9,181,616, which is a national stage entry of International Patent Application No. PCT/AU2013/000047, filed Jan. 24, 2013, which claims the benefit of foreign priority to Australian Patent Application No. 2012900267, filed Jan. 24, 2012, and claims the benefit of foreign priority to European Patent Application No. 16198759.9, filed Nov. 14, 2016, each of which is hereby incorporated by reference in its entirety for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND

1. Field

The following description relates to a head section for a rear view device for a motor vehicle. For example, the head section has casing means comprising at least one housing section and a lid section arranged on a side of the housing section which faces away from a driving direction of the motor vehicle, at least one electronic unit arranged in a hollow area formed between the housing section and the lid section, a first rear view means for displaying a first side or rear area of the motor vehicle in relation to the driving direction, and a second rear view means for displaying a second side or rear area of the motor vehicle in relation to the driving direction. The rear view device may include a fixed base assembly provided for arrangement on the motor vehicle and a moveable head assembly attached to the base assembly via an articulation assembly, the articulation assembly may have a fixed part rigidly attached to the fixed base assembly and a moveable part rigidly attached to the moveable head assembly, and the articulation assembly may include two articulation axes, the direction vectors of the articulation axes being independent of each other.

2. Description of Related Art

Mirrors or rear view means, such as those including a camera pod, are typically exposed to the outside environment when used as a side view mirror secured to the outside of a vehicle and when used inside a vehicle as an internal rear view mirror. Rear view means are typically made up of many components which require a number of different assembly parts and are complicated and expensive to manufacture. In addition, when exposed to the outside environment, rear view means are subject to dirt or debris entering within the assembly. In addition, while a rear view means may include improved protection from the outside environment such rear view means fail to provide a full and expansive field of view including a wide angle view as may be desired by a driver for viewing the driver's blind spot.

European Patent No. 2 492 145 B1 describes an external rear view mirror with a mirror head and a mirror base, which are covered with at least one body element in the form of a body frame, a body cap and a mirror base cover, and a mirror glass that is installed rigidly relative to the mirror head. The mirror head rests on the mirror base, the body cover of the mirror head is composed of multiple pieces of the body frame and the body cap, and the mirror base is equipped with a mirror base cover, where the body cap has an opening designed for the passage of the mirror base and the mirror base cover. The mirror base is rigidly connected to a mirror carrier that carries an electrical glass adjustment drive, where the glass adjustment drive is connected to at least one body element.

Another external rear view mirror assembly for a motor vehicle includes a mirror base or foot provided for arrangement on the motor vehicle and a mirror head arranged on the mirror foot as well as a mirror glass accommodated in the mirror head and arranged rigidly and fixed non adjustably with respect thereto. Such an external rear view mirror is described in European Patent No. 2 492 144 B1. At least one articulation is provided between the mirror head and the arrangement of the mirror foot on the motor vehicle. The articulation includes a total of two articulation axes, and the direction vectors of the articulation axes are independent of each other. The two articulation axes are associated, jointly and/or independently of each other for swiveling the mirror head from an operating position to a swung-in position and vice versa. The articulation axes are also for swinging-in the mirror head in and against the direction of motion, adjusting an individual adjusting position of the mirror glass by adjusting the mirror head depending on, e.g., the seating position and the height of a driver of the motor vehicle. The mirror has a first adjusting drive driven by an electric motor and associated to a first articulation axis of the two articulation axes and a second adjusting drive driven by an electric motor and associated to a second articulation axis of the two articulation axes.

European Patent No. 2 253 510 B1 describes a rearview assembly with a mirror frame, mirror base, mirror housing, mirror glass, and glass actuator assembly. Specifically, it describes a method of improving the connection between components of the rearview assembly by using additional connection means to support a rigid fixture of the bezel at the mirror frame.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, a compact and easy to manufacture head section for a rear view device is provided. This is provided in that the second rear view means is arranged on the lid section, with the lid section and the second rear view means including a combined, single-piece component, and the lid section includes a polymeric substrate, which is coated with a chromium-based reflective coating in the region of the combined, single-piece component for providing the second rear view means in form of a reflective element.

In an aspect, A head section for a rear view device for a motor vehicle includes a casing means including at least one housing section and a lid section arranged on a side of the housing section which faces away from a driving direction of the motor vehicle, at least one electronic unit arranged in a hollow area formed between the housing section and the lid section, a first rear view means for displaying a first side or rear area of the motor vehicle in relation to the driving direction, and a second rear view means for displaying a second side or rear area of the motor vehicle in relation to the driving direction, where the second rear view means is arranged on the lid section, with the lid section and the second rear view means forming a combined, single-piece component, and where the lid section includes a polymeric substrate, which is coated with a chromium-based reflective coating in the region of the combined, single-piece component for providing the second rear view means where the second rear view means is a reflective element.

The lid section may include a bezel section in addition to the coated, combined, single-piece component providing a second rear view means section.

The polymeric substrate may also be coated in the bezel section.

The coating in the bezel section may include a chromium-based reflective coating.

The coating in the bezel section may differ from the coating in the second rear view means section with respect to at least one of color and reflectivity.

The housing section and the lid section may seal the hollow area of the head section from an outside environment over an entire circumference of the hollow area, or the housing section, the lid section and the first rear view means may seal the hollow area of the head section from an outside environment over an entire circumference of the hollow area.

The at least one electronic unit may be arranged without housing in the hollow area.

The housing section and the lid section may be capable of being locked relative to each other at a coupling portion in such a manner that they overlap each other.

The housing section and the lid section may form an undercut.

The first rear view means may be capable of being locked relative to the housing section.

The housing section may include at least one light window, where the electronic unit has a lighting unit arranged in the hollow area and comprises at least one printed circuit board and at least one lamp suited for emitting light through the light window.

The housing section may include a first housing part and a second housing part, and where the first housing part is a plastic part which is immediately adjacent to the hollow area and has a coloring which is essentially opaque or non-translucent, and where the first housing part comprises an opening in the area of the light window.

The second housing part of the housing section may be a plastic part that is arranged in such a manner that the second housing part lies on a surface of the first housing part which faces away from the hollow area, and is essentially translucent or transparent in the area of the light window.

The first rear view means may be provided with a recess and the second rear view mean extends into said recess.

The recess may be provided at the end of the first rear view means facing away from the motor vehicle.

The recess may be a triangle with smoothened edges.

The lid section may further include a first rear view means section for supporting the first rear view means.

The surface of the first rear view means section may be at least one of flat, curved and convex shaped.

The surface of the second rear view means section may be at least one of flat, curved and convex shaped.

The first rear view means may include at least one of a coating, a chromium-based reflective coating, a reflective element, a display means, a screen, an LED screen and an LCD screen.

The curvature of the surface of the first rear view means section may differ from the curvature of the surface of the second rear view means section.

At least one of the first rear view means section and the second rear view means section may be inclined.

The lid section may further include a step between the second rear view means section and at least one of the bezel section and the first rear view means section.

The reflective surface of the first and the second review means may be arranged in one plane.

The lid section may further include a first groove between the bezel section and at least one of the first rear view means section and the second rear view means section.

The lid section may further include a first groove between the bezel section and at least one of the first rear view means section and the second rear view means section.

The lid section may further include a second groove or a rim between the first rear view means section and the second rear view means section.

The lid section may be uncoated in the region of at least one of the first groove and the second groove.

The second rear view means may be a spotter mirror providing a wider field of view than the first rear view means.

The first rear view means may be configured to be moved at least one of relative to the second rear view means and independent from the second rear view means.

The second rear view means may be or is tilted with respect to at least one axis.

The tilting angle may lie in the region from −30° to 45°.

The lid section may provide a multi-function backing plate including the second rear view means section and a first rear view means section.

The first rear view means section may include a recess for receiving the first rear view means, and the second rear view means section is thicker than the second rear view means section.

The multi-function backing plate may include a shoulder being provided between the first and the second rear view means section.

The coating may include an alloy of chromium and a dopant material, the dopant material being selected from the hexagonally close-packed transition metals, the alloy having a crystal structure of a primary body-centered cubic phase in coexistence with a secondary omega hexagonally close-packed phase.

The alloy may be a binary alloy of chromium and the dopant material.

The atomic percentage of the dopant material in the binary alloy may be in the range of from about 1.9 at. % to about 5.8 at. %.

The dopant material may be selected from the hexagonally close-packed transition metals zirconium, titanium, cobalt, hafnium, rubidium, yttrium and osmium.

The dopant material may be selected from the hexagonally close-packed transition metals zirconium, titanium, cobalt, hafnium, rubidium, yttrium and osmium.

The alloy may be a binary alloy and the dopant material is zirconium, and wherein the atomic percentage of the zirconium in the binary alloy is in the range of from about 4.5 at. % to about 5.8 at. %.

The alloy may be a binary alloy and the dopant material may be titanium, and wherein the atomic percentage of the titanium in the binary alloy may be in the range of from about 1.9 at. % to about 5.8 at. %.

The alloy may be a binary alloy and the dopant material may be cobalt, and wherein the atomic percentage of the cobalt in the binary alloy may be in the range of from about 1.9 at. % to 5.7 at. %.

The coating may have a thickness of at least one of 200 nm or less, 100 nm or less, in the range of from 40 nm to 80 nm, in the range of from 50 nm to 70 nm, and about 60 nm.

The second rear view means section may be elevated with respect to and overlapping with the first rear view means section.

The head section may further include an inclined shoulder that is provided between the first and second rear view means sections such that the second rear view means section is elevated with respect to and overlapping with the first rear view means.

The head section may further include an inclined shoulder that is provided between the first and second rear view means sections such that the first rear view means section is elevated with respect to and overlapping with the second rear view means section.

The head section may further include a transition surface disposed between the first and second rear view means and oriented toward the driver of the motor vehicle, and a blind spot indicator fixedly secured to the transition surface and oriented toward the driver of the motor vehicle to provide indication to the driver when an object is detected in the blind spot of the motor vehicle by said blind spot indicator emitting light toward the driver of the motor vehicle.

The transition surface may have a first edge contiguous with the first rear view means and a second edge contiguous with the second rear view means.

The first rear view means surface, the second rear view surface and the transition surface may be integrally formed by the lid section.

The transition surface may form at least one of a discrete step, a rim and a discontinuity between the first and second rear view means sections.

At least a portion of the transition surface may be at least one of transparent and semitransparent.

The blind spot indicator may include at least one of a light source located behind the transition surface and an indicator displayable on the transition surface, the indicator illuminated by the light source when an object is detected in the blind spot of the motor vehicle.

The head section may further include a symbol located on either the first or second rear view means surfaces for identifying the indicator displayable on the transition surface as a blind spot indicator.

The surface of the first rear view means may have a minimum radius of curvature of 600 mm.

The surface of the second rear view means may have a radius of curvature in the range 200-500 mm.

The at least one of the first or second rear view means surfaces may be flat.

A rear view device for a motor vehicle may include the head section.

In another aspect, a housing section and the lid section tightly seal the hollow area towards the outside over at least almost the entire circumference. Due to the fact that the hollow area is surrounded at least almost over its entire circumference towards the outside, the hollow area is protected against penetration by dirt and humidity. This makes it possible to arrange the at least one electronic unit in the hollow area without its own seal. This makes it possible to create a compact design for the head section.

In general, it is feasible to provide the electronic unit with its own housing, with which it can be arranged in the hollow area between the housing section and the lid section. However, it has been shown to be advantageous when the at least one electronic unit can be arranged or is arranged without housing in the hollow area.

The housing section and the lid section can in general be connected to each other in any manner required. With one embodiment of the head section according to the invention, it is provided that the housing section and the lid section can be locked or are locked relative to each other at a coupling portion in such a manner that they overlap each other, and in particular form an undercut. When the lid section and the housing section form an undercut, it is easily possible to achieve a fixed connection of the two components. In particular, in such cases, the housing section and the lid section can be locked to each other without using tools, e.g. by means of clips.

In general, it is feasible to create the coupling portion only in sections. Preferably, the coupling portion is designed to surround the circumference.

It is feasible to make the rear view means relatively mobile in relation to the housing section. This can be the case, for example, when the lid section and/or the housing section is created at least in sections from a flexible, pliable material, such as a plastic membrane. However, it has been shown to be advantageous when the rear view means is locked relative to the housing section. In such cases, the rear view means can be set by adjusting the head section.

The rear view means can comprise a component which can be separated or is separated from the lid section. In such cases, the lid section can for example be adhered, or locked for example by spraying a reflective coating on the lid section. In one embodiment of the head section according to the invention, it is provided, however, that the lid section and the rear view means comprise a single-piece component.

This makes it possible to reduce the number of components of the head section.

In general, it is feasible to create the lid section in a disc form. However, it has been shown to be advantageous when the lid section is designed as a type of clamp, and comprises a flat portion, which in particular comprises the rear view means, and at least one edge portion which extends transverse or diagonally to the flat portion. In such cases, the lid section can be locked to the housing section like a clamp with the at least one edge section. The edge section can here be adjacent to the housing section from the inside, or grips the housing section from the outside.

The housing section and the lid section can be created from any material required. When the lid section and the rear view means include a combined single-piece component, i.e. when the rear view means is part of the lid section, it has been shown to be advantageous when the lid section comprises a multiple-part component, where the flat portion includes a first lid part, in particular a plastic part, and the edge portion comprises a second lid part, in particular a plastic part.

In general, it is feasible that the multiple-part component includes a dual-part plastic section. When the lid section has several functions, however, further plastic parts can be provided.

Due to the fact that the edge section can include another plastic part, such as the flat portion, the edge section can be designed to form a tight seal. The electronic unit can include a lighting unit for example. The light from the head section generated by the lamp can penetrate outwards through the light window. In such cases, the electronic unit can comprise a repeatedly flashing light or lighting for the area immediately surrounding a motor vehicle.

With one embodiment of the head section according to the invention, it is provided that the housing section includes a first housing part, in particular a plastic part, which lies directly on the hollow area and which has a coloring which is in particular essentially opaque and/or non-translucent, wherein the first housing part comprises an opening in the area of the light window. Due to the fact that the first housing component is opaque and non-translucent, an attractive appearance can be achieved. Due to the fact that an opening is provided in the first housing part, the light from the electronic unit can penetrate outwards.

In order to prevent penetration by dirt or humidity, with a further development of the latter inventive embodiment, it is provided that an optical element, such as an optical fiber and/or light disc, can be arranged in the and/or on the opening of the first housing part of the housing section and that a housing seal can be arranged or is arranged between the first housing part of the housing section and the optical element. Due to the provision of the housing seal between the optical element and the opening of the housing section, the hollow area is tightly sealed towards the outside. As a result, no separate housing is required for the electronic unit.

As a supplement or an alternative to the provision of a housing seal, it has been shown to be advantageous when a second housing part, in particular a plastic part, is arranged in such a manner that it lies on a surface of the first housing part which faces away from the hollow area, and is essentially translucent and/or transparent at least in the area of the light window. In particular, in the area of the light window is designed as an optical element such as an optical fiber and/or light disc.

Due to the fact that a second housing part is adjacent to the first housing part, which in particular covers the opening provided in the first housing part towards the outside, no housing seal is required. Due to the fact that the second housing part is translucent and/or transparent, light from the electronic unit which is designed as a lighting unit can penetrate outwards from the hollow area of the head section.

The rear view means can comprise a reflective means and/or a display means such as a screen, in particular an LED or LCD screen. When the display means comprises a screen, the screen can be arranged on the flat portion of the lid section. It is furthermore feasible that the lid section, at least in the portion on which the LED or LCD screen is arranged, is arranged in a transparent and/or translucent manner, and the screen is arranged on the side of the flat portion of the lid section which faces towards the hollow area.

The electronic unit may include a setting facility for the rear view device. This makes it possible to set the rear view device in a simple manner. The setting facility can be arranged on the upper surface of the flat portion of the lid section which faces towards the hollow area.

It has been shown to be advantageous when the setting facility comprises a setting unit with at least one lighting means which can be locked or is locked relative to a rear view means, and by means of which a directable or directed light beam can be emitted, which is at least almost solely perceivable in a specified operating position by a driver of a motor vehicle and/or a control unit.

The lighting means may include a coiled wire bulb, an LED or a laser.

Due to the fact that the light beam can be detected at least almost solely in the specified operating position by a driver of a motor vehicle and/or by a control unit, the rear view means is easy to adjust in a position which conforms to the regulations.

In order to enable light to exit, it is advantageous when the housing section and/or the lid section, in particular the edge portion, includes a transparent and/or translucent area through which the light beam emitted by the lighting means can penetrate outwards at least almost unimpeded.

This makes it possible for light which is emitted by the lighting means to penetrate outwards from inside the rear view device and to be perceivable from the outside, where in the hollow area of the housing, it is at the same time protected against environmental influences.

The transparent and/or translucent area can in general be designed in any manner required. It is advantageous when the transparent and/or translucent area comprises a recess, in particular throughout, and/or a translucent and/or transparent material such as glass, in particular smoked glass, or plastic.

In general, it is feasible that the light beam emitted from the lighting means is sufficiently bundled in order to be perceivable almost solely in the specified operating position by the driver of a motor vehicle and/or the control unit. Furthermore, it has been shown to be advantageous when the setting unit comprises at least one optical element which can be functionally assigned or is assigned to the lighting means, with which the light beam emitted by the lighting means can at least be bundled.

Furthermore, the object is attained by means of a rear view device, such as an internal or external mirror for a motor vehicle with at least one head section, in particular with at least one of the features described above.

Finally, the object is attained by means of a motor vehicle with at least one rear view device with at least one of the features described above and/or with at least one head section, in particular with at least one of the features described above.

The head section according to the invention, the rear view device according to the invention and the motor vehicle according to the invention have been shown to be advantageous in many respects.

Due to the fact that the lid section and the housing section surround a hollow area in an almost entirely sealing manner, electronic devices can be provided in the hollow area which require no housing. As a result, the head section and the rear view device can be compact in design.

In an aspect, an external rear view device for a motor vehicle includes a fixed base assembly provided for arrangement on the motor vehicle, a moveable head assembly attached to the base assembly, an articulation assembly, the articulation assembly including a fixed part attached to the fixed base assembly and a moveable part attached to the head assembly, and a camera unit immovably secured within at least one of the fixed base assembly or the moveable head assembly, where the articulation assembly includes two articulation axes, the direction vectors of the articulation axes being independent of each other.

The base assembly may further include a foot providing a spherical seat for a lower casing element of the head assembly, and frame means providing at least one spherical seat for the casing, with the frame means being attached to the fixed part.

The external rear view device may further include a camera connector which is positioned in a non-moving area of the fixed base assembly and receives the camera unit.

The external rear view device may further include a camera connector which is positioned in a non-moving area of the moveable head assembly and receives the camera unit.

The external rear view device may further include a glass element and a lens, where the camera is configured to obtain a rear view image through the glass element and obtain an image underneath the mirror through the lens.

The external rear view device may further include a lower casing element, an upper casing element, and a removable cassette bezel, wherein the removable cassette bezel comprises a lower mating portion configured to hingedly attach to the lower casing element and an upper mating portion configured to fit into the upper casing element.

The external rear view device may further include an upper cradle and a lower cradle, and the upper cradle and the lower cradle are attached to the moveable part of the articulation assembly.

The external rear view device may further include a fixed case frame, the fixed case frame comprising a hole for receiving a joint attachment between the upper cradle and the lower cradle, wherein the fixed case frame is configured to absorb downward load applied on the external rear view device to protect the articulation assembly.

The fixed case frame may include a shape corresponding to a shape of the articulation assembly so that the fixed case frame wraps around and covers a side of the articulation assembly.

The articulation assembly may be configured to adjust the rear view device between an outboard drive condition, a standard drive condition, a park condition, and positions therebetween.

In another aspect, an external rear view device for a motor vehicle includes a fixed base assembly provided for arrangement on the motor vehicle, a moveable head assembly attached to the base assembly, an articulation assembly, the articulation assembly including a fixed part attached to the fixed base assembly and a moveable part attached to the head assembly, a lower casing element. an upper casing element, and a removable cassette bezel, where the removable cassette bezel comprises a lower mating portion configured to hingedly attach to the lower casing element and an upper mating portion configured to fit into the upper casing element, and where the articulation assembly includes two articulation axes, the direction vectors of the articulation axes being independent of each other.

The external rear view device may further include a camera unit and a camera connector which is positioned in a non-moving area of the fixed base assembly and receives the camera unit.

The external rear view device may further include a camera unit and a camera connector which is positioned in a non-moving area of the moveable head assembly and receives the camera unit.

The external rear view device may further include a glass element and a lens, wherein the camera is configured to obtain a rear view image through the glass element and obtain an image underneath the mirror through the lens.

The external rear view device may further include an upper cradle and a lower cradle, and the upper cradle and the lower cradle are attached to the moveable part of the articulation assembly.

The external rear view device may further include a fixed case frame, the fixed case frame comprising a hole for receiving a joint attachment between the upper cradle and the lower cradle, wherein the fixed case frame is configured to absorb downward load applied on the external rear view device to protect the articulation assembly.

The fixed case frame may include a shape corresponding to a shape of the articulation assembly so that the fixed case frame wraps around and covers a side of the articulation assembly.

The articulation assembly may be configured to adjust the rear view device between an outboard drive condition, a standard drive condition, a park condition, and positions therebetween.

In an additional aspect, an external rear view device for a motor vehicle includes a fixed base assembly provided for arrangement on the motor vehicle, a moveable head assembly attached to the base assembly, an articulation assembly, the articulation assembly including a fixed part attached to the fixed base assembly and a moveable part attached to the head assembly, an upper cradle and a lower cradle, the upper cradle and the lower cradle being attached to the moveable part of the articulation assembly, and a fixed case frame including a hole for receiving a joint attachment between the upper cradle and the lower cradle, where the fixed case frame may be configured to absorb downward load applied on the external rear view device to protect the articulation assembly, and where the articulation assembly includes two articulation axes, the direction vectors of the articulation axes being independent of each other.

The articulation assembly may be configured to adjust the rear view device between an outboard drive condition, a standard drive condition, a park condition, and positions therebetween.

In other aspects, it is at least one object of the present invention to further develop the known external rear view device to enhance functionality and efficiency while at the same time reducing size and costs.

This object is solved by a foot of the base assembly providing a spherical seat for a casing, in particular a lower casing element, of the head assembly, and frame means providing at least one spherical seat for the casing, with the frame means being rigidly attached to the fixed part or part of the fixed part.

According to an aspect of the invention, the base assembly may include an attachment part for the attachment to the motor vehicle, with the attachment part carrying a control system for the articulation assembly, the attachment part guiding cables from the interior of the motor vehicles to the interior of the foot, or the attachment part closing the foot at its end opposite its spherical seat.

The base assembly may include a carrier part for the attachment of the fixed part of the articulation assembly or of a fixation part of the frame means, with the carrier part extending from the spherical seat of the base assembly, or the carrier part guiding the cables from inside the foot through a cable exit into the head assembly.

The carrier part may be at least partly arranged within the fixation part, or the carrier part may be attached to the fixation part by a screw or clip connection and/or by a bayonet attachment.

The frame means may include a support part supporting the fixed part of the articulation assembly, preferably by at least partly encompassing the fixed part, with the support part in particular having a ring shape, and/or by a clips or snap connection.

Preferred embodiments of the invention are characterized in that the frame means includes a first spherical seat for the lower casing element and a second spherical seat for an upper casing element of the casing. Preferably, the first and second spherical seats of the frame means are provided by extensions arranged at opposite ends of the fixation part or on the side of the support part facing away from the fixed part of the articulation means.

The first spherical seat may be provided by a first extension facing away from the fixed part of the articulation means and a second extension facing towards the moveable part of the articulation means. Preferably, the support part and the first and second extensions form a part of a ring with a cut-out providing a rim facing towards the moveable part of the articulation means.

It is preferred that the fixation means is provided with a cable exit, with the cable exit of the fixation means being aligned with the cable exit of the carrier part, the cable exit of the fixation means being arranged on the side of the fixation means facing away from the fixed part of the articulation means, or cables exiting the cable exit of the fixation means being connected to at least one camera or at least one light unit at least partly arranged within the head assembly.

The lower casing element may have a first spherical seat cooperating with the spherical seat of the foot and/or a second spherical seat cooperating with the first spherical seat of the frame means, with preferably the first and second spherical seats of the lower casing element being provided by a base part of the lower casing element.

The lower casing element preferably has an attachment part fixed to the moveable part of the articulation assembly. Preferably, the attachment part extends substantially perpendicularly to the base part of the lower casing element. The attachment part and the frame may be arranged on opposite sides of the unit provided by the fixed and the moveable parts of the articulation assembly. Preferably, the attachment part encompasses the moveable part at least partly, or preferably the attachment part and the moveable part are connected via a clip, plug and/or snap connection.

The attachment part may be provided with a part ring for partly encompassing the moveable part of the articulation assembly, with preferably the part ring being provided by a cut-out determined by the part ring provided by the support part and the first and second extensions.

The unit may be an actuator for a reflective element, in particular in form of mirror element, being attached to the attachment part.

The lower casing element may carry the upper casing element or the camera, and a bezel may be attached to the lower and upper casing elements with the bezel preferably surrounding the reflective element.

Furthermore, due to the movable mirror head and to provide a consistent field of view, a camera may be located either within the base assembly or on a fixed component within the mirror head. The location within the base provides a greater impact protection. Being positioned within the head on a fixed component, the camera is directed to view through the glass and/or to view under the mirror through a lens in the lower casing element where it is protected against environmental influences.

Attached to the lower and upper casing elements, the bezel may carry various required legal glass types and provide the final locking system to control the head assembly retention and alignment of the mirror head components. The bezel may house a number of functions or features such as lights, warnings or heating elements.

The articulation assembly may be surrounded by an additional bracket mounted to the fixed case frame and a cradle mounted to the lower casing element allowing rotational movement inboard/outboard and up/down to provide additional support. In particular, rotational downward load may be exerted on the mirror head, with a case frame ring acting as the inboard and outboard stops.

In addition, the articulation assembly may also set the mirror head to a fold park condition, i.e. the folded position of the mirror when the car is parked, utilising the full range of movement. The articulation assembly can be a single 2 axis actuator or a combination of 2 single actuators, positioned independently along the mirror rotation axis, with or without intelligences. A separate memory module may be incorporated as well.

In an aspect, a head assembly of an external rear view device, in particular in the form of a mirror head of an external rear view mirror, can be articulated inboard/outboard and up/down using an articulation means. In particular, the articulation means may be a glass actuator, around a spherical joint, with spherical seats being provided between parts moving relative to each other such that they can rotate around two articulation axes perpendicular to each other having a common joint point. This ensures the maintenance of current end user functionality while offering significant smaller mirror size, with a reduction of size up to 30%. In addition, the unique layout of the internal mechanism with its spherical seats enhances packaging and performances.

The articulation assembly may also be supported and protected for impact using the spherical seats, in particular due to the arrangement of frame means between the articulation assembly and a casing of the head assembly. Because the casing is assembled from several casing elements, one of which is secured to the moveable part of the articulation assembly, this improves the weight distribution and reduces total housing frontal area on the vehicle which in turn improves aero performance and, thus, provides a higher fuel efficiency.

The pivot system used for the rear view device of an aspect of the invention with the single pivot point for two articulation axes permits a mirror adjustment while providing dynamic mirror performance and mirror impact support.

In a further aspect, a rearview device for a vehicle includes a moveable head assembly, an actuator assembly comprising a fixed part and a moveable part, the moveable part being attached to the head assembly, and a motor cradle configured to attach the actuator assembly to the moveable head assembly.

The moveable head assembly may include a lower case and the actuator assembly is attached to the lower case of the moveable head assembly using the motor cradle.

The lower case may include one or more vertical fixation lugs, the motor cradle may include one or more cradle projections, and the one or more vertical fixation lugs may be configured to engage the one or more cradle projections in response to the motor cradle being attached to the lower case.

The motor cradle may be configured to attach to the lower case using a turn and snap connectivity.

The motor cradle may further include one or more cradle teeth and the one or more cradle teeth of the motor cradle may be configured to engage one or more corresponding gaps formed in a ring of the actuator assembly.

The rearview device may further include a cradle clamp configured to clamp the actuator assembly to the motor cradle.

The cradle clamp may include one or more clamp cams configured to be received by a space formed between the actuator assembly and the motor cradle, the one or more clamp prongs may be configured to be received by a space formed between the actuator assembly and the motor cradle, and the one or more clamp clips may be configured to clip on to corresponding features of the motor cradle.

The rearview device may further include a light module which is attached to the lower case.

The light module may include one or more tabs and one or more clips, the lower case may include one or more tab receiving portions, and the one or more tab receiving portions of the lower case may be configured to receive the one or more tabs of the light module.

The light module may be configured to lock and attach to the lower case by pressing the light module on the lower case and sliding the light module with respect to the lower case.

A method of assembling a rearview device for a vehicle includes providing a moveable head assembly, an actuator assembly including a fixed part and a moveable part, and a motor cradle. And attaching the actuator assembly to the moveable head assembly using the motor cradle.

The moveable head assembly may include a lower case, and the method may further include attaching the moveable head assembly to the lower case using the motor cradle.

The lower case may include one or more vertical fixation lugs and the motor cradle may include one or more cradle projections, and the method may further include engaging the one or more vertical fixation lugs with the one or more cradle projections to attach the motor cradle to the lower case.

The method may further include attaching the motor cradle to the lower case by turning the motor cradle and snapping the motor cradle into the lower case.

The motor cradle may further include one or more cradle teeth, and the method may further include engaging the one or more cradle teeth of the motor cradle to the one or more corresponding gaps formed in a ring of the actuator assembly to attach the actuator assembly to the motor cradle.

The method may further include providing a cradle clamp including to clamp the actuator assembly to the motor cradle.

The cradle clamp may include one or more clamp cams configured to be received by a space formed between the actuator assembly and the motor cradle, one or more clamp prongs configured to be received by a space formed between the actuator assembly and the motor cradle, and one or more clamp clips configured to clip on to corresponding features of the motor cradle.

The method may further include providing a light module which is configured to be attached to the lower case.

The light module may include one or more tabs and one or more clips, the lower case may include one or more tab receiving portions, and the method may further include engaging the one or more tab receiving portions of the lower case with the one or more tabs of the light module.

The method may further include locking and attaching the light module to the lower case by pressing the light module on the lower case and sliding the light module with respect to the lower case.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

Further features, details and advantages of the invention are explained in the appended claims, in the drawings and in the description of a preferred embodiment of the head section according to the invention given below.

FIG. 34A is a diagram illustrating a side view of a support mechanism for the articulation assembly inside the head assembly.

FIGS. 34B and 34C are diagram illustrating sections views of FIG. 9A.

FIG. 37 is a diagram illustrating a plan view of a fixed glass mirror assembly with the mirror head in the drive position on the left side and the mirror head in the fold position on the right side.

FIGS. 38A, 38B, and 38C are diagrams illustrating a fixed glass mirror assembly with a combined side turn indicator module and blind spot monitor module as a common assembly.

Figure 1:
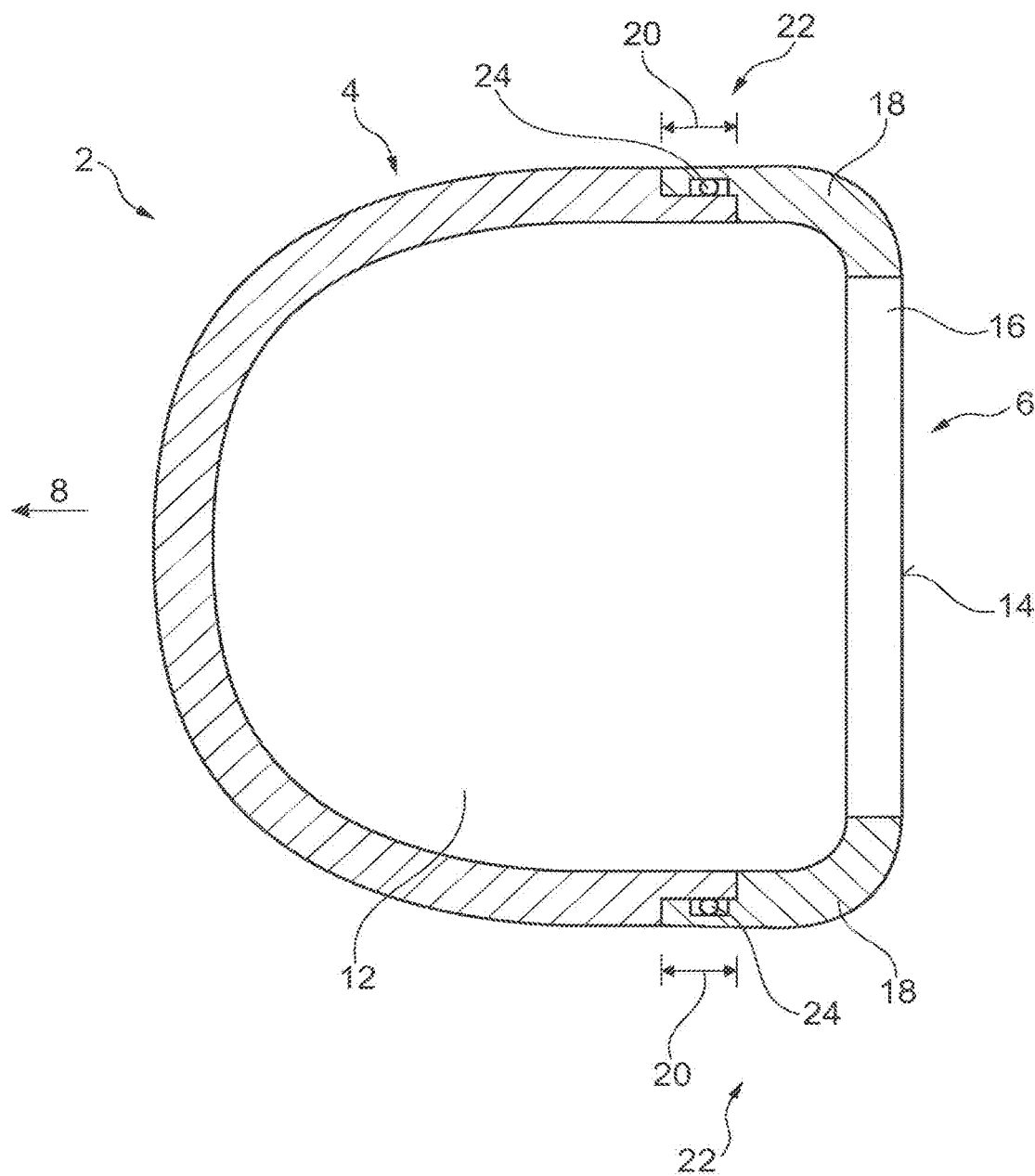
FIG. 1 is a diagram illustrating a schematic profile view of a first embodiment of a head section for a rear view device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rearview" is here defined as a view of the surrounding area, which is not in the field of view of the driver, i.e. the directions opposing, left, right, below and above of the viewing direction, but can also comprise the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

The term "entity" relates here to any biological and non-biological life form, material and/or machine, which can gather the signals with which the vehicle is conveying information and/or induces some kind of action based on this signals. This can comprise for example a device, for example a mechanical, electromechanical, electronic, electromagnetic, optical, chemical or biological device and/or any combination thereof, for example a computer, a robot, an artificial intelligence, but also an animal and/or a plant.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

The following description refers to a head section for a rear view device to be attached on a motor vehicle as for example described in European Patent No. 2 492 144 B1, European Patent No. 2 492 145 B1, or European Application No. 16198759. Such a head section includes a casing means with a housing section and a lid section, at least one electronic unit, and one rear view means. With respect to further details on the housing section reference is made to U.S. patent application Ser. No. 15/000,754.

Figure 2:
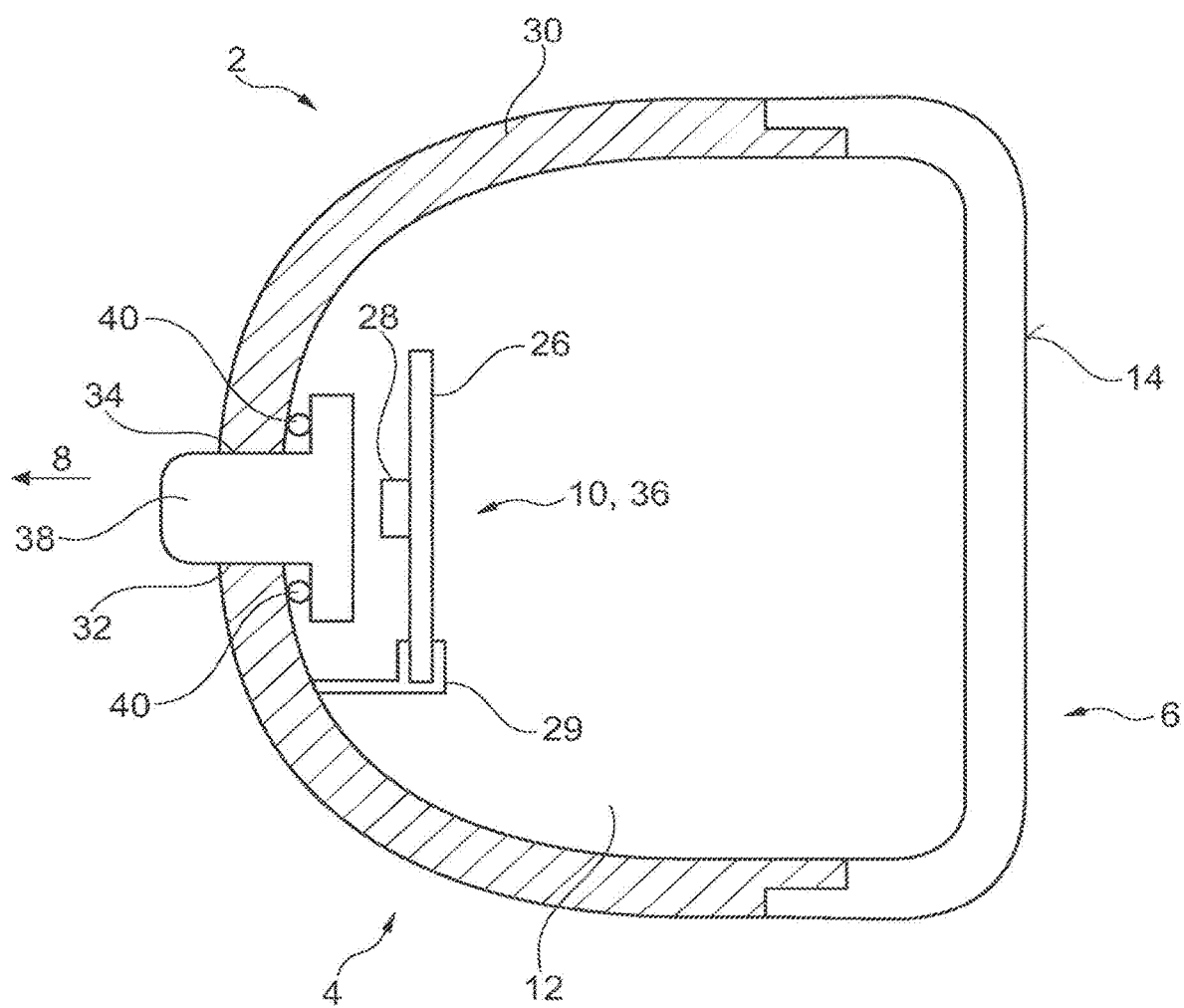
FIG. 2 is a diagram illustrating a schematic profile view of a second embodiment of the head section with an electronic unit arranged in the hollow area.
Figure 3:
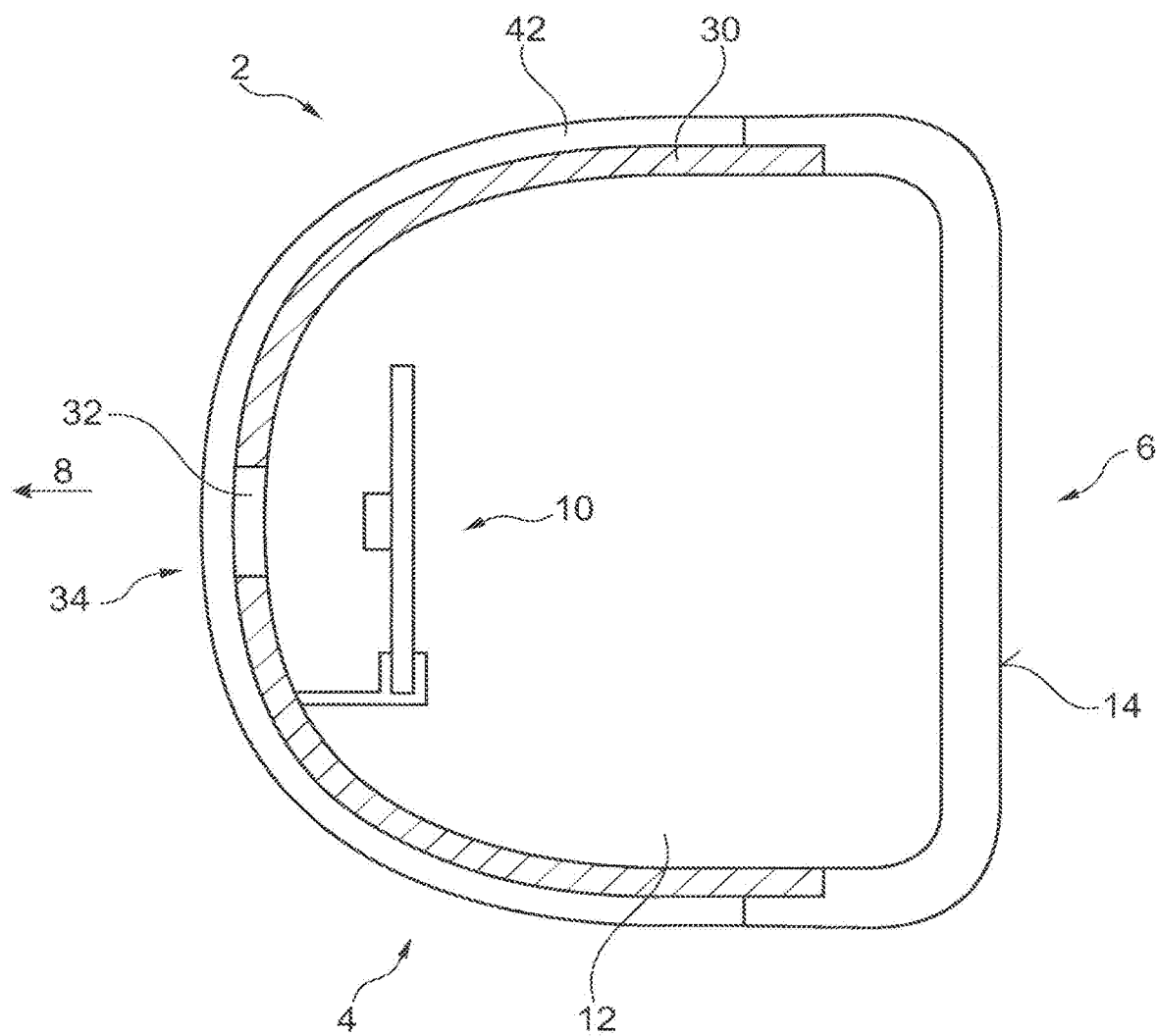
FIG. 3 is a diagram illustrating a third exemplary embodiment of the head section with a housing section including two housing parts.

Referring to FIGS. 1-3, the figures show a head section for a rear view device which is overall assigned reference numeral 2. The 2 can, for example, include a mirror head of an internal or external mirror. The head section 2 includes a housing section 4 and a lid section 6.

FIGS. 1-3 show the head section 2 in a folded out operating position. In this position, the housing section 4 essentially faces towards the direction of driving 8, and the lid section 6 is essentially arranged facing away from the direction of driving 8. As can be seen in FIGS. 2 and 3, an electronic unit 10 can be arranged between the housing section 4 and the lid section 6. This can be locked in a hollow area 12 between the housing section 4 and the lid section 6.

With the exemplary embodiments shown in the figures, a rear view means 14 is arranged on the side of the lid section 6 which faces away from the hollow area 12, wherein the lid section 6 and the rear view means 14 comprise a combined component.

The lid section 6 and the housing section 4 surround the hollow area 12 over its full circumference and at least almost completely seal it tightly towards the outside. This makes it possible to arrange the electronic unit 10 without housing in the hollow area 12.

FIG. 1 shows a first exemplary embodiment in which the lid section 6 comprises a flat portion 16 and two edge portions 18 which extend diagonally to the flat portion 16. The lid section 6 comprises a multiple-part component which is designed as a dual-part injection molded element. Here, the flat portion 16 is formed from a first lid part and the two edge portions 18 are formed from a second lid part. The two edge portions 18 grip the housing section 4 from outside, wherein they overlap the housing section 4 in a coupling portion 20. Here, the edge portions 18 includes a lid part which acts as a sealing means 22. Furthermore, the sealing means 22 additionally includes a sealing element which is designed as an O-ring 24. It should be appreciated that the sealing means 22 and sealing element or O-ring 24 that is positioned between the lid section 6 and the housing section 4 may also be used in the second exemplary embodiment of FIG. 2, the third exemplary embodiment of FIG. 3, the fourth exemplary embodiment of FIG. 4, the fifth exemplary embodiment of FIG. 5, the sixth exemplary embodiment of FIG. 6, or the seventh exemplary embodiment of FIG. 7.

FIG. 2 shows a second exemplary embodiment of the head section 2 according to the invention. In this embodiment, an electronic unit 10 is arranged in the hollow area 12.

In the exemplary embodiment shown in FIG. 2, the electronic unit 10 comprises a printed circuit board 26 and a lamp 28. In order to affix the printed circuit board 26 in the hollow area 12, a retaining device 28 is provided, which also rests on the housing section 4. In the exemplary embodiment shown in FIG. 2, the housing section is formed from a first housing part 30 which is opaque and non-translucent.

In order to enable light from the lamp 28 to penetrate outwards from the hollow area 12, the first housing part 30 of the housing section 4 comprises an opening 32. The opening 32 is part of a light window 34 which enables an outward penetration of light from the electronic unit 10 which comprises the printed circuit board 26 and the lamp 28 and is designed as a lighting unit 36. In order to achieve an attractive emission of light, an optical element 38 is provided which is arranged at the opening 32. The optical element 38 can comprise a light fiber and/or a light disc. In order to prevent the penetration of humidity and dirt, a housing seal 40 is arranged between the optical element 38 and the first housing part 30 of the housing section 4.

FIG. 3 shows a third exemplary embodiment of the head section 2 in which the housing section 4 includes a second housing part 42, which is arranged on an outer side which faces away from the hollow area 12 of the first housing part 41. The second housing part 42 includes a transparent and/or translucent area, at least in the area of the light window 34.

Due to the provision of a second housing part 42, no housing seal 40 is required according to FIG. 2.

Figure 4:
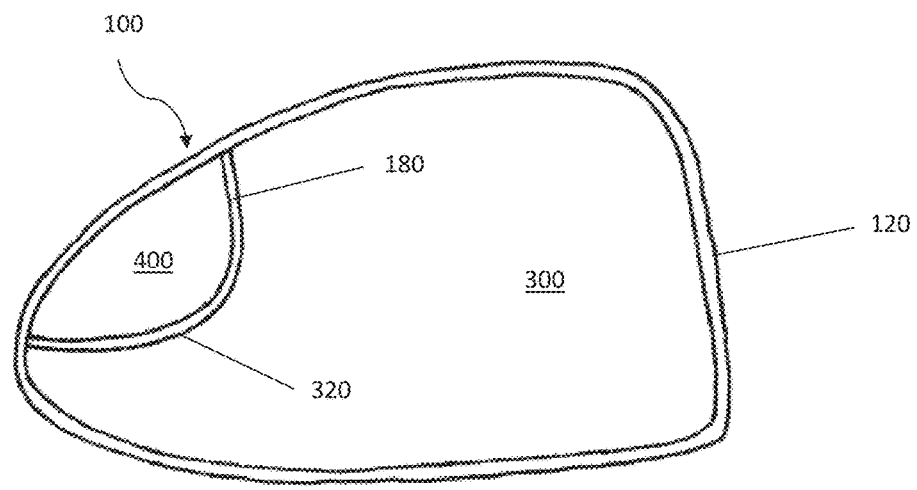
FIG. 4 is a diagram illustrating a front view of a fourth embodiment including a lid section having first and second rear view means.

Referring to FIG. 4, a lid section 100 includes a bezel section 120 and a rim section 180 extending between a first rear view means 300 and a second rear view means 400 arranged on the lid section 100.

The second rear view means 400 is a so called spotter having a wider field of view than the first rear view means 300. The first rear view means 300 can include a reflective element in the form of a mirror glass coated with a chrome or silver layer. However, any other known rear view means can be used instead, such as a display. The second rear view means 400 may be provided by a coating on chromium base applied directly on the lid section 100.

In an example, the lid section 100 can be formed out of a polymeric substrate with the bezel section 120 and a combined, single-piece component onto which the chromium-based reflective coating is applied to provide the second rear view means. Further details on the coating is described in U.S. patent application Ser. No. 15/439,188, which is herein incorporated by a reference in its entirety for all purposes.

The rim 180 can be provided with a transparent surface to which a blind spot indicator is fixed as described in U.S. Pat. No. 8,779,911 B2, which is herein incorporated by reference in its entirety for all purposes.

Figure 5:
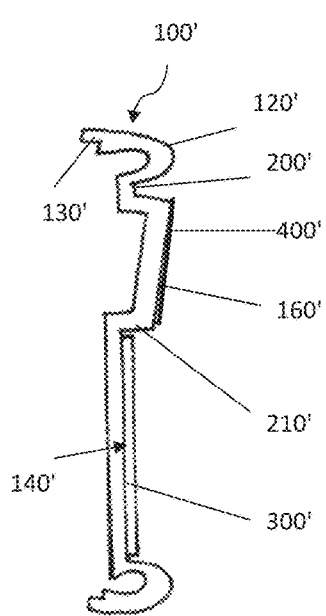
FIG. 5 is a diagram illustrating a cross section of a lid section of a fifth embodiment including first and second rear view means.
Figure 6:
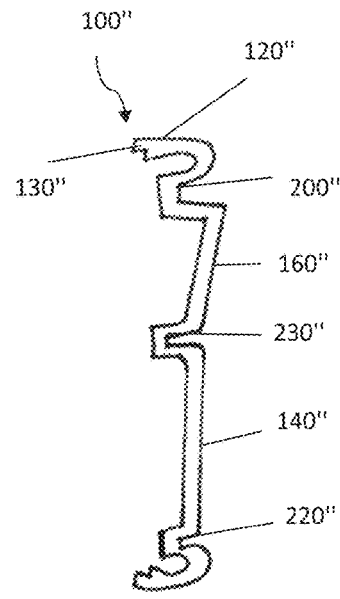
FIG. 6 is a diagram illustrating a cross section of a multi-function backing plate provided by a lid section of a sixth embodiment including first and second rear view means.
Figure 7:
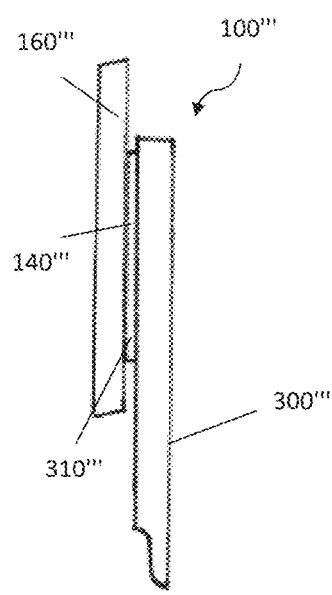
FIG. 7 is a diagram illustrating a cross section of a part of a lid section and a rear view means of a seventh embodiment of a head section.

Further details on the bezel section 120 are illustrated in FIGS. 5 and 6. Referring to FIGS. 5 and 6, the bezel section 120', 120" can be provided with an undercut 130', 130" for locking the lid section 100', 100" to the respective, not shown housing section such that the inside of the head section is sealed to the outside in line with the teaching of U.S. patent application Ser. No. 15/000,754.

In this example, the lid section includes, in addition to the bezel section, the combined, single-piece component which is to be coated with a chromium-based reflective coating to form the second rear view means 400. In the following, the combined, single-piece component is referred to as second rear view means section 160', 160". The respective section 160', 160" can be flat or curved. In the embodiments of FIGS. 5 and 6, the second rear view means section 160',

160" is flat and inclined. Between the second rear view means section 160', 160" and the respective bezel section 120', 120", a first groove 200', 200" can be provided.

Still referring to the examples of FIGS. 5 and 6, the lid section can also be provided with a first rear view means section 140', 140", thus forming a multi-function backing plate. In the embodiments of FIGS. 5 and 6 the first rear view means is moveable together with the second rear view means as both rear view means are moveable together with a complete head section due to the fact that the lid section 100 is locked to the housing section. That is, the entire mirror assembly including the housing, the lid, and the one or more rear view means may be adjustable inwardly, outwardly, upwardly, and/or downwardly.

The housing section can comprise two parts to facilitate the assembly of the head section. In addition, the housing section can have one or more light windows as described in U.S. patent application Ser. No. 15/000,754.

Even for those embodiments using a lid section which is a multi-function backing plate, the first and second rear view means sections 160', 160", 140', 140" can be provided with different curvatures and/or with different inclinations with respect to each other and/or the bezel 120', 120".

In the embodiment shown in FIG. 5, there is a step 210' being provided between the two rear view means sections 140', 160' such that a reflective element providing the first rear view means 300' can be attached below the second rear view means surface 140', for example via an adhesive.

In the embodiment shown in FIG. 6, there is not only a groove 200" between the bezel section 120" and the second rear view means section 160', but also between the bezel section 120" and the first rear view means section 140". In addition, a second groove 230" is provide between the two rear view means sections 140" and 160".

Independent of whether there is a rim 180, a step 210' or a groove 230" provided between the two rear view means 300, 300', 400, 400', it is preferred in one aspect that the first rear view means 300 be provided with a recess 320 into which the second rear view means 400 extends, as shown in FIG. 4.

In the example illustrated in FIG. 5, the second rear view means 400 may be provided by the chromium-based reflective coating. It is also possible to coat the lid section 100 not only in its second rear view means section 160', but also in its bezel section and/or its first rear view means section. The coatings might be different. In particular, a different color could be chosen for the coating in the bezel section compared to the coating in the first rear view means section and/or the second rear view means section.

The rim 180, the groove 200', the groove 220" and/or the groove 230" may or may not be coated. If there is a coating, it might be different from the one in the bezel section and/or in the rear view means sections.

The lid section includes a polymeric substrate, which is preferably injection molded into the required form. The lid section may not be formed with a first rear view means section, or may be formed with a first rear view means section which does not extend to the complete area of the first rear view means, as for example illustrated in FIG. 7. That is, the lid section 100''' may include a first rear view means section 140" which has an extension providing a second rear view means section 160", with the respective extension being sufficient for an attachment of the reflective element of the first rear view means 300''' for example via an adhesive layer 310'''. As an alternative, the first rear view means does not have to be fixedly secured to the lid section at all in order to be moveable with respect to the head section of the rear view device.

With the simple lid section 100, 100', 100" or 100''' of the invention it is possible to reduce the number of parts and thus the time needed for assembling the head section of a rear view device. In addition, the head section becomes more compact. It is also advantageous to provide a sealed head section in order to reduce the parts needed in connection with any electronic unit provided within the head section, in particular by omitting a housing of the electronic unit.

It should be appreciated that the above described head sections may be used with a movable head assembly of an external rear view device having a base assembly 10, a frame means 20, an articulation assembly 30 and a casing 40. These parts will be described in the following description with reference to FIGS. 8-12B.

A moveable head assembly of an external rear view device is for example described in European Patent Application No. 16198759.9, which is hereby incorporated by reference in its entirety for all purposes. This application describes that a head section belonging to a head assembly of an external rear view device, in particular in the form of a mirror head of an external rear view mirror, can be articulated inboard/outboard and up/down using an articulation means, in particular a glass actuator, around a spherical joint, with spherical seats being provided between parts moving relative to each other such that they can rotate around two articulation axes perpendicular to each other having a common joint point. This ensures the maintenance of current end user functionality while offering significant smaller mirror size, with a reduction of size up to 30%. In addition, the unique layout of the internal mechanism with its spherical seats enhances packaging and performances.

According to European Patent Application No. 16198759.9, the articulation assembly is also supported and protected for impact using the spherical seats, in particular due to the arrangement of frame means between the articulation assembly and a casing of the head assembly. The casing being assembled from several casing elements, one of which is secured to the moveable part of the articulation assembly, improves the weight distribution and reduces total housing frontal area on the vehicle which in turn improves aero performance and, thus, provides a higher fuel efficiency. Still further, the pivot system used for the rear vision device of the invention with the single pivot point for two articulation axes permits a mirror adjustment movement while providing dynamic mirror performance and mirror impact support.

Figure 8:
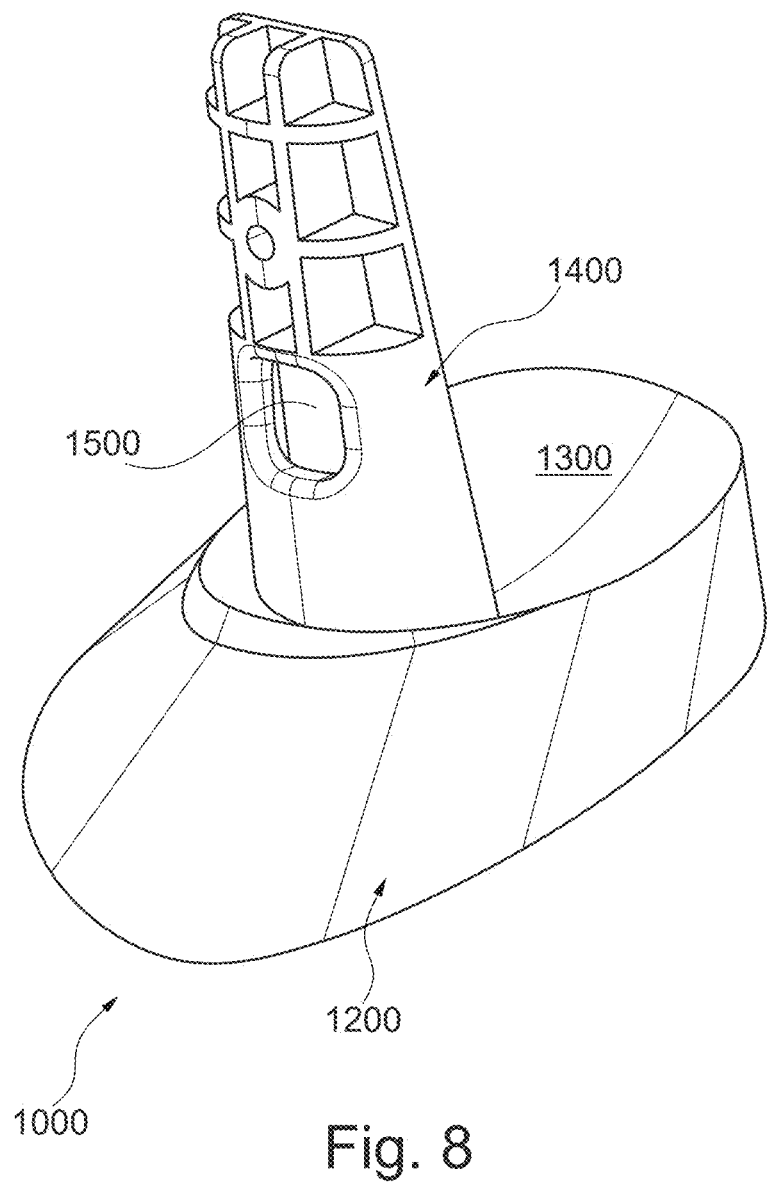
FIG. 8 is a diagram illustrating a perspective view of a base assembly of a rear view device.

Referring to FIG. 8, the base assembly 1000 may include a foot 1200 provided with a spherical seat 1300 from which a shaft type carrier part 1400 extends, with the carrier part 1400 being provided with a cable exit 1500. The foot 1200 can be closed at its end opposite the spherical seat 1300 by an attachment part 1100 discussed with respect to FIGS. 12a and 12b below.

The base assembly 1000 is fixedly secured to a motor vehicle (not shown) via the attachment part 1100 when in use.

Figure 9A:
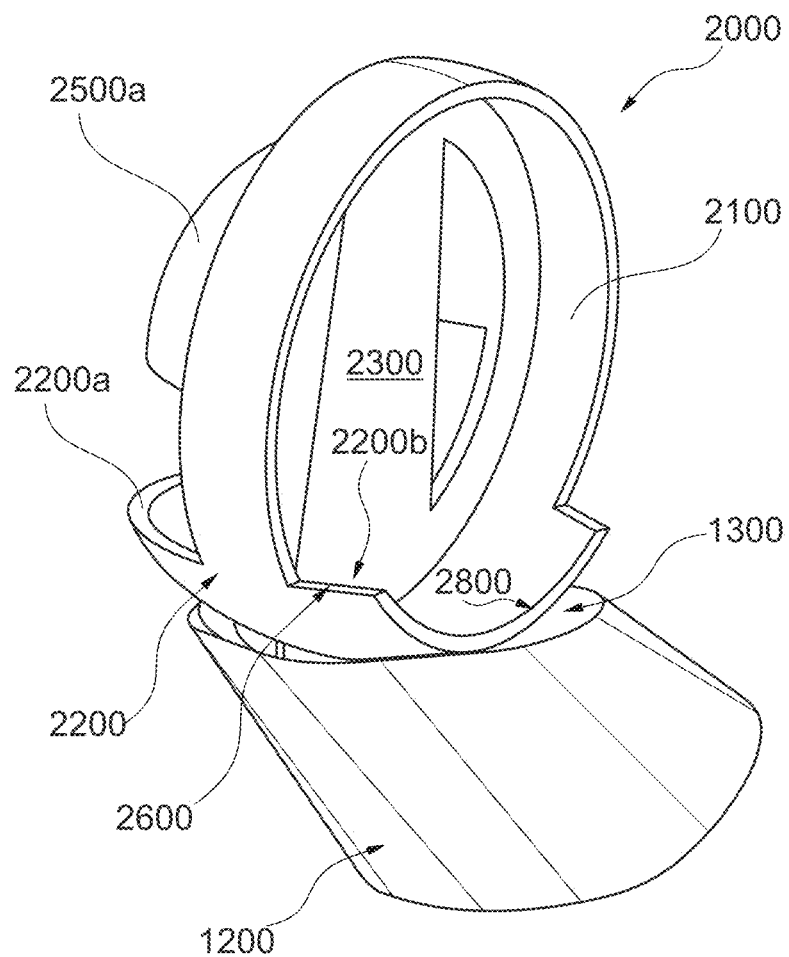
FIGS. 9A and 9B are diagrams illustrating two perspective views of the base assembly of FIG. 1 having frame means attached thereto, as viewed from two different sides.
Figure 9B:
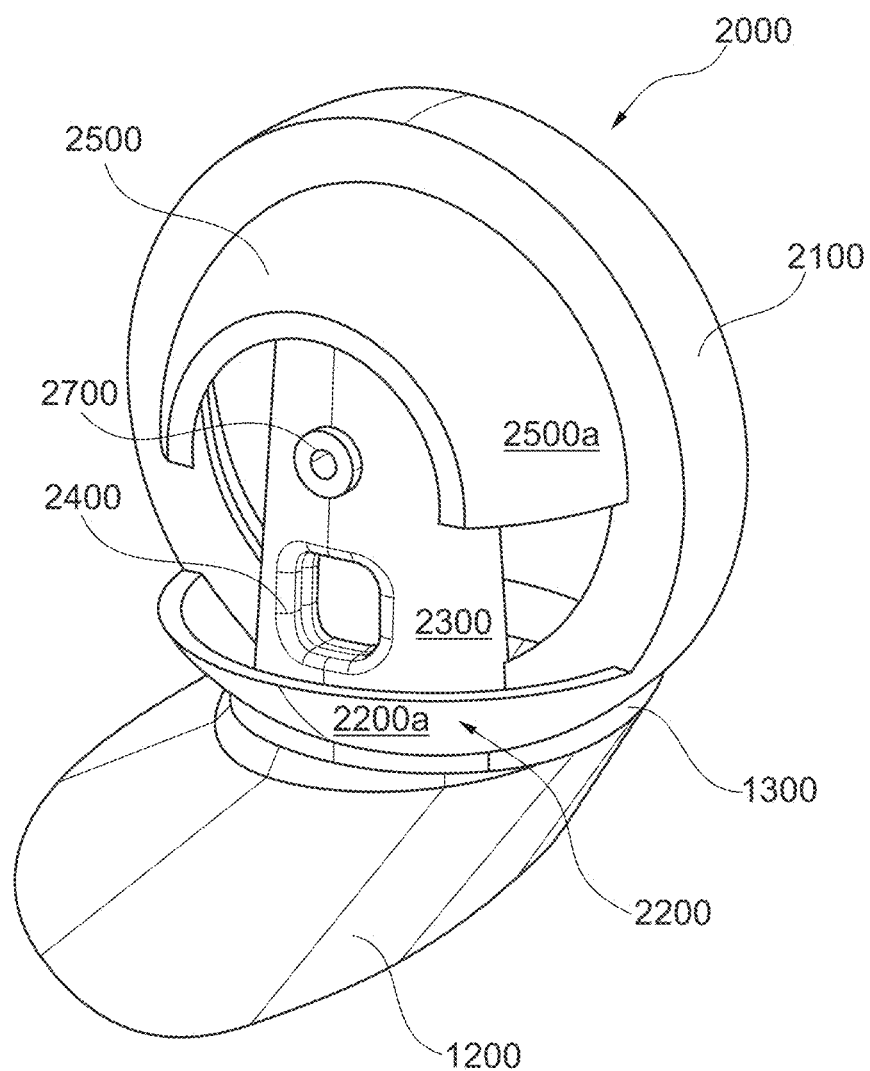

FIGS. 9A and 9B depict the frame means 2000 fixedly secured to the base assembly 1000. The frame means 2000 is provided by a support part 2100 more or less with a ring shape, two spherical seats 2200 and 2500 provided by extensions 2200a, 2200b and 2500a and a fixation part 2300 into which the carrier part 1400 of the base assembly 1000 is inserted such that the lower spherical seat 2200 in FIGS.

9A and 9B is facing the spherical seat 13 of the foot 12. The extensions 2200a, 2200b and 2500a extend from opposite sides of the fixation part 2300, with two lower extensions 2200a, 2200b providing a lower spherical seat 2200 and the upper spherical seat 2500 being provided by an upper extension 2500a.

The fixation part 2300 is provided with a cable exit 2400 in alignment with the cable exit 1500 of the carrier part 1400. For securing the attachment of the frame means 2000 to the base assembly 1000 a screw (not shown) can be entered into a screw hole 2700 provided by the fixation part 2300 and the carrier part 1400.

Figure 10A:
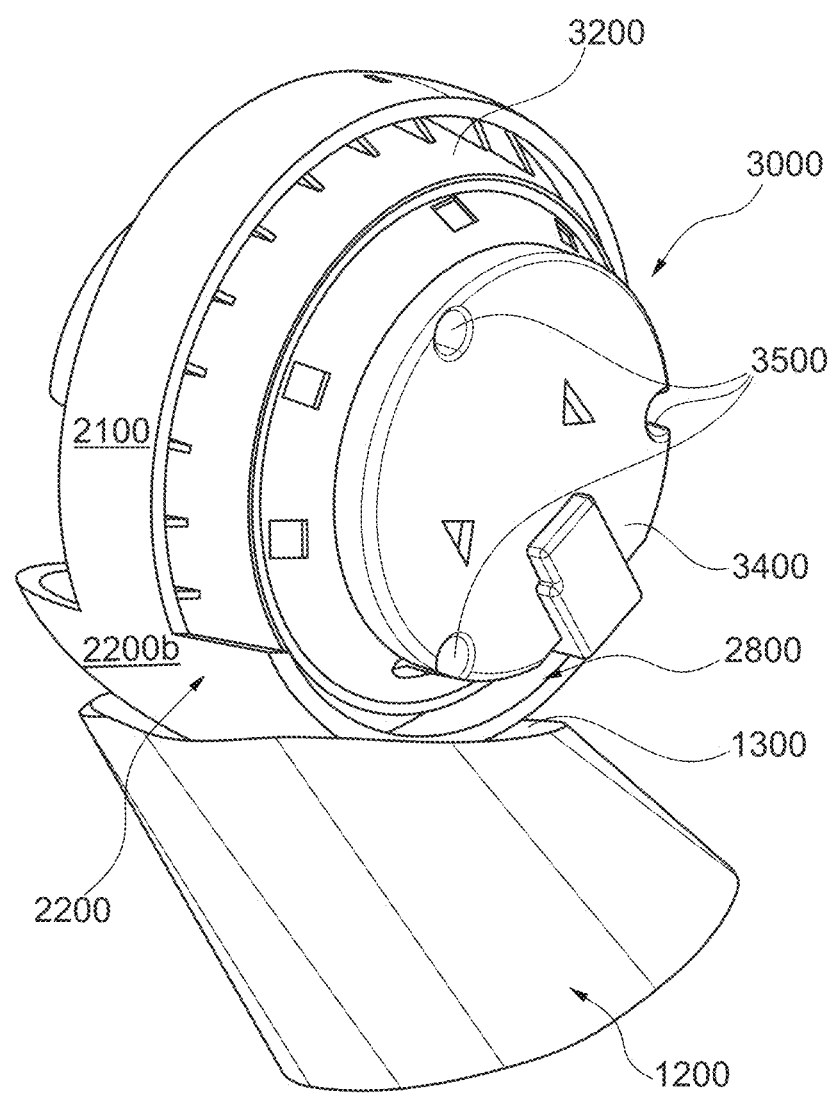
FIGS. 10A and 10B are diagrams illustrating perspective views like FIG. 9A with an articulation assembly and an articulation assembly as well as a lower casing element being attached, respectively.

As can be seen in FIG. 10A the articulation means 3000 can be attached to the frame means 2000 by partly inserting a fixed part 3200 of the articulation assembly 3000 into the support part 2100. The respective arrangement can be fixed with a clip connection or the like. The fixed part 3200 is moveably connected to a moveable part 3400 of the articulation assembly 3000, with the moveable part 3400 facing away from the frame means 2000.

Figure 10B:
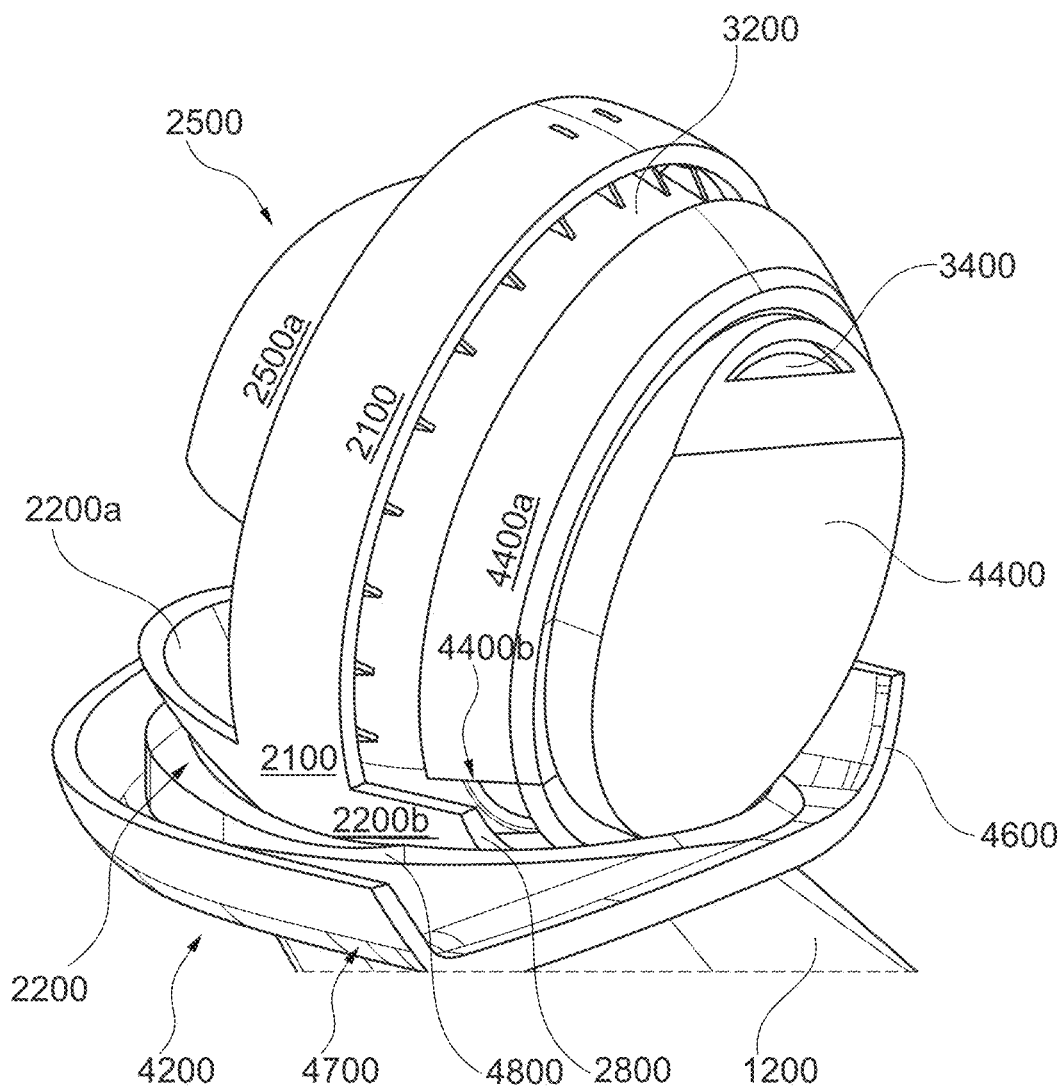

The lower extensions 2200a and 2200b provide a part ring together with the lower part of support part 2100 to provide the spherical seat 2200, with a rim 2800 being provided by a cut-out at the end facing the moveable part 3400 of the articulation assembly 3000. The moveable part 3400 is provided with attachment means 3500 in form of recesses for the attachment of a casing 4000. FIG. 10B shows the subassembly of FIG. 10B with a lower casing element 4200 of the casing 4000 attached thereto. The lower casing element 4200 is provided with an attachment part 4400 attached to the moveable part 3400 of the articulation assembly 3000 in a fixed manner in order to move together with the moveable part 3400. For that purpose, the attachment part 4400 is formed with attachment bosses 4500 shown in FIG. 11A, with the attachment bosses 4500 being insertable into the attachment recesses 3500, and with a part ring 4400a for partly encompassing the moveable part 3400 to add strength to the connection of the lower casing element 42 and the moveable part 34 due to an enhanced power transmission. Further ribs and the like can be added to further increase the strength.

As can be best seen in FIG. 10B the part ring 2100, 2200a, 2200b and the part ring 4400a are complementary to each other to lead to a compromise of the spherical seat 2200 enabling a smooth movement of the lower casing element 4200 together with the moveable part 3400 on the one hand and a strong connection of the lower casing element 4200 to the moveable part 3400 on the other hand.

In addition, the lower casing element 4200 is provided with a base part 4600 arranged between the foot 1200 and the frame means 2000, in particular the lower extension of the frame means. The base part 4600 is provided with a lower spherical seat 4700 cooperating with the spherical seat 1300 of the foot 1200 and an upper spherical seat 4800 cooperating with the lowest spherical seat 2200 of the frame means 2000. Accordingly, the overall structure is that of three parts spheres with the inner part sphere provided by the frame means 2000 and the outer part sphere provided by the foot 1200 of the base assembly 1000 being fixed, whereas the part sphere provided by the lower casing element 4200, and being arranged in the middle can be moved around two articulation axes in order to provide an inbound/outboard and up/down movement. Attached to the attachment part 4400 is a not shown mirror glass which can thus be moved via the articulation assembly 3000 to fulfil the legal field of view requirements of the rear view mirror.

Figure 11A:
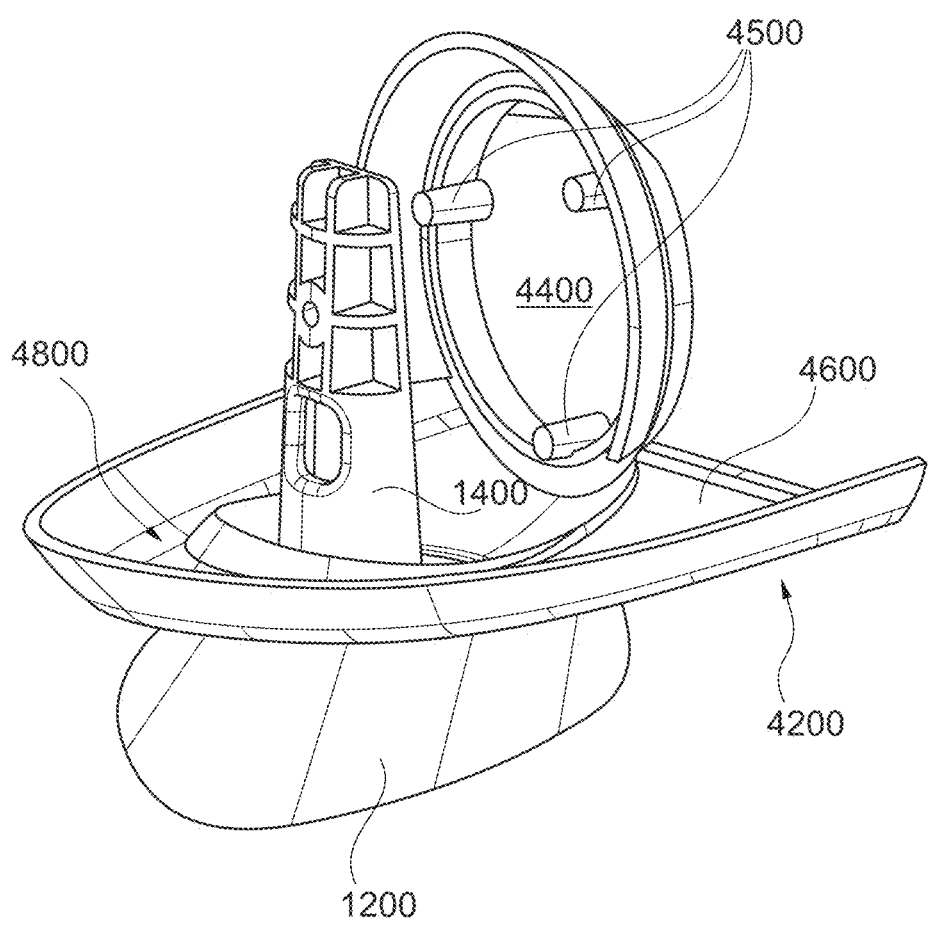
FIGS. 11A and 11B are diagrams illustrating perspective views of the base assembly of FIG. 1 with the lower casing element and the lower casing element plus the articulation assembly being attached, respectively.

FIG. 11A provides further details of the relative arrangement of the lower casing element 4200 with respect to the base assembly 1000.

Figure 11B:
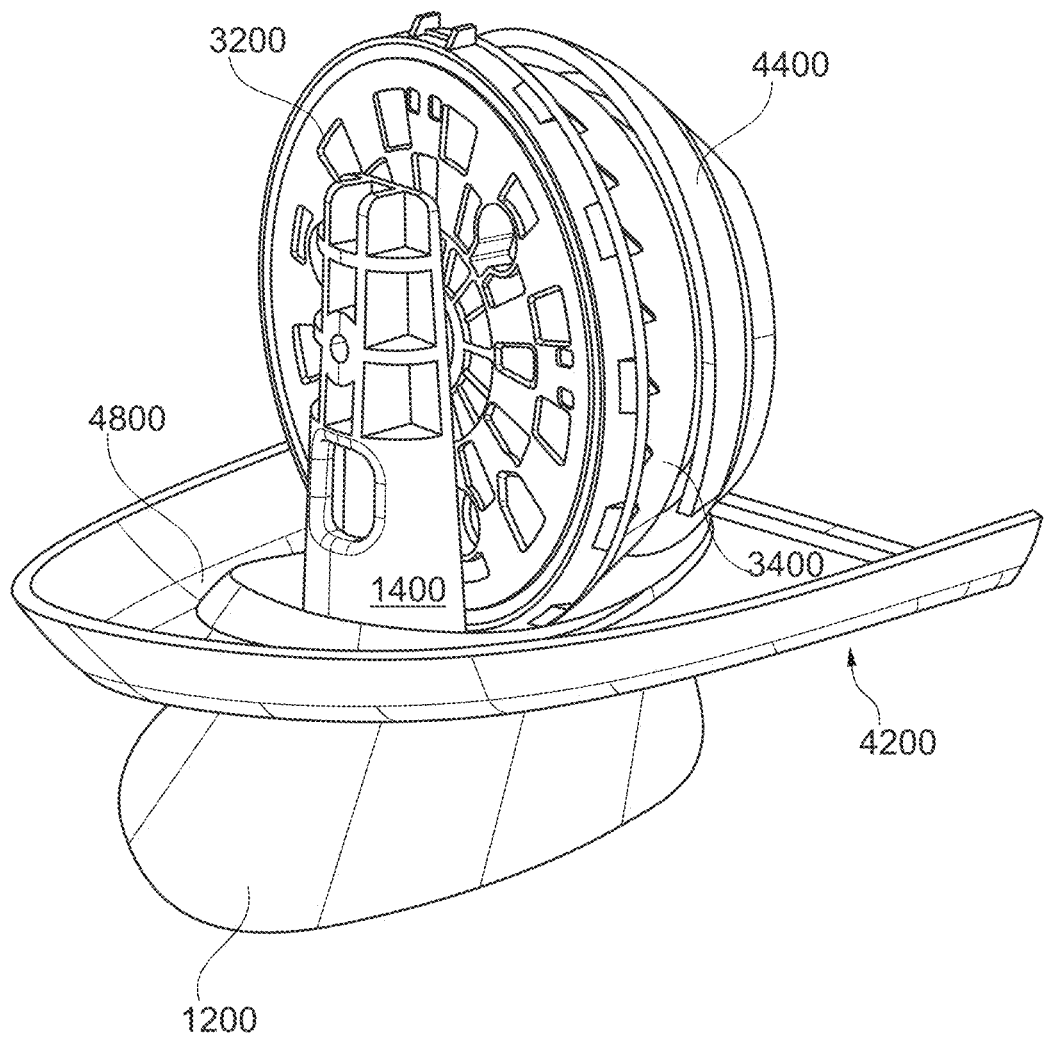

FIG. 11B shows the subassembly of FIG. 11A together with the fixed part 3200 and movable part 3400 attached between the carrier part 1400 of the base assembly 1000 and the attachment part 4400 of the lower casing 4200. The articulation assembly 3000 also includes not shown drive means, in particular including two motors for the movement of the moveable part 3400 around the two articulation axes, and a control system 3600, for the drive means which is partly shown in FIGS. 12A and 12B.

Figure 12A:
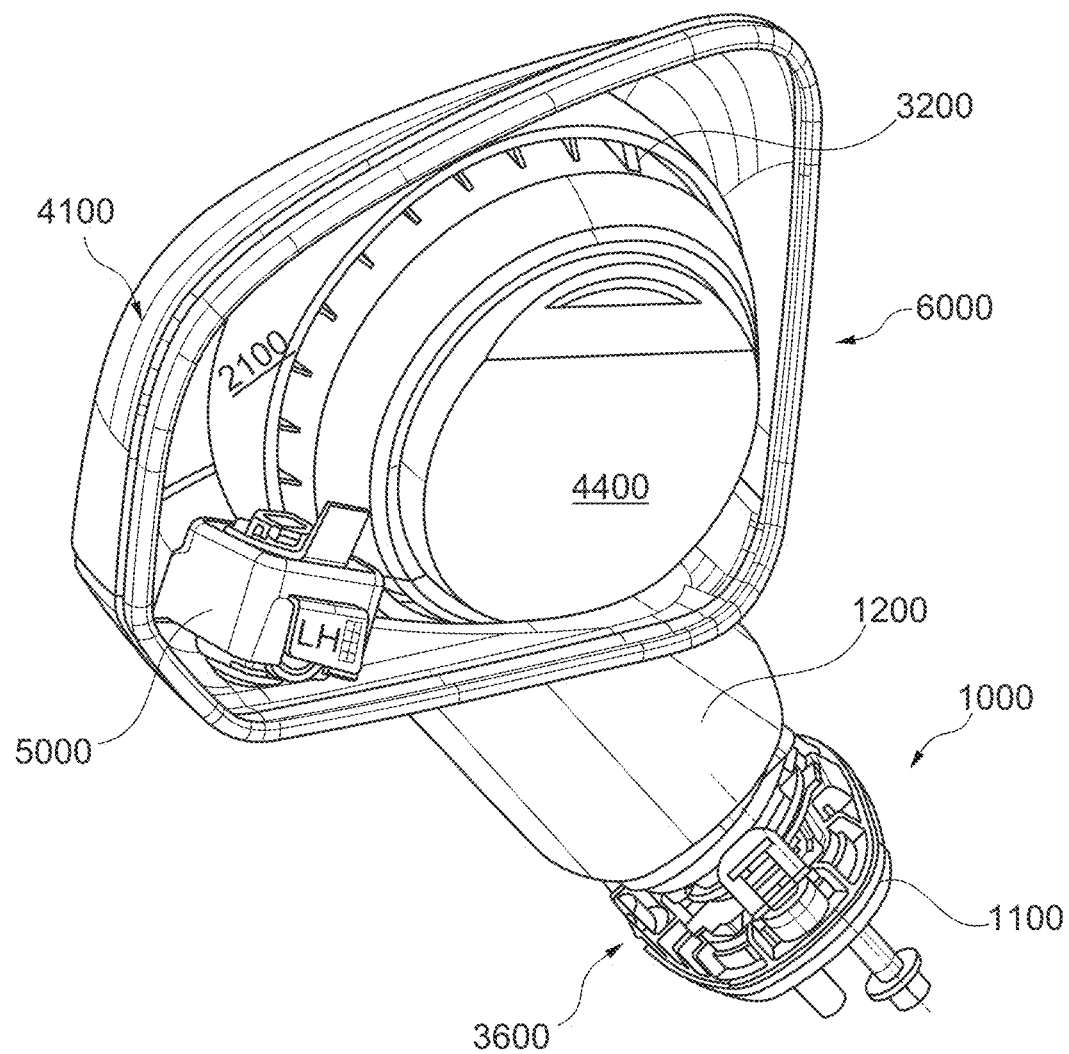
FIGS. 12A and 12B are diagrams illustrating perspective views of the base assembly to which the frame means, the articulation assembly and part of the casing are attached, as viewed from two different sides.
Figure 12B:
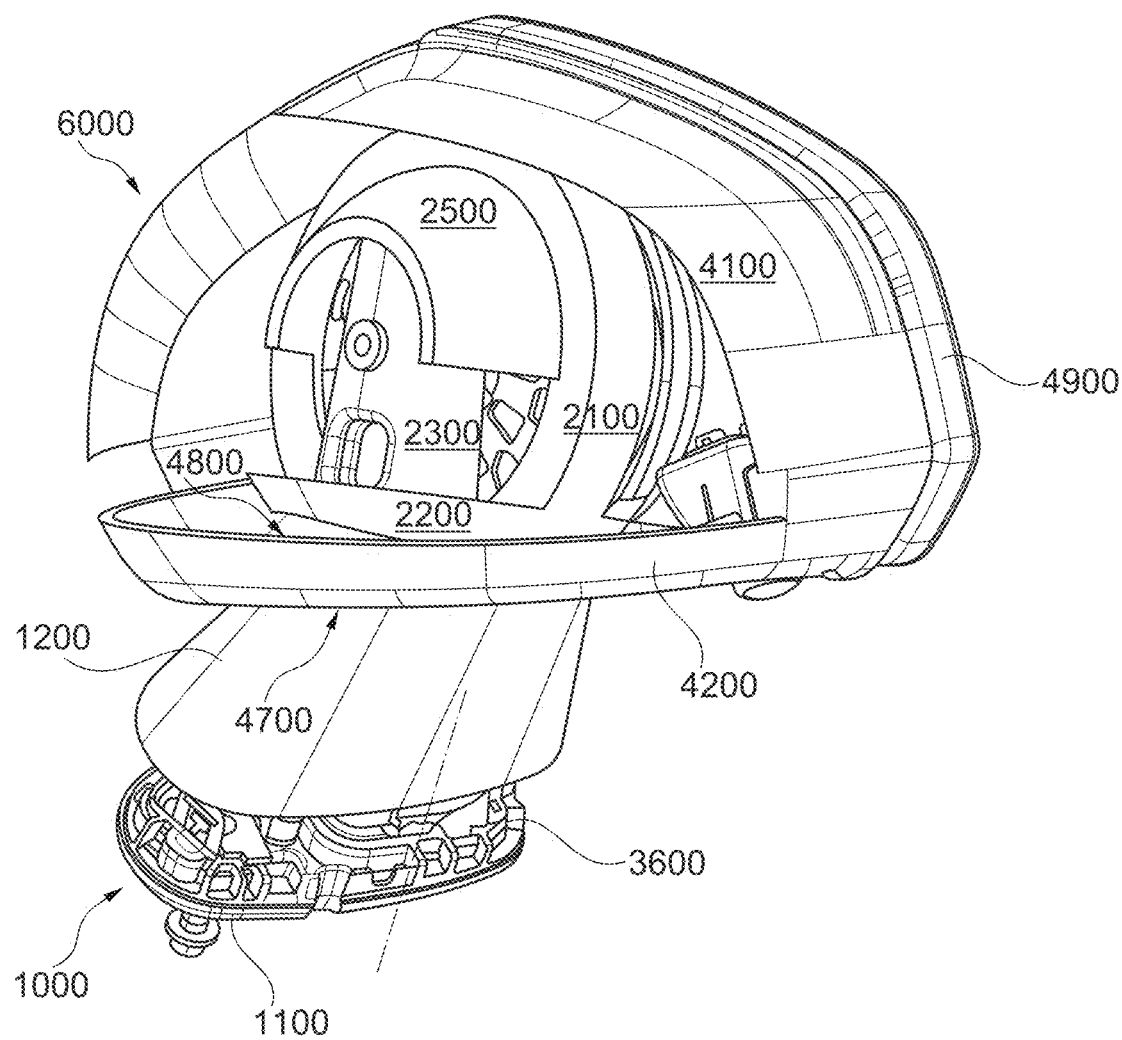

The perspective view of FIG. 12A not only shows the subassembly provided by the base assembly 1000, the articulation assembly 3000 and the lower casing element 4200, but also an upper casing element 4100 of the casing 4000 and a camera 5000 both being attached to the lower casing element 4200. FIG. 12B shows the subassembly of FIG. 12A from an opposite side, still without the casing 4000 closed via a non-shown additional casing element to complete a head assembly 6000. But FIG. 12B shows in addition to the upper casing element 4100 and the lower casing element 4200 a bezel 4900 attached to the upper and lower casing elements 4100, 4200. The bezel 4900 surrounds the not shown mirror glass of the completely assembled external rear view mirror of the present invention.

Still further, the control system 3600 of the articulation assembly 3000 is carried by the attachment part 1100. When the attachment part 1100 is secured to the foot 1200, the control system 3600 is completely arranged within the foot 1200. Also arranged within the foot 1200 are cables which exit the base assembly 1000 at the cable exit 1500 and reach the interior of the head assembly 6000 by passing also through to the cable exit 2400 of the frame means 2000 in order to be connected to the camera 5000 and other non-shown units like lighting units and the like, which are arranged within the head assembly 6000.

The head assembly 6000 or rather the mirror head as a whole can be articulated using the articulation assembly 3000 in particular via the movable part 3400. The movable part 3400 is connected to the drive system which can be a part of the control system 3600. The control system 3600 can also comprise memory means for memorizing a position of the movable 3400 and, thus, the mirror glass attached thereto via the attachment part 4400.

The support part 2100 is provided in form of an actuator ring which is clipped onto the fixed part 3200 to provide improved support in an impact situation. Due to its upper spherical seat 2500, the frame assembly 2000 is ensuring a smooth movement of the upper casing element 4100 which is also provided with an internal spherical seat, not shown.

The arrangement of the support part 2100 with its extensions 2200a, 2200b, and 2500a providing the spherical seats 2200, 2500 relative to the movable upper and lower casing elements 4100, 4200 provide a support and stiffness in all three directions during dynamic and impact situations. The result is a smaller mirror system offering the customer a unique external rear view mirror weight as well as aero and vehicle fuel efficiency benefit.

Another moveable head assembly of an external rear vision device is for example described in European Patent No. 2 492 145, which is hereby incorporated by reference in its entirety for all purposes. This patent refers to an external rear view mirror with a mirror head and a mirror base. The external rear view mirror with a mirror head and a mirror base is covered with at least one body element in the form of a body frame, a body cap and a mirror base cover, and a mirror glass that is installed rigidly relative to the mirror head. The mirror head rests on the mirror base, and the body cover of the mirror head is composed of multiple pieces of the body frame and the body cap. The mirror base is equipped with a mirror base cover where the body cap has an opening designed for the passage of the mirror base and the mirror base cover. The mirror base is rigidly connected to a mirror carrier that carries an electrical glass adjustment drive where the glass adjustment drive is connected to at least one body element. These parts will be described in the following description with reference to FIGS. 13-21.

Figure 13:
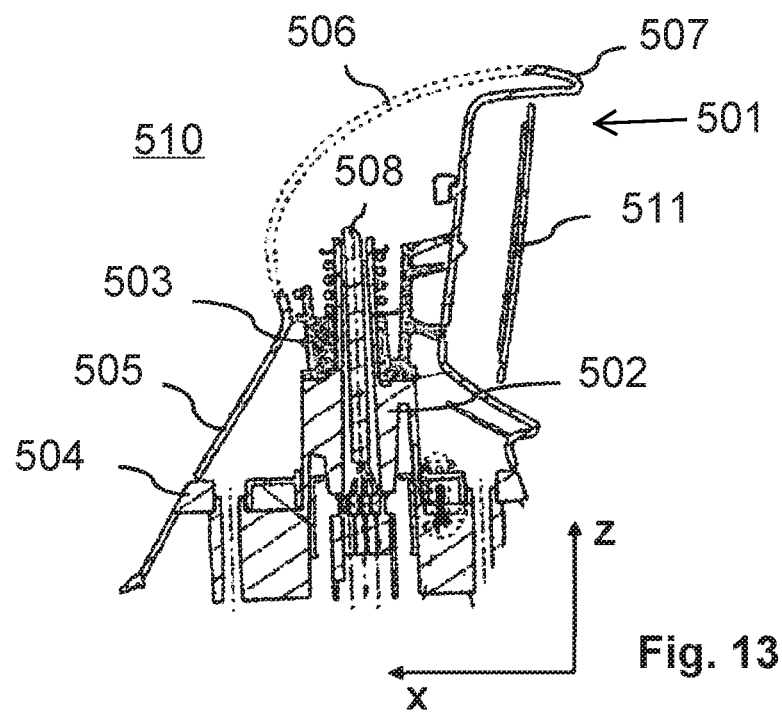
FIG. 13 is a diagram illustrating a door-to-door mirror in the prior art.

FIG. 13 shows a sectional view through the x-z plane in vehicle coordinates, where x represents the longitudinal axis of the vehicle. The head section or rear view means 501 includes a base 502, which is rotatably connected to a support 503. The head 510 is thereby pivotable about the axis 508, so that the head can be hinged in a parking position in the direction of the vehicle. In the case of FIG. 13, an electrical drive for the tilting movement is provided. The base 502 as well as the support 503 are clad with plastic covers. In the region of the mirror base, a mirror foot cover 505 conceals the technical design; the mirror support 503 is concealed by a housing cap 506 and a housing frame 507. The mechanical connection to the outer contour 504 of the vehicle is not described in detail. Since the longitudinal section of FIG. 13 extends through the axis of the mirror foot, the glass adjustment drive is not visible.

Figure 14:
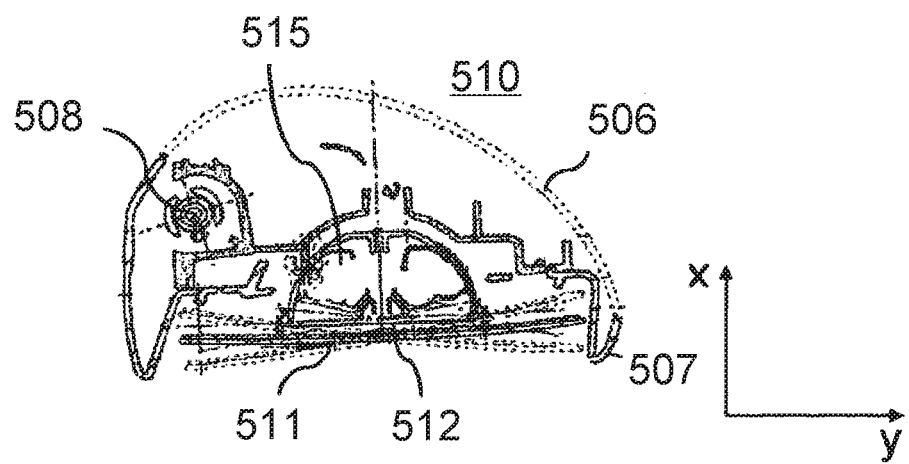
FIG. 14 is a diagram illustrating the same mirror in a section perpendicular to the first section.
Figure 15:
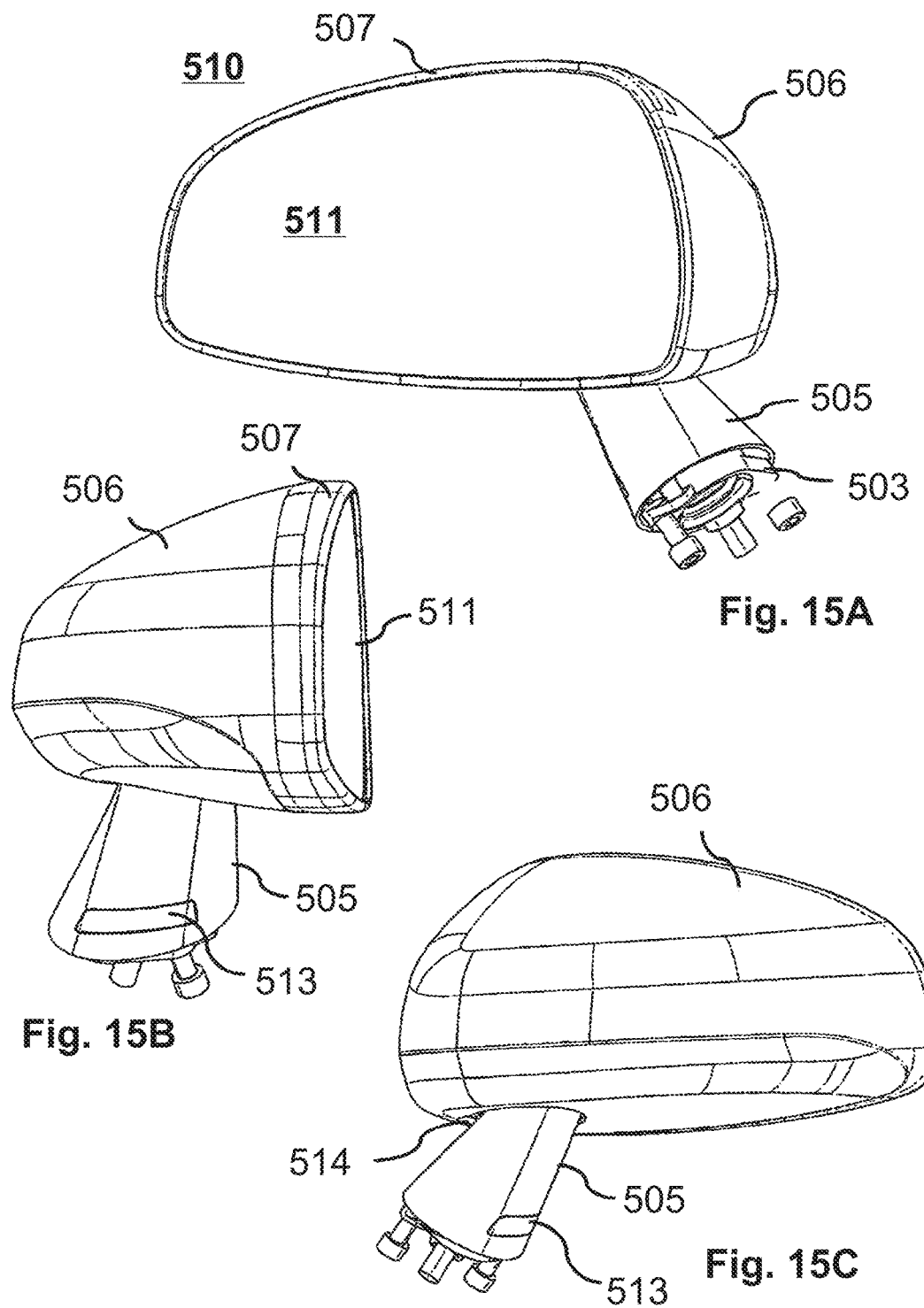
FIGS. 15A to 15C are diagrams illustrating a first solution of a rear view device according to an aspect of the invention.
Figure 16:
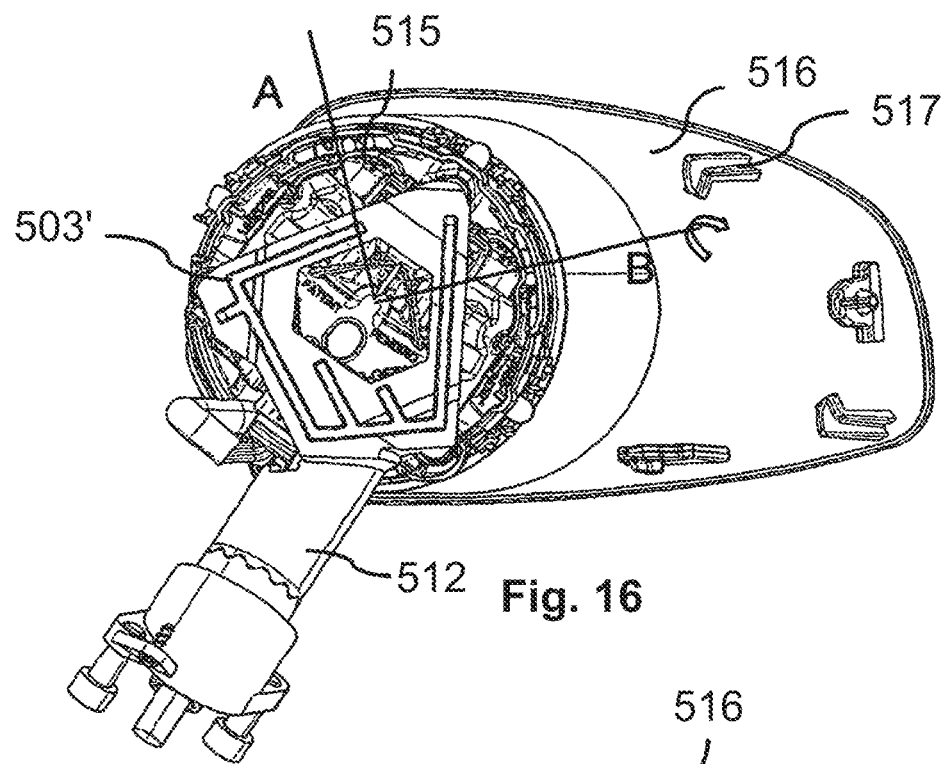
FIGS. 16, 17 and 18 are diagrams illustrating a view of an aspect of the invention without a housing

FIG. 14 shows the mirror head from FIG. 13 in a section along the y-axis. On the left, the axis of rotation 508 can be seen around which the mirror head 510 rotates. The mirror support 503 is rigidly connected to the housing frame 507 and the housing cap 506 and, during its movement against the mirror base, carries with its mirror foot cover these housing elements. A commercial glass adjustment drive 515 is mounted on the mirror support. This drive is, for example, a drive as known from EP 2017127, have a half-shell-shaped housing and a turntable 512 which can be displaced therewith, which generally has a planar contact surface for connecting the mirror glass 511. The mirror glass 511 is held in a glass support plate 516, as illustrated in FIG. 16, or is installed on the glass adjustment drive in such a way that it can be pivoted into the desired position by means of two adjusting elements of the glass adjustment drive via the rotary table 512. The installation of the glass on the glass support plate 516 is provided for reasons of fragmentation protection.

FIGS. 15A-15C show views of an aspect of the inventive solution. The mirror glass 511 is no gap between the glass and the housing is installed directly in the mirror head. The mirror glass 511 is not pivoted to the housing elements. The mirror glass 511 need not be enclosed or covered by a mirror glass support in this embodiment. The splinter protection can be guaranteed also heads by simply applying an adhesive film. The mirror head 510 is seated on a mirror 502. The case covers the mirror head are either multipart constructed with rack 507 and housing cap 506 or consist of a single component. The mirror 502 is provided with a mirror base. 505. In one embodiment, the mirror base 505 a recess 513 into which the lens of a lighting as a perimeter light, a position light, a warning or an indicator can be integrated.

As a result of the movement, the opening 514 must be larger than the diameter of the mirror foot cover 505. The mirror head 510 moves against the mirror base so that the opening 514 must be adapted depending on the displacement movements of the mirror head. Since splashing water could penetrate into the mirror head through the opening 514, in another embodiment. it is provided to close the opening around the mirror foot cover with a flexible membrane.

Figure 17:
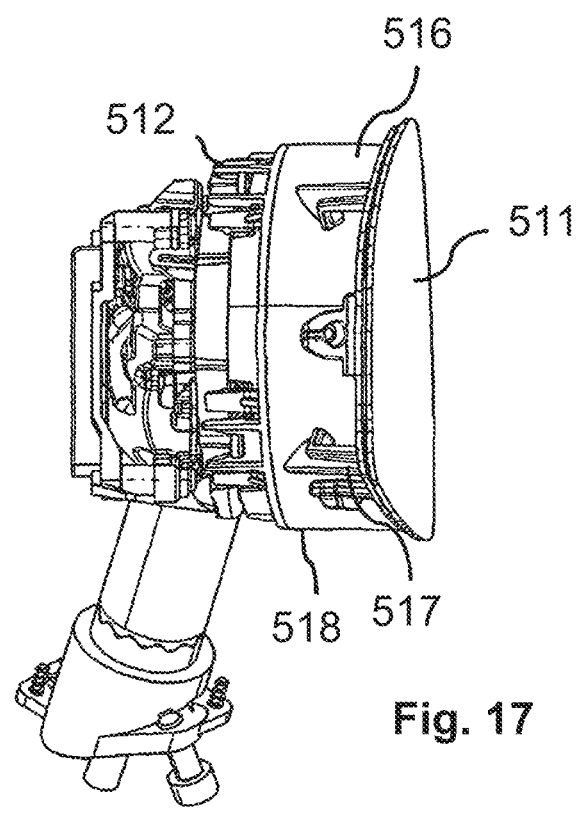

FIGS. 16 and 17 show the mirror housing construction without housing covers. The mirror base 502 is integrally connected to the mirror support 503'. The glass adjustment drive 515 is firmly installed on the mirror support 503'. In this example, the glass adjustment drive 515 is also a commercial drive with a hemispherical housing and a flat turntable 512. This rotary table 512 is rotated by the drive against the hemispherical housing. A mirror glass carrier 516, which carries the mirror glass 511, is mounted on the rotary table 512. In an example, the mirror glass carrier 516 is not only a flat plate, but is designed as a plate with a mount 518 connected thereto. The support 518 overcomes the distance between the turntable 512 of the glass adjustment drive and the mirror glass plane with the mirror glass 511.

Figure 18:
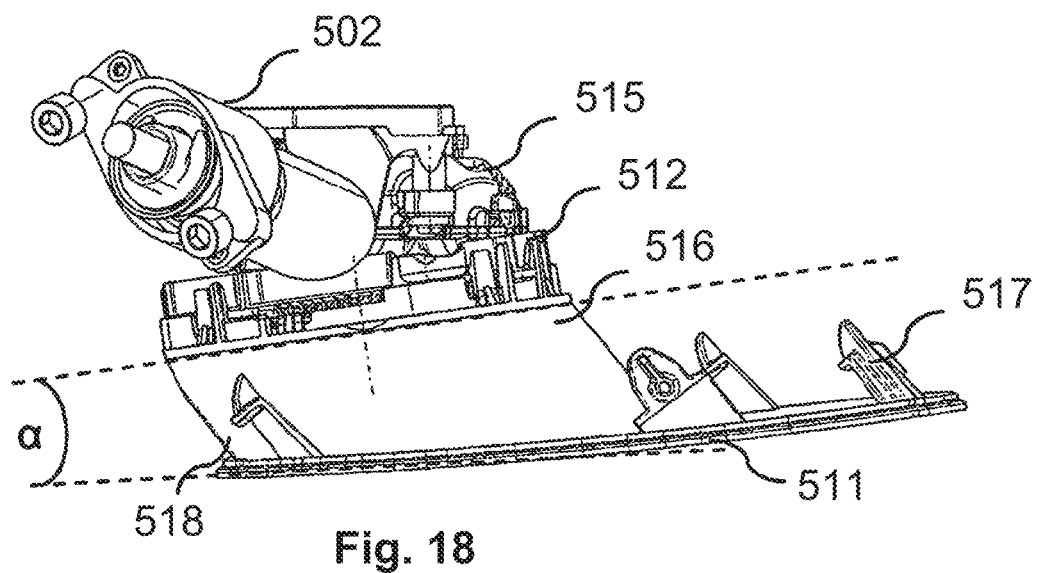

FIG. 18 shows that the mount 518 does not have a parallel construction between the turntable 512 of the glass adjustment drive and the mirror glass 511. The turntable 512 is inclined by an acute angle α against the mirror surface. For this purpose, the holder is designed as a hollow cylinder whose end faces are cut at different angles.

The mirror glass carrier 516 has clips 517 along the outer edge of the mirror glass. These clips 517 are received by counterparts in the housing cover 506 and serve for connection to the housing cover elements of the mirror head, such as the housing cap 506 and/or the housing frame 507. It does not matter here whether the housing cover is designed in one or more parts. The housing cover is rigidly connected to the mirror glass carrier 516 and the turntable 512 of the glass adjustment drive with the clips.

If the glass adjustment drive is activated and at least one of the adjustment elements is controlled, the turntable 512 of the glass adjustment drive 515 rotates against its hemispherical housing and the mirror support 503'. With the rotary table 512, the entire structure, consisting of the mirror glass support 516, the mirror glass 511 and the housing cover 506, rotates against the mirror support 503' and thus against the mirror base 502.

Figures 19, 20:
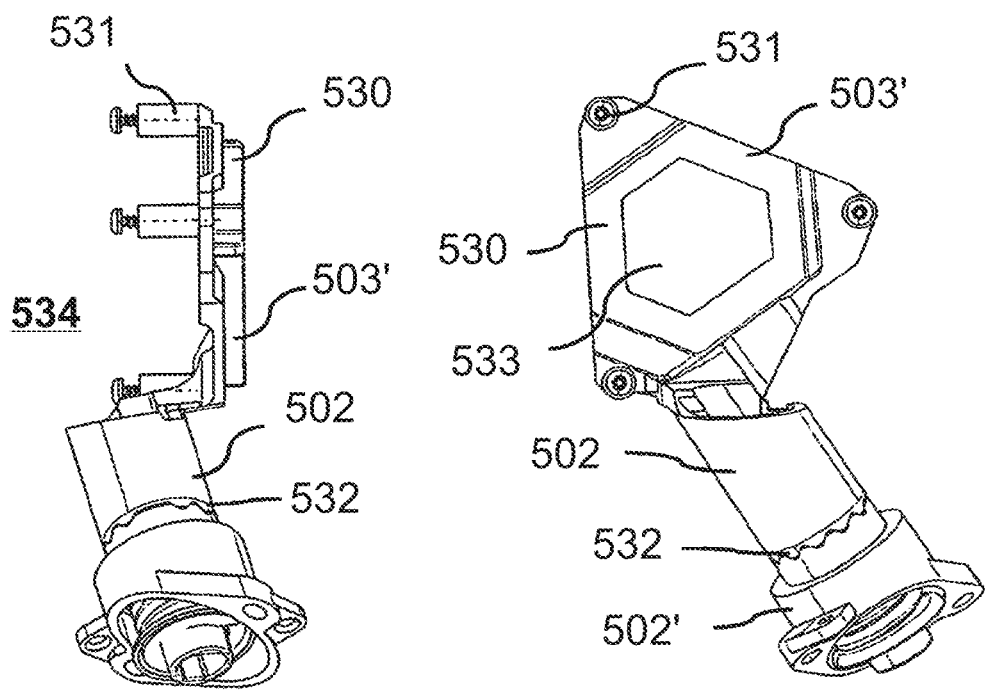
FIGS. 19 and 20 are diagrams illustrating a mirror foot.

FIGS. 19 and 20 show the mirror foot 502 with mirror support 503' as a one-piece component. In this exemplary embodiment, the mirror foot 502 is formed integrally with the mirror support 503' made of metal casting. However, it is also possible to use other materials such as fiber-reinforced plastic or other special plastics. The mirror support and the mirror foot can also be produced in several pieces and then rigidly connected to one another. Thus, the fastening element 502' serves for mechanical connection to the vehicle, but is rigidly connected to the mirror foot 502 in the case of use. It is only important that no movement is possible between mirror base 502 and mirror support 503'.

In this case, the mirror base 502 is designed as a hollow cylinder in order to allow the electrical connection to be carried out. The mirror foot can be configured in one or more parts. In FIGS. 19 and 20, the mirror foot 502 is constructed in several parts and has an unlocking line 532 which connects the hollow cylinder 502 with the fastening element 502' fastened to the vehicle. The disengagement line 532 is provided for the emergency and allows the mirror to break off at this point in the event of an impact. It will be appreciated that the mirror foot assembly is considered to be rigid in use, and the disengagement line is not seen as a possibility of movement for use.

The mirror foot 502 opens into the mirror carrier 503', which has been designed as a triangular plate 530, for example. The carrier plate 530 has webs 531, which are provided as screw domes for fastening the glass adjustment drive. In order to accommodate the hemispherical housing of the glass adjustment drive, the carrier plate 530 has a central recess 533. The semi-spherical housing of the glass adjustment drive then sits in this recess 533 and extends into the space 534 between the webs 531. For the rigid fastening of the glass adjustment drive, however, any other method such as clipping, pressing, welding, etc. can also be selected.

The adjustment of the mirror glass by adjusting the entire mirror head against the mirror base and the mirror foot cover takes place by deflecting the two motors of the glass adjustment drive in different distances and thus moving the rotary table 512 with the mirror support 516 and the mirror glass 511.

FIG. 16 shows the rotational axes of the glass adjustment drive with A and B. A movement around the B axis controls the position approximately by the horizontal, a movement about the A axis moves the mirror head near the vertical to or from the vehicle. This movement is performed asymmetrically in a preferred embodiment. Since the commercial glass adjustment drives are limited in the deflection and the wish is to apply the mirror head closer to the outer contour of the vehicle in a parking position, the mirror glass carrier plate 516 according to FIG. 18 is keyed with the angle alpha. As a result, the outer edge of the mirror head can be pivoted by a greater angle than would be possible in the adjustment path of the glass adjustment drive with a parallel construction.

Figure 21:
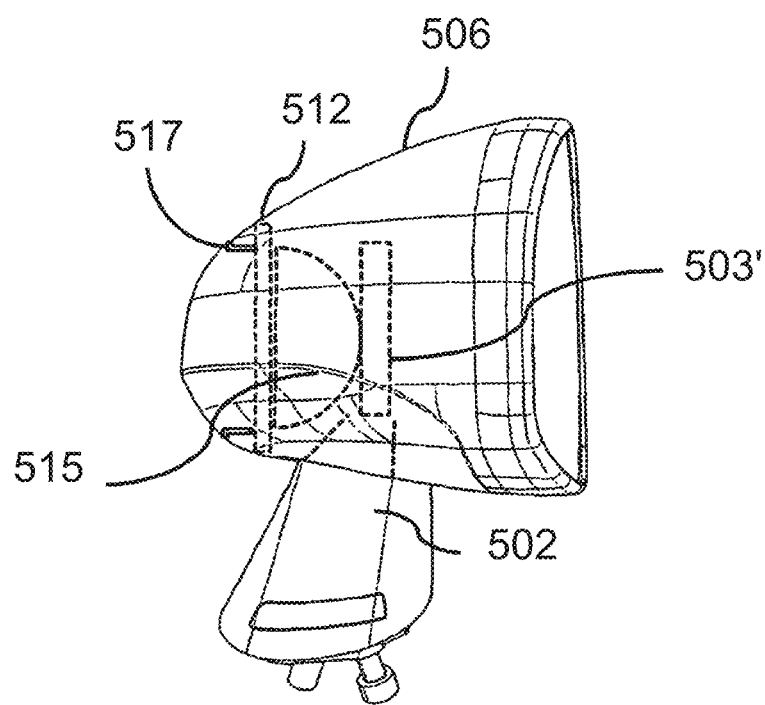
FIG. 21 is a diagram illustrating another solution of a rear view device.

FIG. 21 shows an alternative structure of the mirror adjustment. The glass adjusting drive 515 is installed with its surface 512 in such a way that the surface 512 points in the direction of the housing cap 506. The rotary table 512 of the glass adjusting drive 515 engages either directly or via a connecting plate 517 on the housing cap, which is rigidly connected to the mirror glass 511.

The electrical connection of the external rearview mirror is effected via the hollow mirror base 502. The electrical cables for the glass adjustment drive are carried out and connected directly to the drive. When a heatable mirror glass is used, the contacting of the mirror glass is achieved either directly via the glass adjusting motor 515 or, in the embodiment according to FIG. 9, separate contacts are laid with their own electrical supply line.

Another example of an external rear view mirror assembly for a motor vehicle includes a mirror base or foot provided for arrangement on the motor vehicle and a mirror head arranged on the mirror foot as well as a mirror glass accommodated in the mirror head and arranged rigidly and fixed non adjustably with respect thereto. This is described in European Patent No. 2 492 144, which is hereby incorporated by reference in its entirety for all purposes. At least one articulation is provided between the mirror head and the arrangement of the mirror foot on the motor vehicle, this articulation including a total of two articulation axes, the direction vectors of said articulation axes being independent of each other, and where the two articulation axes are associated, jointly and/or independently of each other. This may allow swiveling at least the mirror head from an operating position to a swung-in position and vice versa, and swinging-in at least the mirror head in and against the direction of motion, as well as adjusting an individual adjusting position of at least the mirror glass by adjusting the mirror head depending on, e.g., the seating position and the height of a driver of the motor vehicle. In addition, there may be provided a first adjusting drive driven by an electric motor and associated to a first articulation axis of the two articulation axes and a second adjusting drive driven by an electric motor and associated to a second articulation axis of the two articulation axes.

Figure 22:
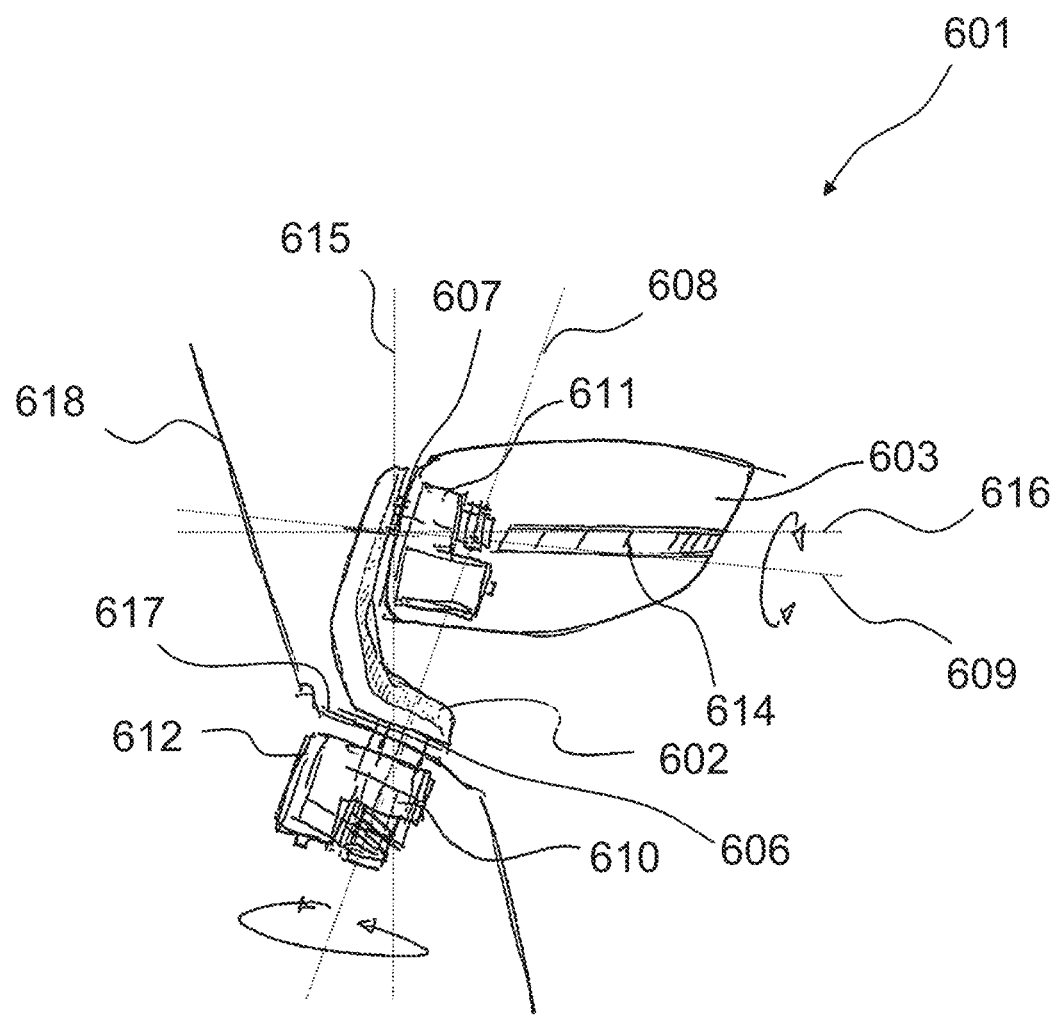
FIG. 22 is a diagram illustrating an exemplary embodiment of an external rear view arrangement for a motor vehicle in a partially sectioned front view.
Figure 23:
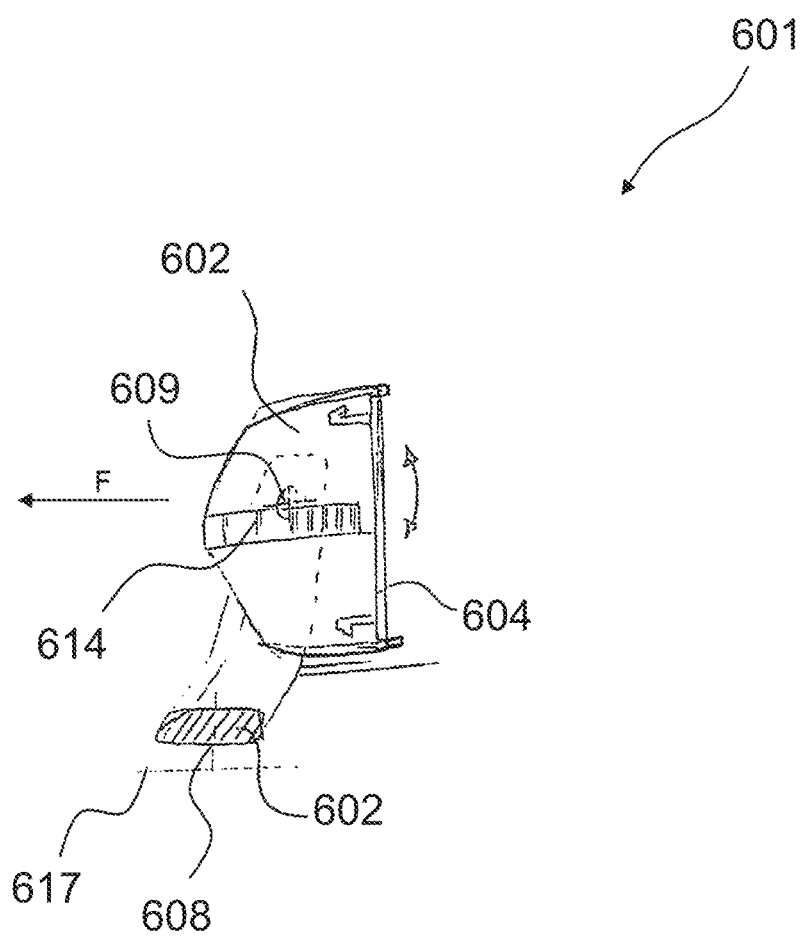
FIG. 23 is a diagram illustrating an external rearview arrangement from FIG. 22 in a partially sectioned side view.
Figure 24:
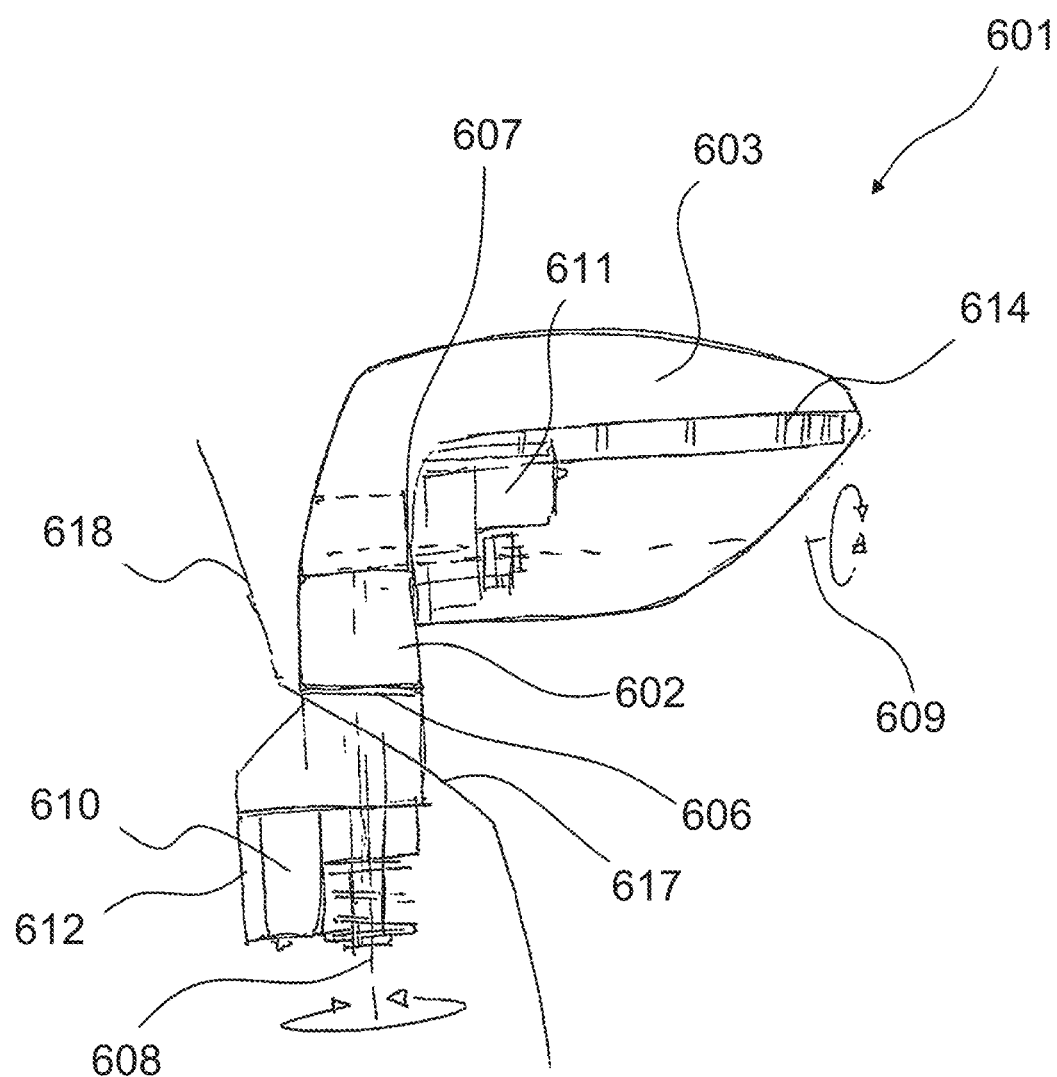
FIG. 24 is a diagram illustrating another exemplary embodiment of an exterior rearview arrangement for a motor vehicle in a partially cut-away front view.

Referring now to FIG. 22, rear view arrangement 601 for a motor vehicle includes of a base 602 provided for the motor vehicle-side arrangement and a head 603 arranged thereon, as well as a viewing means 604, which is accommodated in the head 603 and which is rigidly and fixedly arranged relative thereto. At least one articulated joint 605, 606, 607 is provided between the head 603 and the motor vehicle side of the base 602.

The at least one articulated connection 605, 606, 607 includes a total of two articulation axes 608, 609, the directional vectors which define the positions of the two articulation axes in the space are independent of each other.

Figure 25:
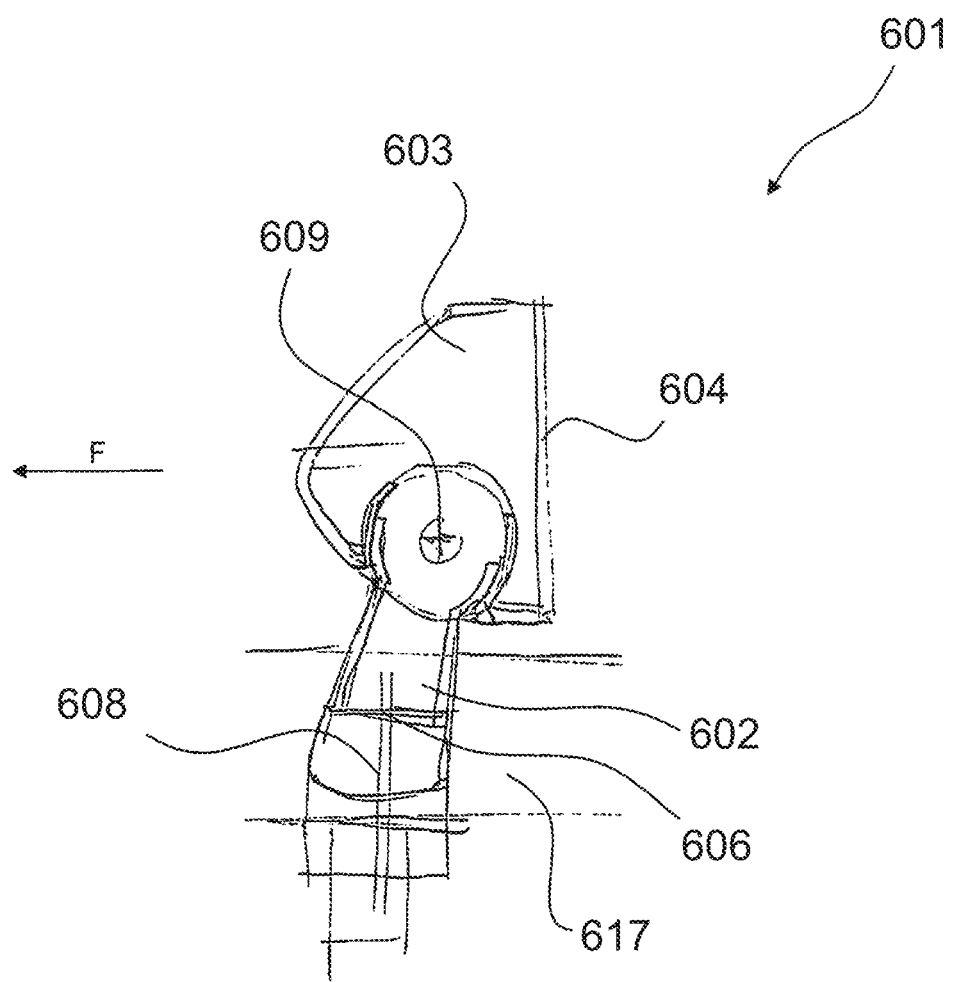
FIG. 25 is a diagram illustrating the external rear view arrangement from FIG. 24 in a partially sectioned side view.
Figure 26:
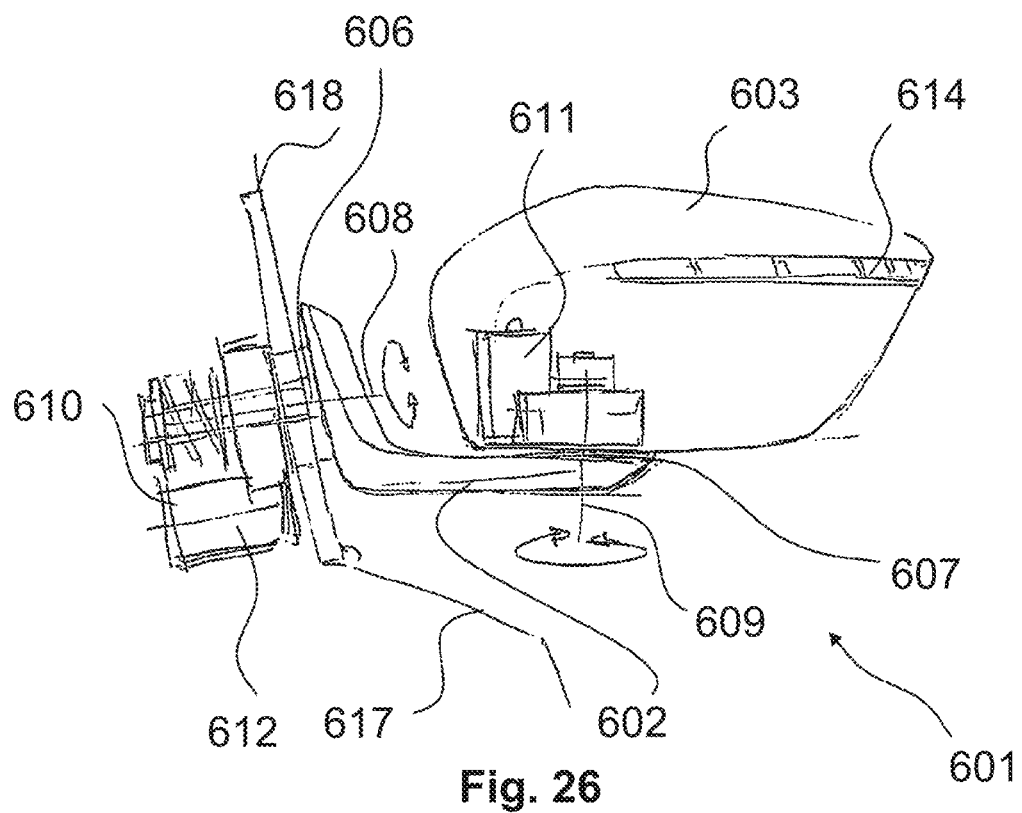
FIG. 26 is a diagram illustrating a further exemplary embodiment of an external rearview arrangement for a motor vehicle in a partially cut-away front view.
Figure 27:
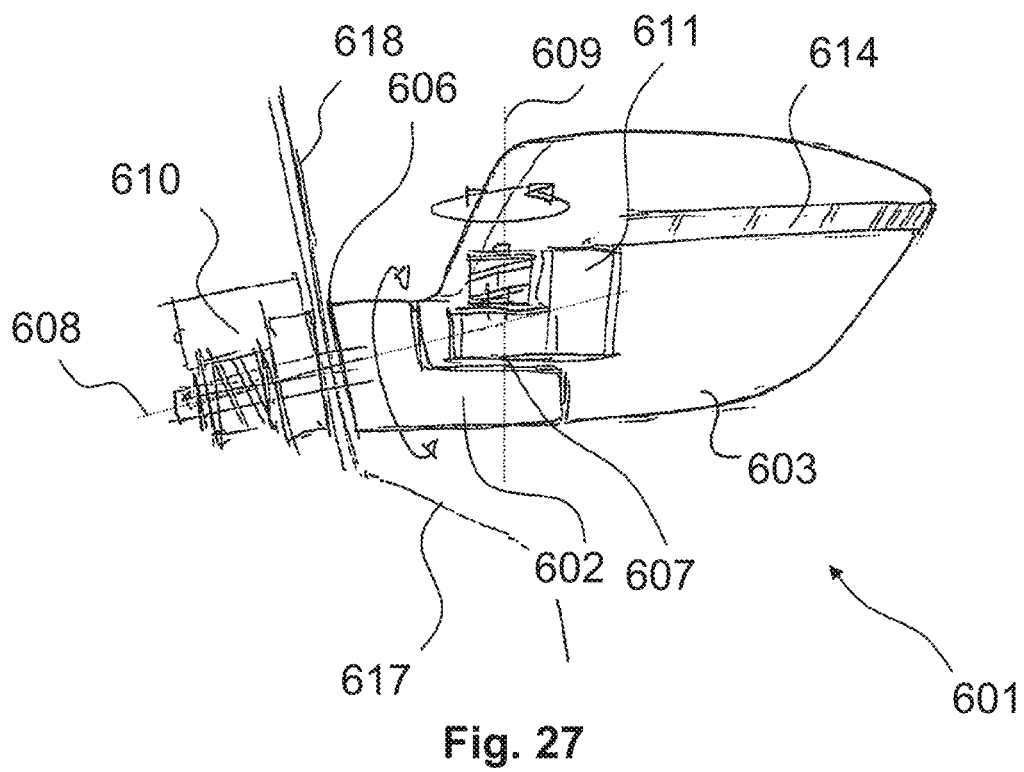
FIG. 27 is a diagram illustrating yet another exemplary embodiment of an exterior rearview arrangement for a motor vehicle in a partially cut-away front view.

The two joint axes 608, 609 are in each case joint and/or independent of one another. A pivoting movement at least of the mirror head 603 from an operating position into a folding position and vice versa, a folding at least of the mirror head 603 in and counter to the embodiment shown in FIG. 25 as indicated by the arrow F, as well as a setting of an individual adjustment position at least of the viewing means 604, depending, for example, on the seat position and the body size of a driver of the motor vehicle.

A first electromotive adjusting drive 610 is assigned to a first articulation axis 608 of the two articulated axes 608, A second electromotive adjusting drive 611 is assigned to a second articulation axis 609 of the two articulation axes 608. The exterior rear view arrangement 601 includes, collectively, the viewing mean 604 as at least one reflecting or mirrored surface, which can be viewed by a driver of the motor vehicle from the vehicle interior, for example, through a side window and provides insight into one or more areas of a vehicle environment including in the direction of the road from the driver's seat.

For example, to avoid glare by backward light sources, the viewing means 604 may be a mirror glass and an electrochromic dimming of the mirror glass can be provided. For this purpose, the mirror glass 604 can be designed as an electrochromatically dimmable mirror glass.

The first joint axis 608 and the second joint axis 609 can intersect each other as shown in FIGS. 26 to 30. For example, the first joint axis 608 and the second joint axis 609 intersect at a right angle, as in the case of the embodiments shown in FIGS. 28 to 30.

Rear view arrangements 601 are provided. Alternatively, the first articulation axis 608 and the second articulation axis 609 can be wind-wise relative to one another as shown in FIGS. 22 to 25. One of the two articulated axes 608, 609 can be as shown in FIGS. 24, 25, 28 and 29, and in the case of the arrangement of the rear view arrangement 601 on the side of the vehicle, the rearview arrangement 601 is essentially approximately vertical.

In another example, one of the two articulated axles 608, 609 can be as shown in FIGS. 24, 25, 28 and 29, and be substantially approximately horizontal when the rear view arrangement 601 is arranged on the vehicle side.

Referring to FIGS. 5 and 6, it is also possible for the position of the second articulation axis 609 in the space, during a pivoting or pivoting movement, to adjust about the first articulation axis 608. In order to meet the various possible positions of the joint axes 608, 609, the two electromotive adjusting drives 610, 611 are preferably controllable independently of one another.

If desired, controls commands for the first electromotive adjusting drive 610 and for the second electromotive adjusting drive 611 are generated by a control device 612 which control the latter outwards by pivoting and/or adjusting around the two joint axes 608. Pivoting and/or adjusting by at least one desired pivoting axis of the imaginary axis 615, 616, which is identical to the adjusting axis, is executed.

The articulated connection 606, includes the first articulation axis 608, is provided for the arrangement of the mirror base 602 on the motor vehicle side. Moreover, in the case of these external rearview arrangements 601, the articulated connection 607 between the mirror foot 602 and the mirror head 603 including the second articulation axis 609 is provided.

Figure 29:
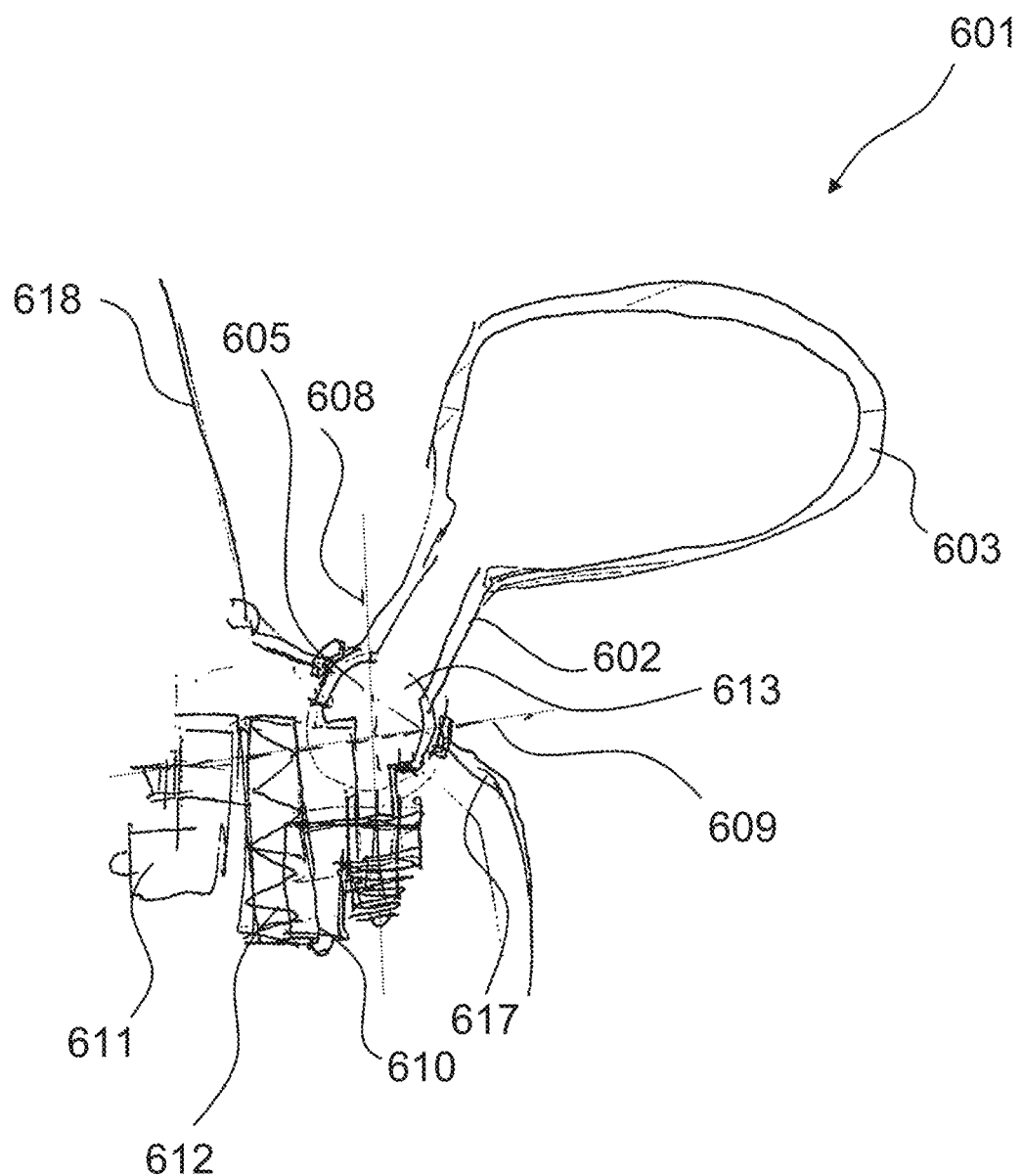
FIG. 29 is a diagram illustrating yet another exemplary embodiment of an exterior rearview arrangement for a motor vehicle in a partially cut-away front view.
Figure 30:
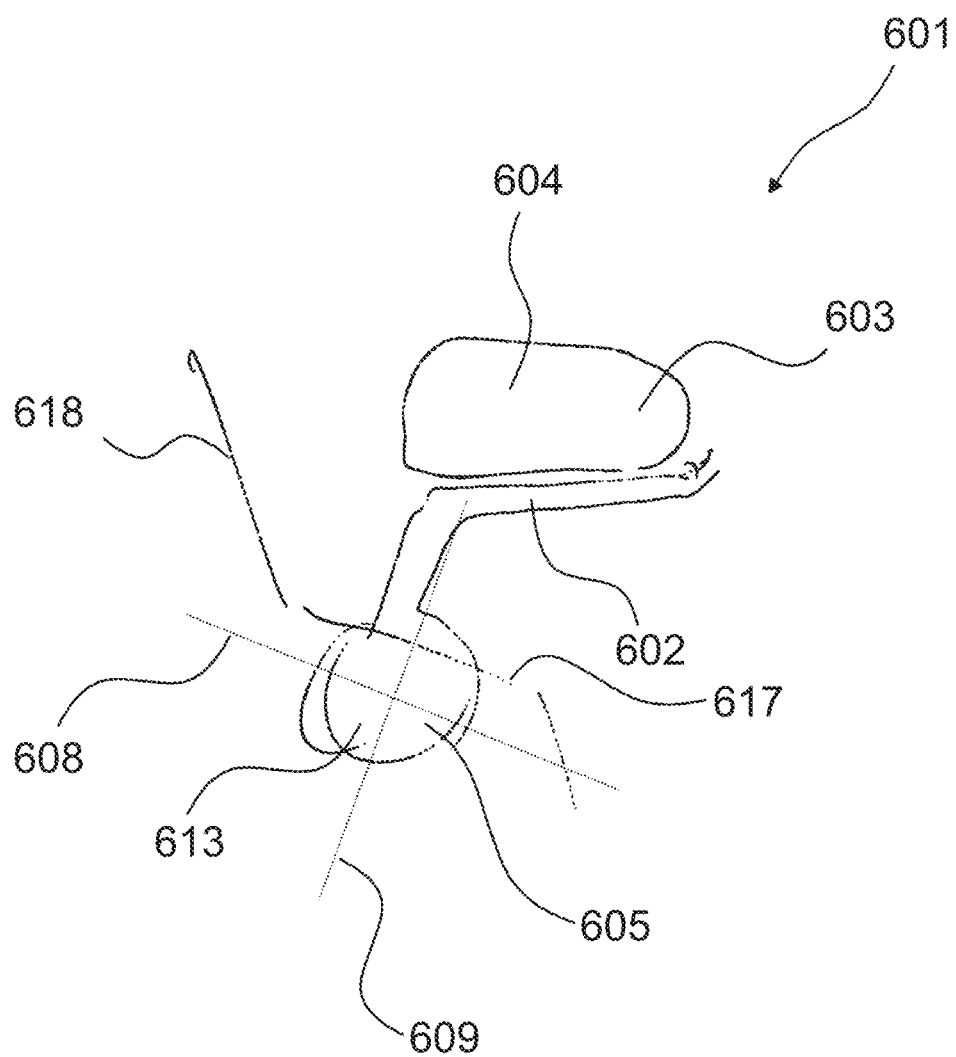
FIG. 30 is a diagram illustrating yet another exemplary embodiment of an exterior rearview arrangement for a motor vehicle.

In the case of the rearview mirror arrangements 601 shown in FIGS. 29 and 30, the articulated connection 605 comprising both the first articulation axis 608 and the second articulation axis 609 is provided for the arrangement of the mirror foot 602 on the motor vehicle side. In another example, the articulated connection 605 including both the first articulation axis 608 and the second articulation axis 609 is provided between the mirror foot 602 and the mirror head 603 of the rearview arrangement 601.

Depending on the configuration of the rearview arrangement 601, at least one of the two electromotive adjustment drives 610, 611 can be rigidly connected on the vehicle side. In the embodiments shown in FIGS. 22, 24, 26 and 27, the first electric adjustment drive 610 is assigned to the first articulation axis 608.

Figure 28:
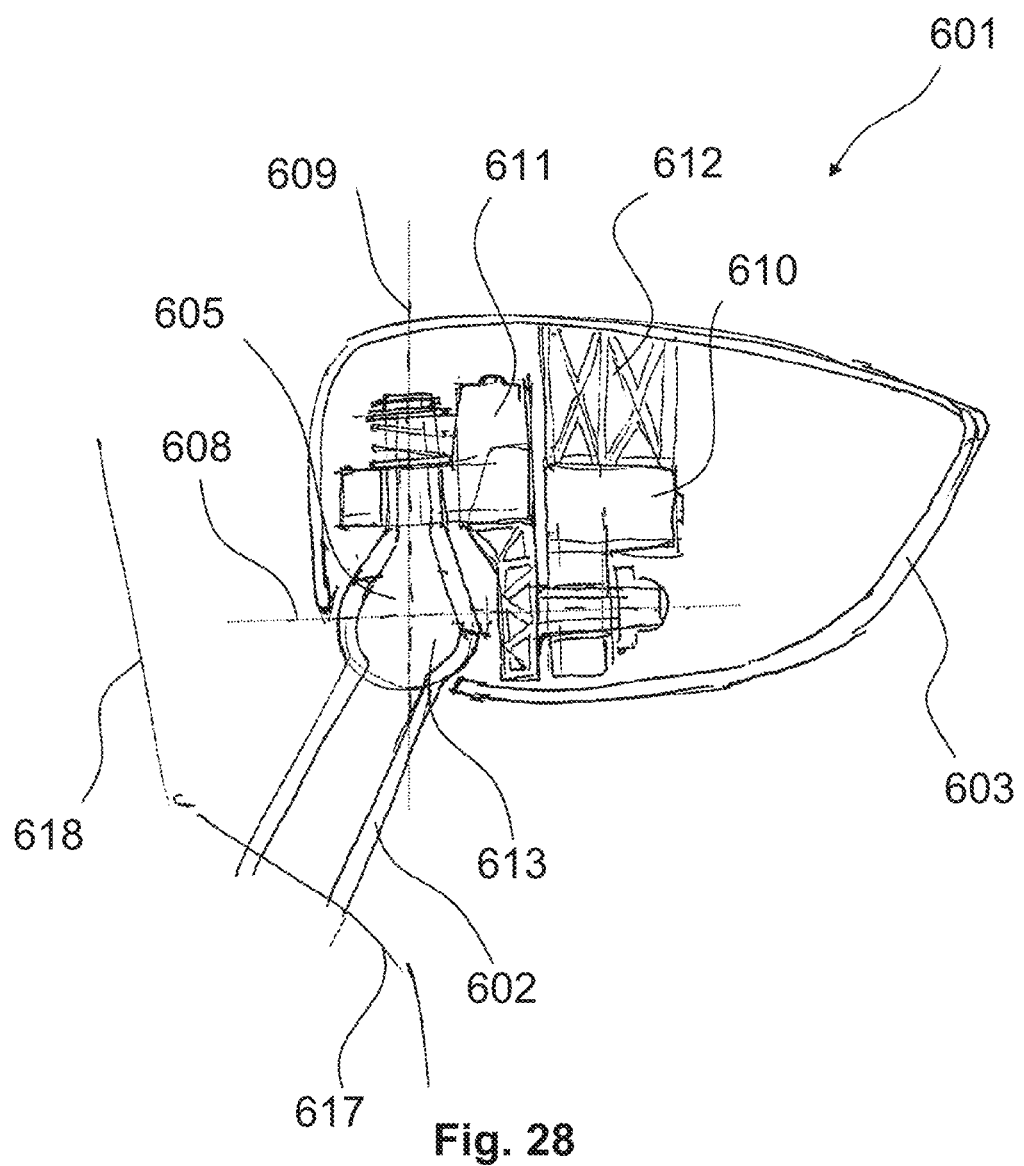
FIG. 28 is a diagram illustrating yet another exemplary embodiment of an external rearview arrangement for a motor vehicle in a partially cut-away front view.

The at least one articulated connection 605 can be realized by a ball joint 613 as shown in FIGS. 28, 29 and 30. This has the advantage that both articulated axes 608, 609 are encompassed by the articulated connection 605 or are formed by the latter. A further advantage results from the fact that both the first electromotive adjusting drive 610 is assigned to the first articulation axis 608 and the second electromotive adjusting drive 610 associated with the second articulation axis 609 can be rigidly connected on the vehicle side.

The ball joint 613 can be provided, as in FIGS. 29 and 30, for the arrangement of the mirror base 602 on the vehicle side, or as shown in FIG. 28 for producing the articulated connection 605 between the mirror head 603 and the mirror base 602. In FIG. 28, the mirror base 602 is rigidly arranged on the vehicle side or is provided to the rigid vehicle-side arrangement.

Referring to FIGS. 22-27, the rearview arrangement 601 can accommodate a repeat flashing light 614, for example, in the mirror head 603. Depending on the configuration, the rear view mirror arrangements 601 can be mounted on a door brace 617 (FIGS. 22-25 and FIGS. 28-30), preferably from a substantially vertical vehicle surface 618. The rear view assemblies 601 may provide a standing or hanging arrangement of the head 603 on the base.

The rearview arrangement shown in FIG. 30 shows a particular embodiment. In this case, the head 603 can be completely covered by the viewing means 604, and can be a part of the viewing means 604, or encompass it.

Further to the above described examples, preferred dimensions for the radius of curvature may vary between the curved mirror or rear view means and a substantially flat mirror or rear view means. For example, to achieve a wider field of view, the curved mirror may have a radius of curvature that is between 0 mm and 1,300 mm. The flat mirror may be entirely flat or may be slightly curved having a significantly larger radius of curvature. In addition, a flat mirror includes a mirror which provides a user with a one to one ratio of magnification. That is, the viewed image may be the same dimensions as the actual image with a 2% plus or minus degree of distortion.

In addition, as described in multiple embodiments above, the curved mirror may be tilted with respect to the flat mirror, or the flat mirror may be tilted with respect to the curved mirror. Also, both mirrors may be selectively adjustable by an actuator or manually by a user, being both adjustable together and separately with respect to one another. The preferred positions for the angle of the one mirror, for example the curved mirror, with respect to the other mirror, for example the flat mirror, is between +40 degrees and −40 degrees outwardly, inwardly, upwardly, or downwardly. As used herein, the terms outwardly refers to tilting the mirror away from the door of the vehicle, inwardly refers to tilting the mirror toward the door of the vehicle, upwardly refers to tilting the mirror toward the sky, and downwardly refers to tilting the mirror toward the surface of the road.

The rearview device can also be equipped with different illumination devices.

Figure 31A:
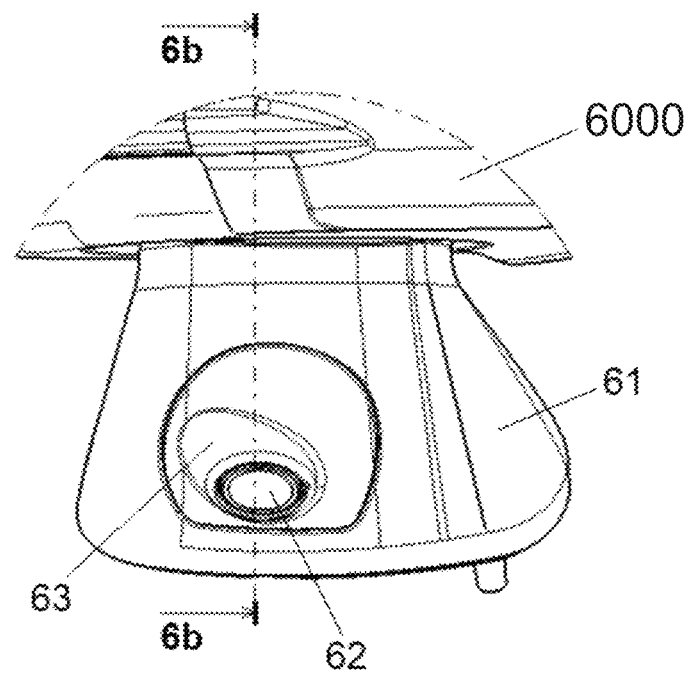
FIGS. 31A and 31B are diagrams illustrating a front view of a camera located within the base assembly and a respective section view along the line 6b-6b illustrated in FIG. 6A.
Figure 31B:
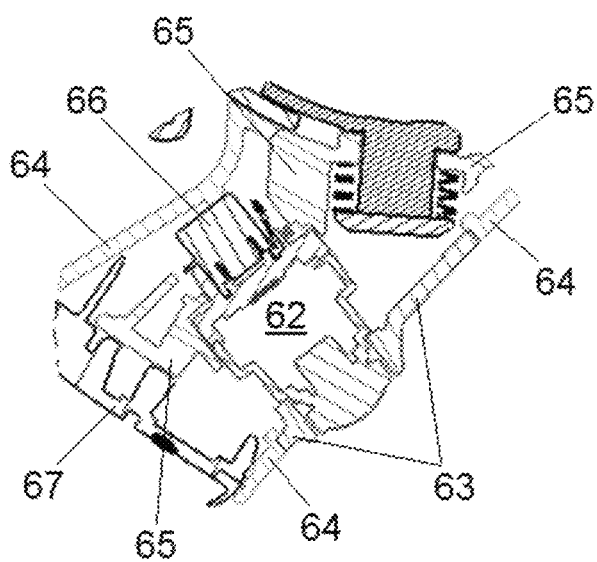

Referring to FIGS. 31A and 31B, due to the movement of the head assembly 6000, a non-moving area for securing a camera 62 may be used. In this example, the camera 62 is positioned in a solid, non-moving area which does not move when the head actuates. FIGS. 31A and 31B show the camera 62 located in the mirror base assembly 61 fixed on the base frame 65 with a camera connector 66. The camera 62 is covered by a base cap 63 and the base assembly is covered by a base cover 64 and secured via a gasket 67 to a motor vehicle (not shown). FIG. 31B illustrates a section view along the line 6b-6b of FIG. 31A. In this example, the camera 62 is fixed in the mirror base assembly 61 of the rear view means.

Figure 32:
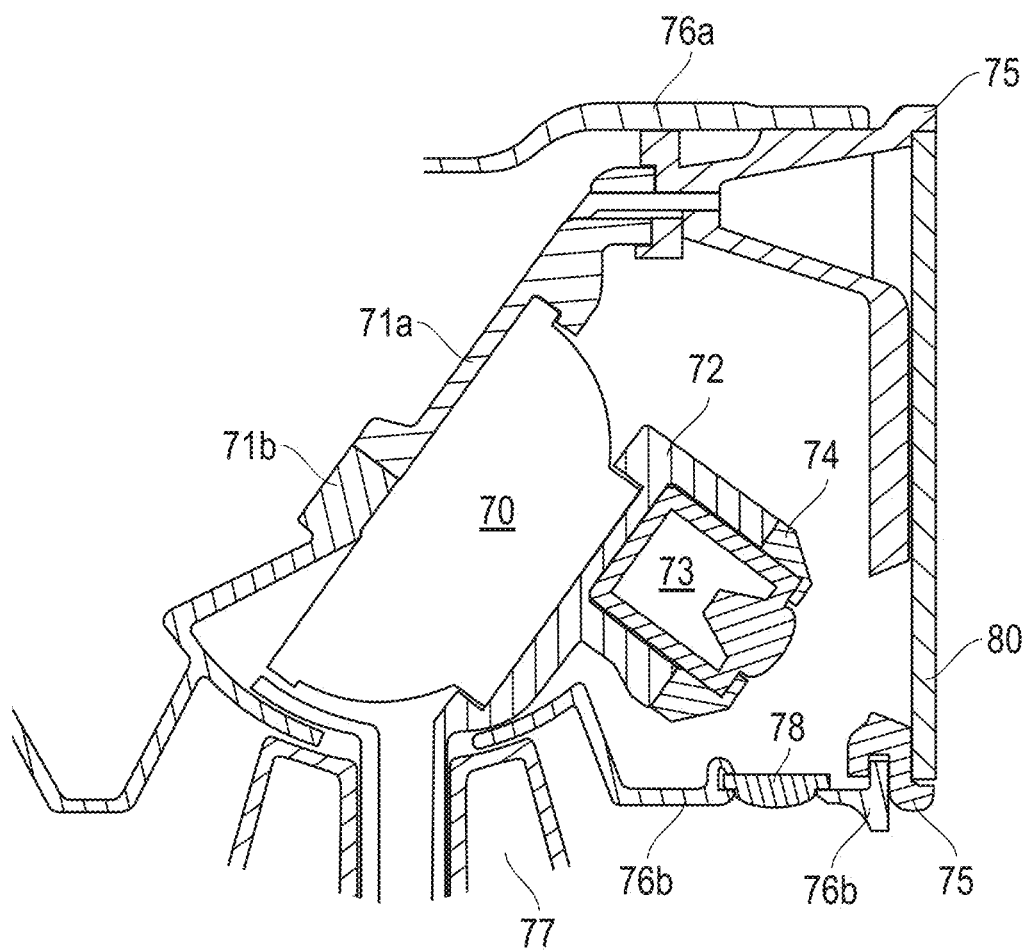
FIG. 32 is a diagram illustrating a side cross-sectional view of the head assembly with a camera located on a fixed base frame.

In another example, the camera may be fixed to the head assembly 6000. As shown in FIG. 32, the camera 73 is mounted on the base frame 72 that is connected to the base assembly 77. Attached to the base frame 72, as well, is the articulation assembly 70 that moves the mirror head connected via the upper cradle 71a and lower cradle 71b. The upper casing element 76a is connected to the upper cradle 71a, and the lower casing element 76b is connected to the lower cradle 71b. The head assembly is finally locked through a bezel 75 that carries the mirror glass 80.

The camera 73 is fixed by a camera cradle 74 and is directed to view through an opening in the bezel 75 through the glass 80 and/or to view under the mirror through a lens 78, which is installed in the lower casing element 76b. As in the configuration of FIGS. 31A and 31B, the camera of FIG. 32 is secured to a solid, non-moving area that does not move when the head actuates. The camera 73 is packaged into the case frame of the head assembly 6000. This provides the camera 73 with a number of different fields of view; in particular, producing at least images of the rear of the vehicle, the side of the vehicle, the front of the vehicle, or the underneath the mirror or the vehicle. In the illustrated example, the camera 73 is directed to view behind the vehicle through the glass 80 and underneath the mirror through the lens 78.

Figure 33A:
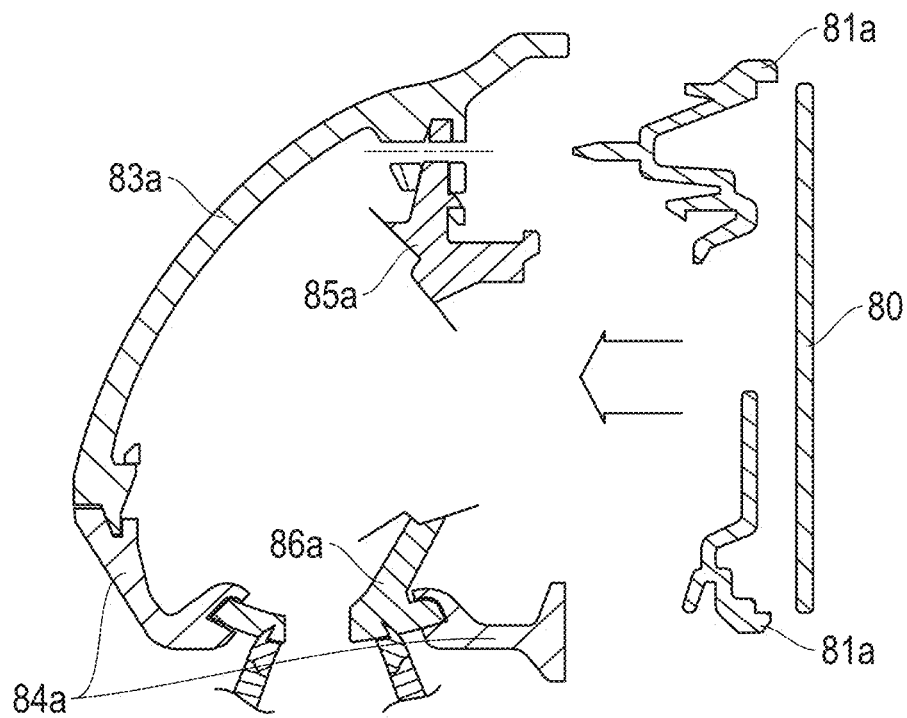
FIG. 33A is a diagram illustrating a side cross-sectional view of a head assembly depicting the way of attachment of the cassette bezel.
Figure 33B:
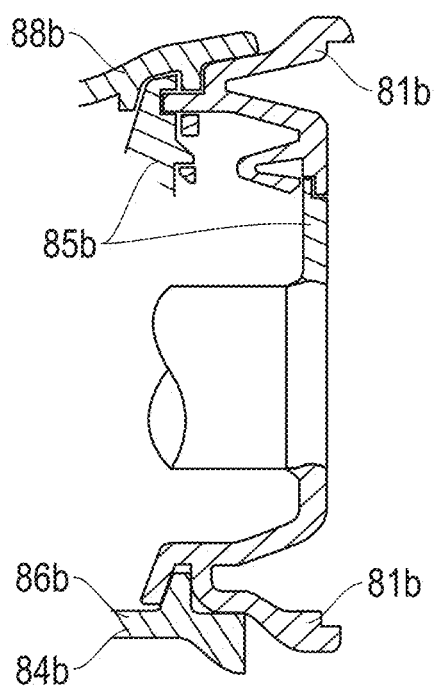
FIGS. 33B and 33C are diagrams illustrating side sections views of the front of a head assembly with two possible attachment types of the cassette bezel.
Figure 33C:
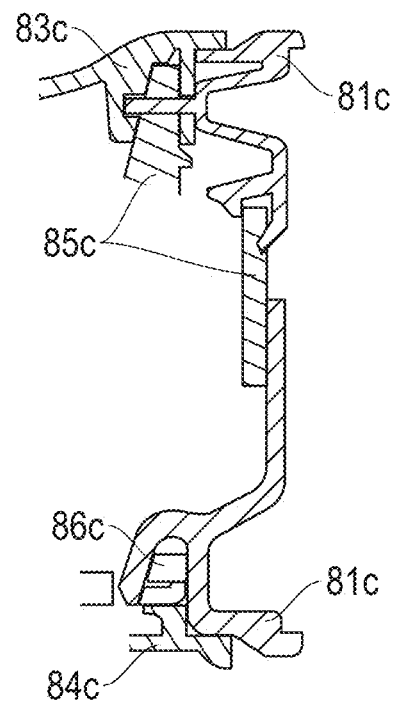

Referring to FIGS. 33A, 33B, 33C, and 33D a cassette bezel 81a, 81b, and 81c may be used in combination with the head assembly 6000 described throughout this application. The head unit may be supplied without the glass, bezel, or scalp being attached, thus allowing for late configuration and adjustability by the customer. There are a number of different ways that the cassette bezel 81a, 81b, 81c may be attached, as illustrated in FIGS. 33A, 33B, and 33C. Different glass 80 types may be attached to the head assembly in a removable way and provide the final locking system to control the head assembly retention and alignment of the mirror head. Different substitutable glass types include, but are not limited to, standard glass or EC glass. Different substitutable bezel types include, but are not limited to, standard bezels or bezels including lighting elements and functionalities.

Figure 33D:
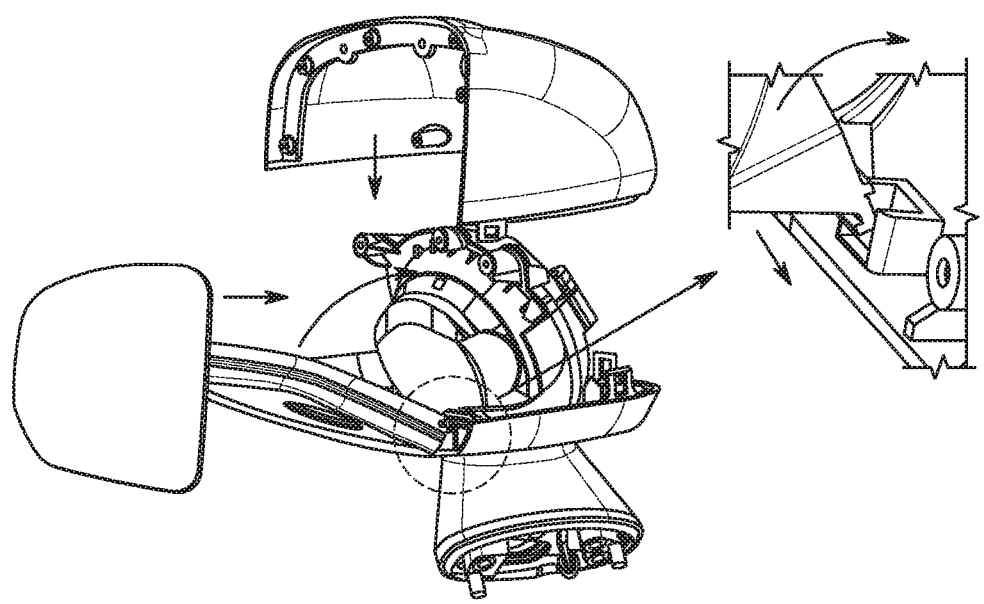
FIG. 33D is a diagram illustrating a perspective view of the head assembly with the cassette bezel being attached thereto.

The cassette bezels 81a, 81b, 81c are single, unitary parts and they are first latched over the lower casing elements 84a, 84b, 84c and/or respectively partly in combination with the lower cradles 86a, 86b, 86c. Once latched to the lower casing elements 84a, 84b, 84c, the cassette bezels 81a, 81b, 81c are then rotatable about the lower casing elements 84a, 84b, 84c almost as if hingedly attached. The cassette bezels 81a, 81b, 81c then tilt into the upper cradles 85a, 85b, 85c, to also lock to the upper casing elements 83a, 83b, 83c. FIG. 33D best illustrates the cassette bezels 81a, 81b, 81c as attached to the lower casing elements 84a, 84b, 84c and before being tilted to attach to the upper casing elements 83a, 83b, 83c.

Referring back to FIGS. 33A, 33B, and 33C, the linking portion of the bezels 81a, 81b, 81c which attaches to the lower casing elements 84a, 84b, 84c may have at least three different configurations including tapered square male-female attachment, as in FIG. 33A, tapered square male-female attachment with an extended support area, as in FIG. 33B, and a curved attachment with an extended support area, as in FIG. 33C. Also, the linking portion of the bezels 81a, 81b, 81c which attaches to the upper casing elements 83a, 83b, 83c may have at least three different configurations such as a tapered projection extending through the upper cradle 85a, as in FIG. 33A, a rectangular projection extending only partly into the upper cradle 85b, as in FIG. 33B, or a rectangular projection extending through the upper cradle 85c. A number of other configurations can also be used and the invention is not limited to these configurations.

FIGS. 34A, 34B, and 34C are diagrams illustrating a support mechanism for the articulation assembly inside the head assembly. As the articulation assembly 90 is the mechanical fixing point between the moving mirror head and the fixed base, it needs protection from downward load exerted on the mirror head. It should be noted that the configuration of the articulation assembly 90 in this example is opposite to the example illustrated in FIGS. 8-12B. That is, the moving part of the articulation assembly 90 of this example is the spherical portion having the larger diameter shown on the left hand side of the drawing, and the non-moving part of the articulation assembly 90 is the fixed part with the smaller diameter shown on the right hand side of the drawing. As can be seen in FIGS. 34A, 34B, and 34C, additional support is provided by a bracket mounted on the fixed base frame 93 hugging the articulation assembly 90 with two elongated hole rings, one on each opposite side of the articulation assembly 90. Through the holes an upper cradle 91 mounted on the articulation assembly 90 and a lower cradle 92 mounted on the mirror head are joined to each other allowing rotational movement inboard/outboard and up/down. The elongated hole case frame rings create the locking mechanism and provide the inboard and outboard stops.

FIG. 34B is a cross-sectional view showing the attachment of the upper cradle 91 to the lower cradle 92 and the hole of the base frame 93 along the line 9b-9b of FIG. 34A. As shown in FIG. 34B, the upper cradle 91 and lower cradle 92 are fixedly attached and move together to one end or the other end of the hole of the base frame 93 as the mirror is actuated to move inboard or outboard. Referring to FIG. 34C, a cross-sectional view showing the attachment of the upper cradle 91 to the lower cradle 92 along the line 9c-9c of FIG. 34A is illustrated. As the mirror is actuated to move up or down, the upper cradle 91 and lower cradle 92 move together within the hole of the fixed base frame 93. The base frame 93 is thus a fixed surface which acts to cover the articulation assembly 90 and encompass the articulation assembly 90 to support downward or other types of load.

Figure 35:
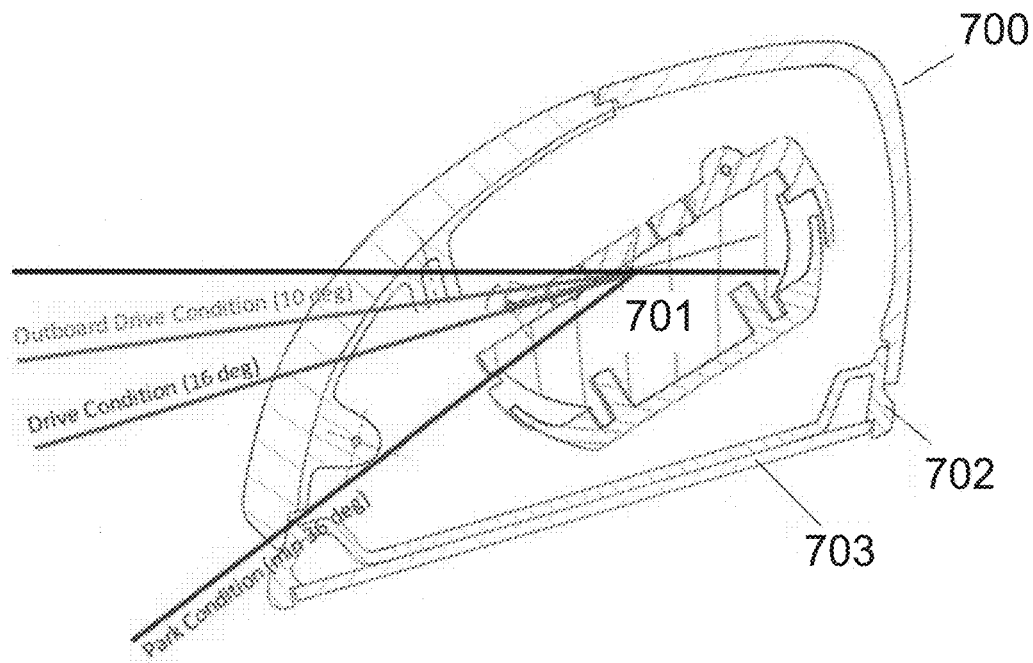
FIG. 35 is a top down section view of the head assembly depicting the various head conditions achieved by a single 2 axis articulation assembly.

FIG. 35 is a diagram illustrating a top down section view of the head assembly depicting the various head conditions achieved by a single 2 axis articulation assembly. A park fold position of the mirror head assembly 700 can be provided using the same articulation assembly 701 that is used to set the mirror in drive condition with a single 2 axis glass actuator orientated to utilize the full angular working range, as illustrated in FIG. 35.

Figures 36A, 36B:
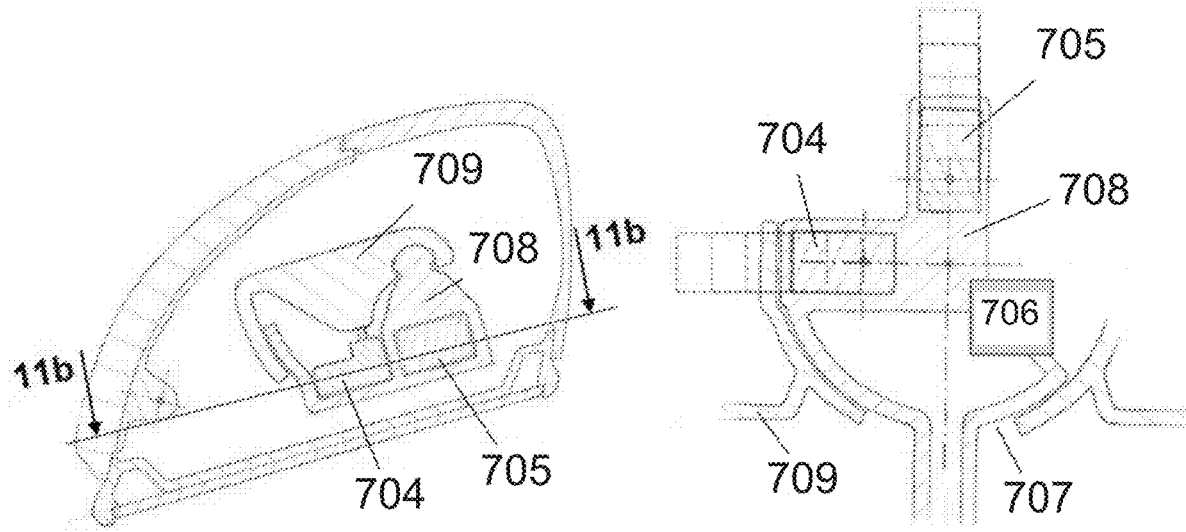
FIGS. 36A and 36B are diagrams illustrating a top down section view of the head assembly with a articulation assembly of 2 single actuators and a respective section view.

In another example, FIGS. 36A and 36B show an assembly with 2 single axis actuators 704 and 705 positioned independently of each other, along the mirror head rotational axis, controlled by integrated memory circuits or a separate memory module 706. Referring to FIG. 36B, a cross-sectional view along the line 11b-11b of FIG. 36A is shown with the two independent single axis actuators 704, 705 also illustrated. The two independent actuators allow the mirror to be adjusted inboard/outboard and up/down according to the desire of the driver. As with the articulation assembly described throughout this application, the two independent single axis actuators 704, 705 are also configured to allow adjustment of the mirror between an outboard drive condition, a standard drive condition, a park condition, and conditions therebetween.

FIG. 37 is a diagram illustrating a plan view of a fixed glass mirror assembly with the mirror head in the drive position on the left side and the mirror head in the fold position on the right side.

Referring to FIG. 37, a 'fold' position/angle can be customer bespoke by utilizing an integrated memory sensors (not shown) within the glass actuator. For example, pre-set mirror positions can be programmed offering flexibility of the nominal head angles to meet multiple set up conditions. In an example, pre-set mirror angles can be programmed at the point of assembly. The individual pre set memory function may remain functional for all users. This allows for increased versatility in folding functionality of the side-view mirror. Accordingly, the end customer has the ability to determine the power fold stop position. This is achieved using a memory positioning function system within the actuator which is commonly used to set-up each individual driver's preferred positions, and can further be used to set bespoke mirror fold & park positions so that the position of the mirror once parked can be set to each users' preference.

FIGS. 38A, 38B, and 38C are diagrams illustrating a fixed glass mirror assembly with a combined side turn indicator module and blind spot monitor module as a common assembly.

Referring to FIG. 38A, a Side turn indicator (STI) and Blind Spot Monitor (BSM) are provided as a single lighting module as opposed to being two separate lighting modules. The mirror is provided with a glass 800 and a bezel 801. Also illustrated in FIG. 38A is an outside view of the indicator or light for the Blind Spot Monitor 802 provided in the glass 800 and the Side Turn Indicator 803 at the side of the bezel 801. With the fixed glass mirror assembly the relationship of the BSM module to the STI module is now fixed so this allows for the two modules to become one common assembly.

FIGS. 38B and 38C illustrate the details of the combine STI and BSM modules. The STI and BSM modules are combined into one smaller module assembly, which may be integrated into the case lower component. Combining the two modules gives the option to control them with the same or separate PCB/light sources. This also provides lower manufacturing cost, fewer parts and a more simple system that provides system & performance advantages. Referring to FIGS. 38B and 38C, the internal components of the combined STI and BSM module 804 is illustrated and a connecting rib 805 is provided between the BSM portion and the STI portion of the combined module. A cross section further illustrating the inner portion and connection of the combined module with the bezel 801 and the glass 800 is provided in FIG. 38C.

Figure 39:
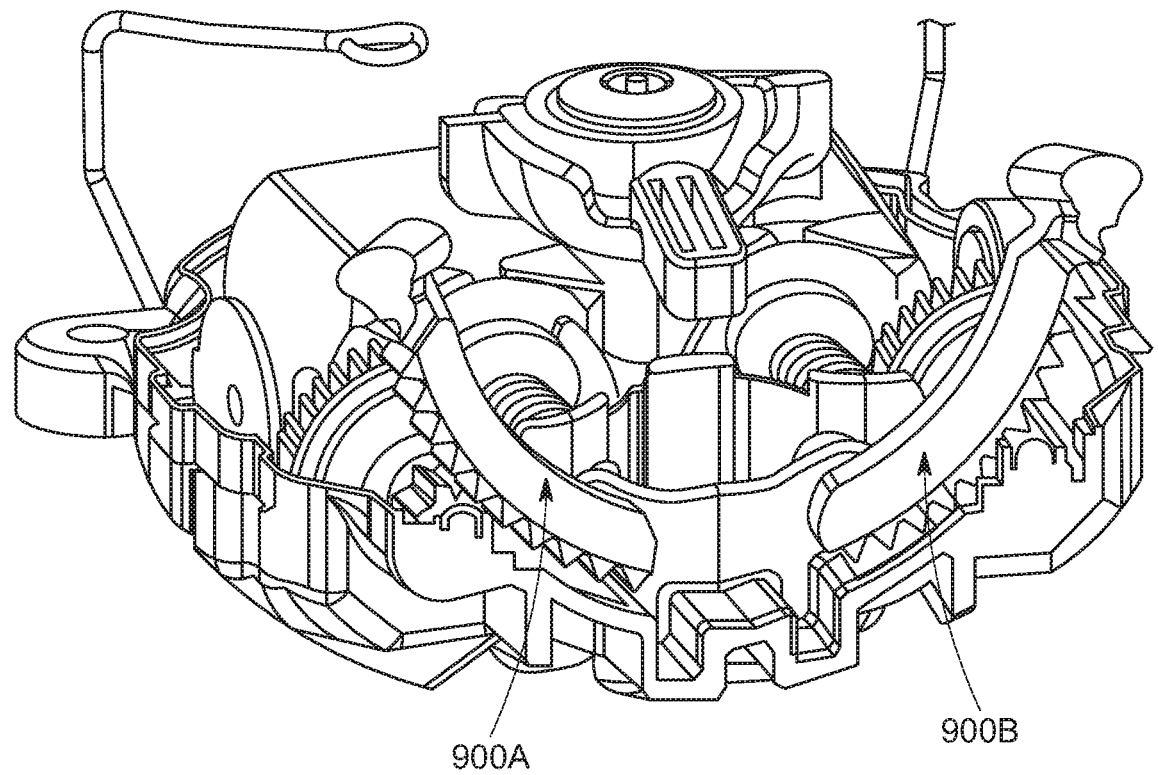
FIGS. 39 and 40 are diagrams illustrating an actuator having motor jacks of different lengths to allow for increased horizontal axis movement and decreased vertical movement.
Figure 40:
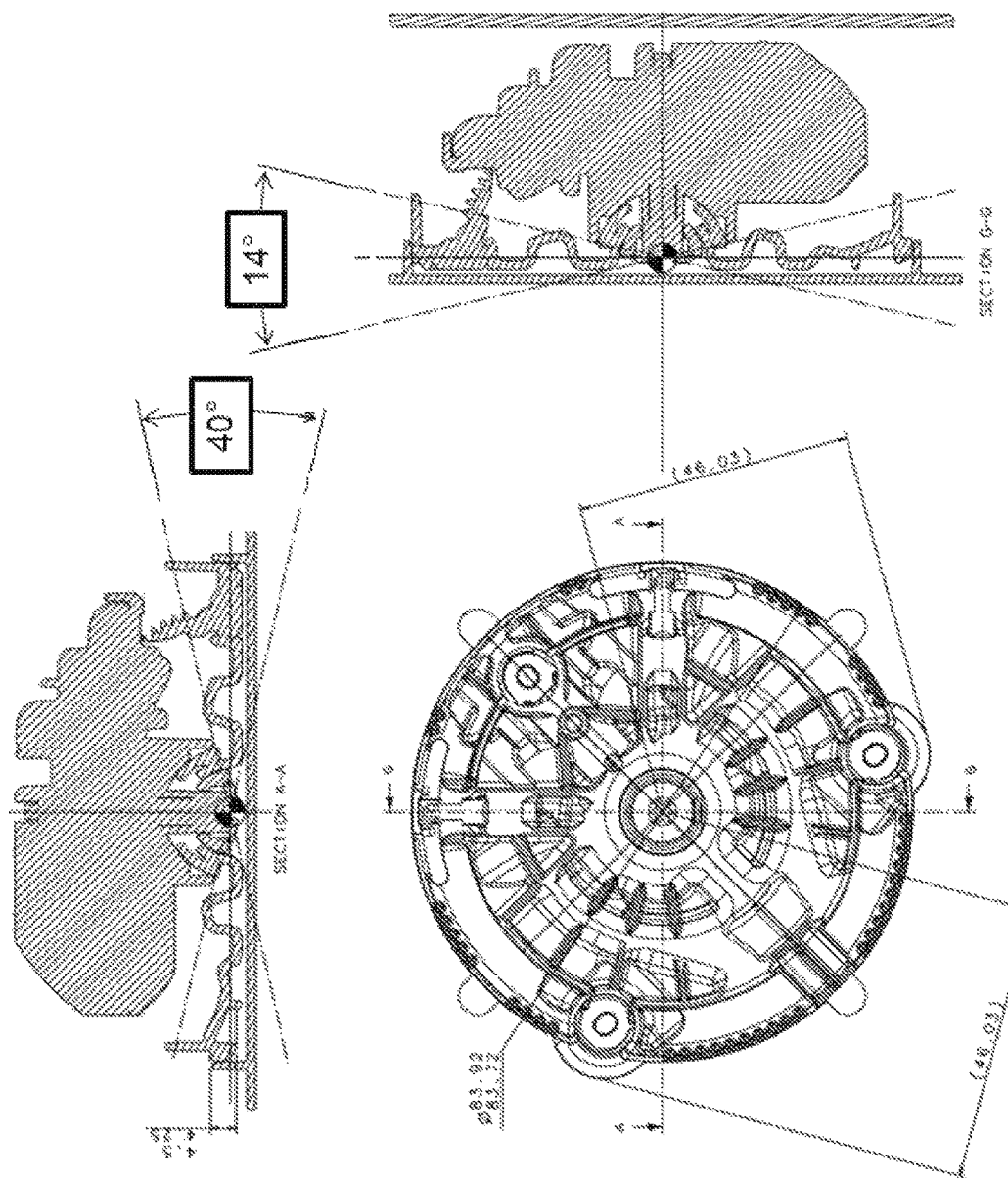

FIGS. 39 and 40 are diagrams illustrating an actuator having motor jacks of different lengths to allow for increased horizontal axis movement and decreased vertical movement.

Referring to FIG. 39, motor jacks 900A, 900B are provided in unequal lengths in order to allow for increased horizontal axis movement and decreased vertical movement within the same packaging space.

Increased rotation or movement on one axis only of a normal glass actuator allows fulfillment of power fold movement for a fixed glass mirror. The extended horizontal movement, in other words, the in/out movement of the mirror allows the use of a single actuator without the need to have an additional dedicated folding actuator unit to fulfil the fold & park function within the mirror. This provides the advantage of having a single actuator providing the function that two actuators typically provide, i.e. removing the need for a dedicated actuator to position the mirror in the park position. In an aspect, advantages include replacing the noisier power fold actuator which is typically used for the fold and park function, allowing the smaller fixed glass mirror to be reduced in size permitting smaller mirrors on cars and reducing vehicle drag values reducing $CO_2$, as well as reducing manufacturing costs. The longer horizontal travel of the mirror allows approximately an additional degree of movement which is a complete movement that satisfies market requirements; for example, 14 additional degrees are enabled.

FIG. 40 provides a detailed view of the single actuator which provides an extended horizontal glass actuation and a reduced vertical glass actuation. A cross-section along the axis A-A and the axis G-G illustrating the extended and reduced angles of travel for mirror actuation.

Figure 41:
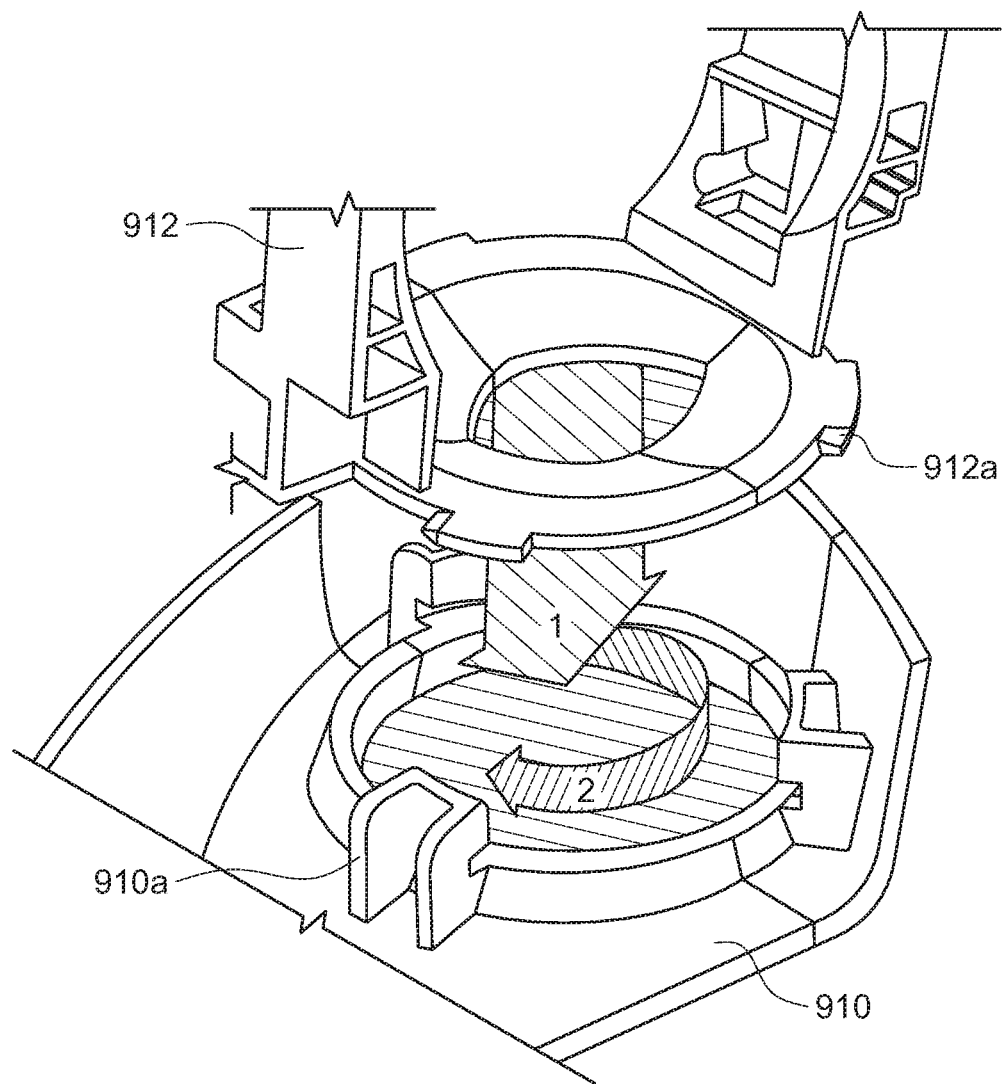
FIG. 41 is a diagram illustrating attachment of a motor cradle and a lower case of a rearview device via turn and snap connectivity.

FIG. 41 is a diagram illustrating attachment of a motor cradle 912 and a lower case 910 of a rearview device via turn and snap connectivity.

Referring to FIG. 41, a quick assembly rearview device is illustrated which includes a motor cradle 912 and a lower case 910. The motor cradle 912 is attached to the lower case 910 and configured to receive an actuator assembly which is described in more detail below. The attachment mechanism is a quick and easy attachment mechanism requiring a first step of placing the motor cradle 912 above and on top of the lower case 910 as shown by the large down arrow. A second step involves turning the motor cradle 912 so that the cradle projections 912a of the motor cradle 912 engage the tab vertical fixation lugs 910a of the lower case 910. This is referred to as turn and snap connectivity.

As assembly as described herein allows both the motor cradle 912 and the lower case 910 to be fixed and located around a central axis (pivot axis) and onto a common plane. This will reduce the tolerance stack back to the motor rotation center and components.

Figure 42:
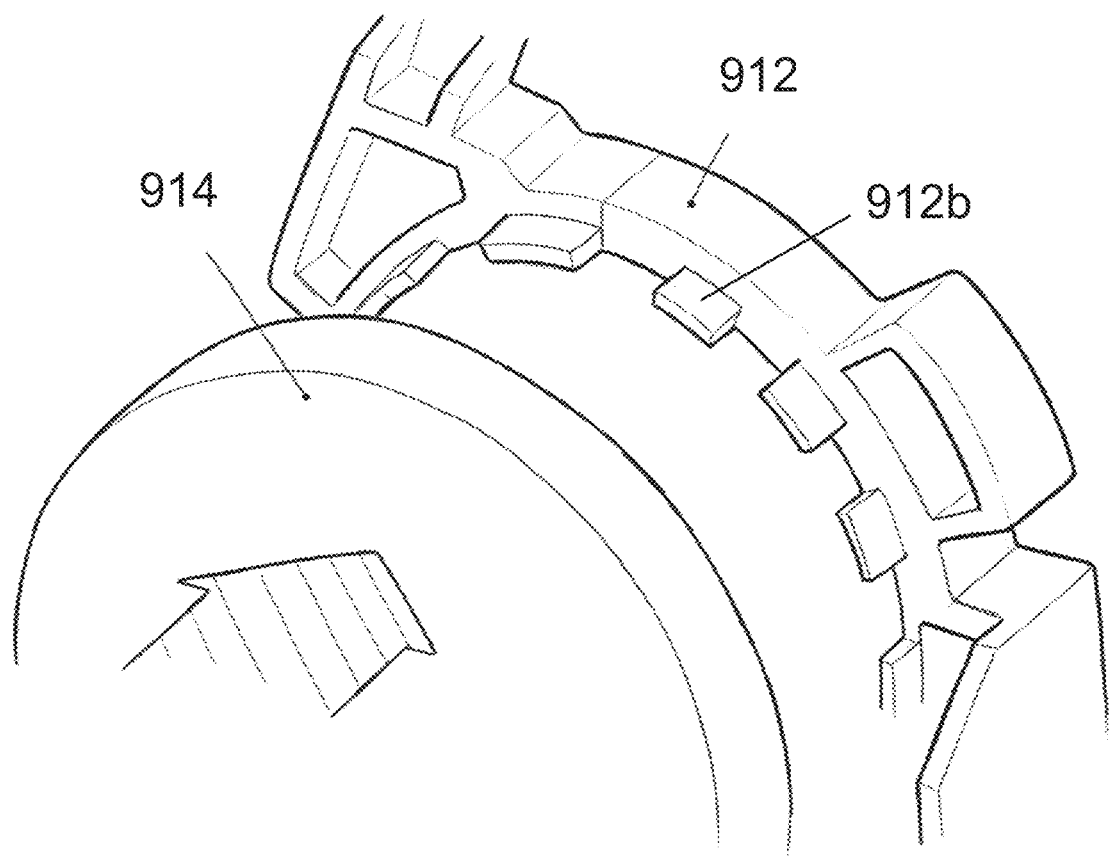
FIG. 42 is a diagram illustrating attachment of an actuator assembly and the motor cradle of the rearview device of FIG. 41.

FIG. 42 is a diagram illustrating attachment of an actuator assembly 914 and the motor cradle 912 of the rearview device of FIG. 41.

Referring to FIG. 42, the actuator assembly 914 is configured to actuate the movement of the rearview device in accordance with the examples described throughout this application. The actuator assembly 914 is configured to easily and quickly attach to the motor cradle 912 by pushing the actuator assembly 914 in a receiving portion of the motor cradle and engaging cradle teeth 912b into corresponding gaps between teeth (not shown) of the actuator assembly 914. Thus, the cradle teeth 912b fit in gaps between teeth (not shown) of the actuator assembly 914, and the teeth (not shown) of the actuator assembly 914 fit in between the gaps between the cradle teeth 912b.

Such an attachment prevents rotation of the actuator assembly 914 in the motor cradle 912. Small clips may also be used to keep the actuator assembly 914 fixed with respect to the motor cradle 912 before a cradle clamp 916, described below, is fitted.

Figure 43:
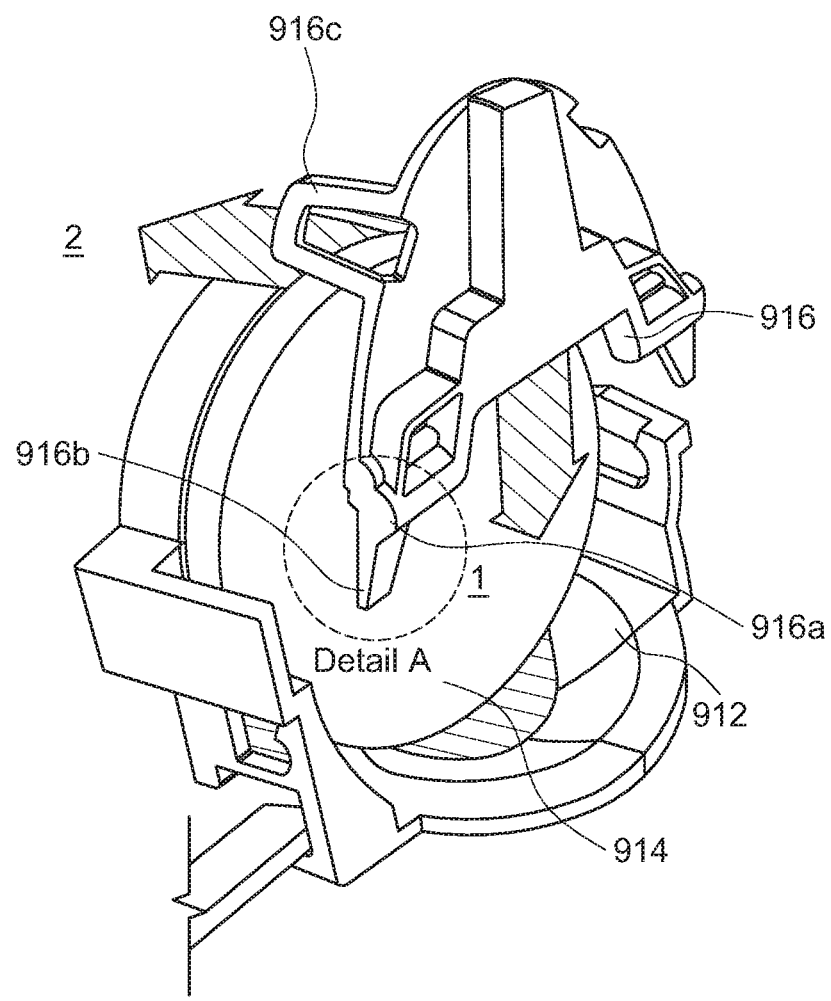
FIG. 43 is a diagram illustrating attachment of a cradle clamp, the motor cradle, and the actuator assembly of the rearview device of FIG. 41.

FIG. 43 is a diagram illustrating attachment of a cradle clamp 916, the motor cradle 912, and the actuator assembly 914 of the rearview device of FIG. 41.

Referring to FIG. 43, a cradle clamp 916 may be attached to the motor cradle 912 and actuator assembly 914 to clamp the actuator assembly 914 to the motor cradle 912. The cradle clamp 916 should first slide between the actuator assembly 914 and a front portion of the motor cradle 912, as illustrated by the down arrow in FIG. 43. This results in clamp prong 916b and clamp cam 916a engaging the front portion of motor cradle 912. This engagement is described in more detail with reference to FIG. 44. Subsequently, the cradle clamp 916 should be rotated towards the actuator assembly 914 until clamp clips 916c are engaged with corresponding retaining projections (not shown) on the motor cradle 912. This also causes rotation of the clamp prong 916b and clamp cam 916a until the clamp clips 916c are engaged and the actuatory assembly 914 is clamped to the motor cradle 912.

Figure 44:
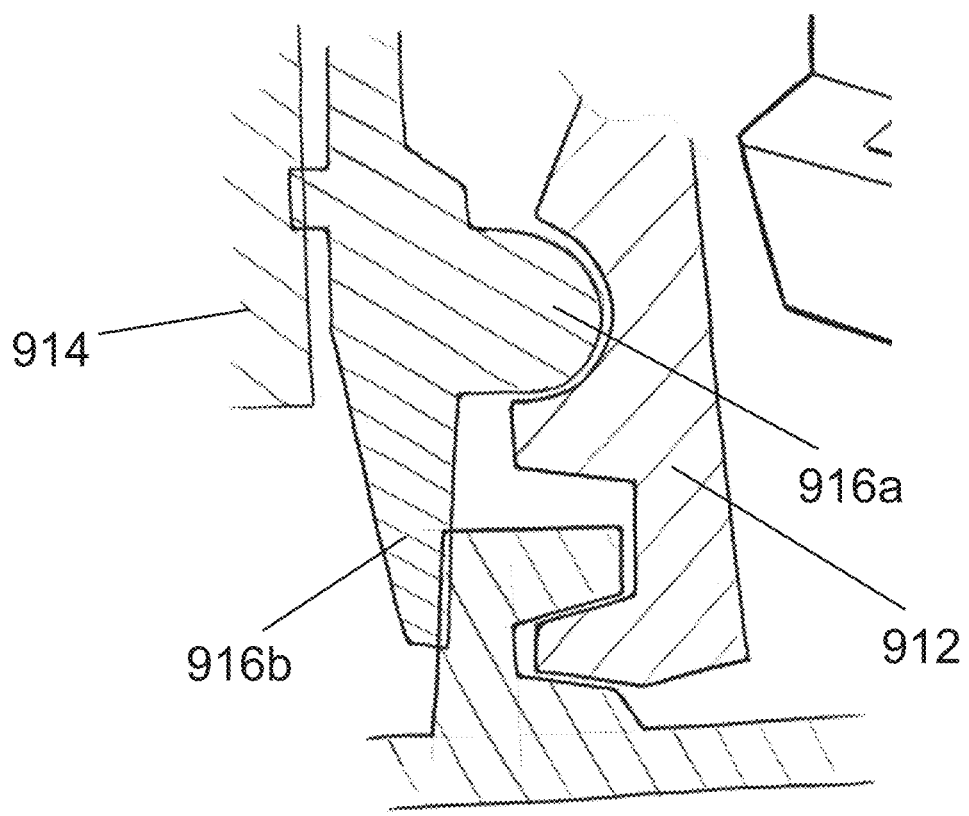
FIG. 44 is a diagram illustrating a cross-section of the cradle clamp at detail A of FIG. 43 after engagement with the motor cradle and the actuator assembly of the rearview device of FIG. 41.

FIG. 44 is a diagram illustrating a cross-section of the cradle clamp 916 at detail A of FIG. 43 after engagement with the motor cradle 912 and the actuator assembly 914 of the rearview device of FIG. 41.

Referring to FIG. 44, a detailed view of a cross-section of the clamp prong 916b and clamp cam 916a in the portion between the actuator assembly 914 and a front of the motor cradle 912 is shown. The clamp cam 916a may be a curved projection with a corresponding receiving portion on the motor cradle 912 to allow rotation of the cradle clamp 916. This allows rotating the cradle clamp 916 shut until the clamp clips 916c are clipped onto the motor cradle 912 from the top. Clamping pressure may be tuned to provide increased loading.

Figure 45:
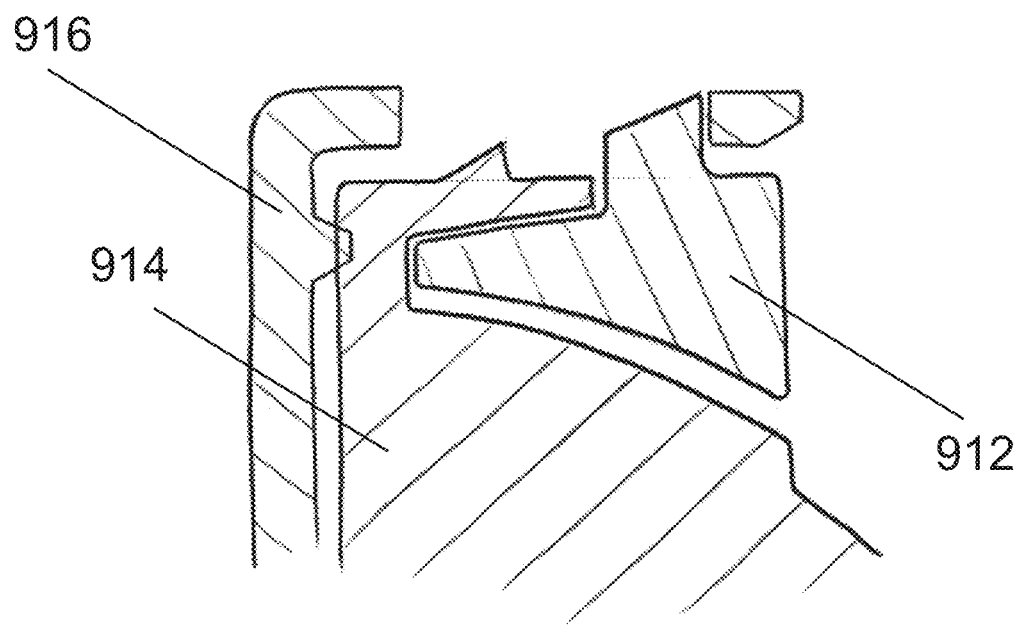
FIG. 45 is a diagram illustrating a cross-section of the cradle clamp, the motor cradle, and the actuator assembly of the rearview device of FIG. 41 after attachment.

FIG. 45 is a diagram illustrating a cross-section of the cradle clamp 916, the motor cradle 912, and the actuator assembly 914 of the rearview device of FIG. 41 after attachment.

After assembly of the cradle clamp 916, the motor cradle 912, and the actuator assembly 914, a cross-section illustrates that all three components of the rearview device are securely attached. Once the actuator assembly 914 is located and the cradle clamp 916 is engaged, the motor cradle 912 and an adapter ring of the actuator assembly 914 combine to improve stiffness, as illustrated in FIG. 45.

Figure 46:
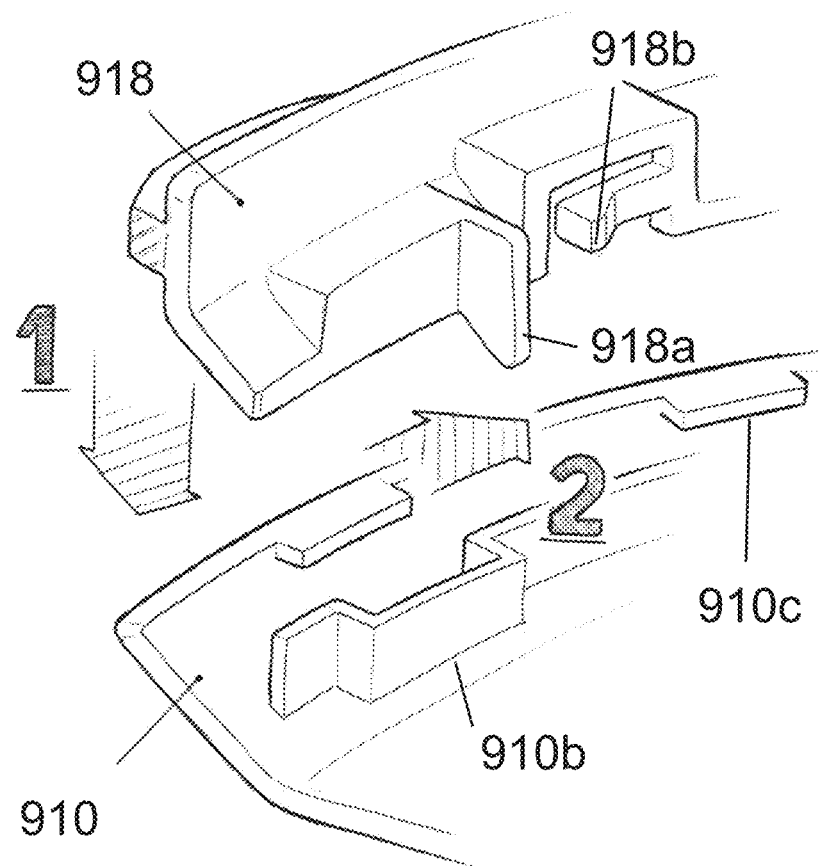
FIGS. 46 and 47 are diagrams illustrating attachment of a light module such as a side turn indicator (STI) unit with the lower case of the rearview device of FIG. 41.
Figure 47:
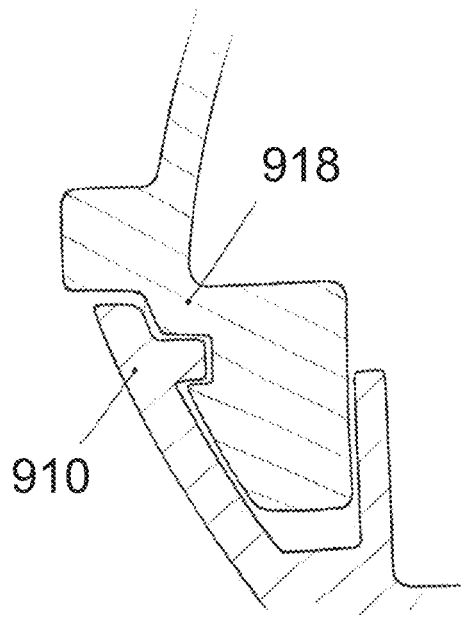

FIGS. 46 and 47 are diagrams illustrating attachment of a light module such as a side turn indicator (STI) module 918 with the lower case 910 of the rearview device of FIG. 41. Although an STI module 918 is described, any other light module for other functions may be used.

Referring to FIG. 46, the STI module 918 is first pressed down onto the lower case 910 of the rearview device. As a result, the STI tab 918a engages the tab receiving portion 910b of the lower case 910, and the vertical control tabs 910c are engaged. Once fully pressed down onto the lower case 910, the STI module 918 can be slid along a curved edge of the lower case 910 until one or more retaining clips 918b of the STI module 918 are engaged.

FIG. 47 illustrates that once slid into place, the STI module 918 is locked in position. The STI module 918 to lower case 910 gap includes a series of tabs along the lower case which allow locking of the STI module 918 in place. In other example, the cradle clamp 912 can be used to lock the STI module 918.

Different functions and devices can be incorporated into and/or controlled with the help of rearview devices including especially also cameras.

Especially useful are functions and devices to enhance, extend and/or sustain the functionality of the rearview device during normal or extreme conditions. This may include heating and/or cooling means, cleaning means such as wipers, liquid and/or gaseous sprays, actuator means for moving the rearview device or parts of it, such as for example a display, a camera system and/or parts of a camera system, including for example lenses, filters, light sources, adaptive optics like deformable mirrors, sensors and/or mirrors, and/or actuator means for inducing movement of other objects, for example parts of the vehicle and/or objects surrounding the vehicle. Furthermore it can include linear tracks and/or rotating wheels, like for example a filter wheel, for exchanging optical elements, including for example lenses, mirrors, light sources, sensors, adaptive optics like deformable mirrors and/or filters.

Prominent examples for functions and devices incorporated into and/or controlled with the help of rearview devices include also illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rearview devices may include for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An example for a rearview device including an illumination device fulfilling the brake light functions is disclosed in German patent application No. 102012108488, filed on Sep. 11, 2012 for REARVIEW ASSEMBLY FOR MOTOR VEHICLE and hereby incorporated herein by reference. A light guidance unit for an illumination device used in a back vision system is disclosed in German patent application No. 102012104529, filed on May 25, 2012 for LIGHT GUIDANCE UNIT which is hereby incorporated herein by reference. An illumination device for a rearview device is disclosed in German patent application No. 102012107833, filed on Aug. 24, 2012 for ILLUMINATION DEVICE AND REARVIEW DEVICE which is hereby incorporated herein by reference. A lighting device for a back-vision unit is disclosed in German patent application No. 102012107834, filed on Aug. 24, 2012 for LIGHTING DEVICE AND BACK-VISION UNIT which is hereby incorporated herein by reference. A housing and display device of a rearview device is disclosed in European patent No. 2738043, filed on Dec. 3, 2012 for HOUSING AND DISPLAY DEVICE which is hereby incorporated herein by reference. An optical light guide for a vehicle lighting unit is disclosed in European patent No. 2947378, filed on May 22, 2014 for OPTICAL LIGHT GUIDE FOR A VEHICLE LIGHTING UNIT which is hereby incorporated herein by reference. A display device of a rearview device of a vehicle is disclosed in International patent application No. 2015/173695, filed on May 7, 2015 for DISPLAY DEVICE, REAR VIEW DEVICE AND MOTOR VEHICLE and claiming priority to European patent application No. 2944866, filed on May 12, 2014 for OPTICAL UNIT, DISPLAY DEVICE, REAR VIEW DEVICE AND MOTOR VEHICLE INCLUDING THE SAME which are all hereby incorporated herein by reference. Further a light guiding device for an illumination device, in particular for a motor vehicle or a display device, in a rearview device of a motor vehicle is disclosed in European patent application No. 3045944, filed on Jan. 19, 2015 for LIGHT GUIDING DEVICE which is hereby incorporated herein by reference. Still further a light guiding device for an illumination device, especially for a motor vehicle or an indicator device in a rearview device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE which are all hereby incorporated herein by reference. In addition, an illumination device, particularly for a rear-view device of a motor vehicle and a method for producing the same are disclosed in International patent application No. 2016/147154, filed on Mar. 18, 2016 for ILLUMINATION DEVICE AND METHOD FOR PRODUCING AN ILLUMINATION DEVICE and claiming priority to German patent application No. 102015104163, filed on Mar. 19, 2015 for ILLUMINATION DEVICE AND METHOD FOR PRODUCING AN ILLUMINATION DEVICE which are all hereby incorporated herein by reference. An improved rear-view device for a motor vehicle which includes an electronic device is disclosed in U.S. patent application Ser. No. 15/256,532, filed on Sep. 3, 2016 for ELECTRONIC DEVICE AND REAR-VIEW DEVICE and claiming priority to European patent application No. 3139711, filed on Sep. 3, 2015 for ELECTRONIC DEVICE AND REAR VIEW DEVICE which are all hereby incorporated herein by reference. A lighting device for a rearview device or a footwell device of a vehicle, including at least one luminous means is disclosed in German patent application No. 102015115555, filed on Sep. 9, 2015 for ILLUMINATION DEVICE, REAR VIEW DEVICE, FOOTWELL DEVICE AND VEHICLE which is hereby incorporated herein by reference. A light module for a light assembly of an exterior rear view device is disclosed in European patent application No. 3138734, filed on Sep. 3, 2015 for LIGHT MODULE, LIGHT ASSEMBLY AND REAR VIEW DEVICE FOR A VEHICLE which is hereby incorporated herein by reference. A lighting device for a vehicle component, in particular for a rearview device of a motor vehicle, including a logo lamp and a deflection mirror are disclosed in European patent application No. 3144183, filed on Sep. 13, 2016 for LIGHTING DEVICE, VEHICLE COMPONENT AND VEHICLE and claiming priority to German utility patent application No. 202015104894, filed on Sep. 15, 2015 for LIGHTING DEVICE, VEHICLE COMPONENT AND VEHICLE which are all hereby incorporated herein by reference.

A camera module can include in particular a plurality of different optical elements, including a.o. a variety of sensors and light sources, as well as housing parts.

The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3, filed on May 3, 2016 for CLEANING SYSTEM FOR A CAMERA and U.S. patent application Ser. No. 15/281,780, filed Sep. 30, 2016 for TELESCOPING REARVIEW ASSEMBLY WITH CAMERA AND LENS WIPING SYSTEM, which are all hereby incorporated herein by reference.

The camera can include for example CCD or CMOS or light field sensors, as for example described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which are all hereby incorporated herein by reference. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference.

The optical elements can be molded or formed from any type of glass or any other suitable material. Glass is here used in the meaning of a non-crystalline amorphous solid showing a glass transition when heated towards the liquid state. It includes for example the group of polymeric glasses, metallic glasses, silica glasses, but any other suitable material showing the glass transition can also be used. The glass can be either in a flat, wedge, rectangular, cylindrical, spherical, conical, elliptical, and/or circular shape, as described for example in German patent application No. 102016108247.3, and German patent application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, which are all hereby incorporated herein by reference, or have a shape according to different needs or lens types. As non-limiting examples camera modules can be equipped with lenses, like a wide-angle or fish-eye lens suitable to provide peripheral images, as described in U.S. patent application Ser. Nos. 15/281,780, and 13/090,127, filed on Apr. 19, 2011 for REAR VIEW MIRROR SIMULATION, now U.S. Pat. No. 9,238,434, a Fresnel lens or micro lenses as described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed Sep. 8, 2010 for OPTIMAL LIGHT COUPLING FOR REAR VIEW DEVICES, which are all hereby incorporated herein by reference. Another type of optical elements know to be used in camera modules are optical fibers, especially in form of fiber bundles and preferably in form of fiber bundles having an optical head, as described for example in U.S. patent application Ser. No. 09/771,140. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference.

The optical elements can be transparent as described for example in U.S. Pat. No. 8,031,224, German patent application No. 102016108247.3, and U.S. patent application Ser. No. 13/242,829, filed Sep. 23, 2011 for CAMERA ARRANGEMENT AND DOOR HANDLE FOR MOTOR VEHICLE, which are all hereby incorporated herein by reference. But the optical elements can also be semitransparent, as described in U.S. patent application Ser. Nos. 09/771,140 and 13/090,127, which are all hereby incorporated herein by reference. Still further, the optical elements can be completely or partially coated with different type of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference. Preferably the optical elements are made of a scratch-proof material as described for example in German patent application No. 102016108247.3, which is hereby incorporated herein by reference. The optical elements can have uncoupling structures at certain locations of the optical elements, and an optical film, for example an extrusion film, and a molded coating can be applied as described in German patent application No. 102011103200, which is hereby incorporated herein by reference. A coating to spectrally and stress control is described in U.S. patent application Ser. No. 15/124,310, which is hereby incorporated herein by reference. Different filters can be integrated into the optical elements such as for example gray filters or polarization filters, described in U.S. patent application Ser. No. 14/809,509, filed Jul. 27, 2015 for APPARATUS FOR LIGHT INTENSITY ADJUSTMENT, which is hereby incorporated herein by reference.

Electrochromic substrates, polymer electrolytes and other charge conducting medias may be used for the optical elements based on the descriptions of European patent application No. 08103179.1, filed on Mar. 31, 2008 for PROCESS FOR PRODUCING ELECTROCHROMIC SUBSTRATES AND ELECTROCHROMIC ARTICLES MADE THEREFROM, European patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, which are all hereby incorporated herein by reference.

The camera module can also be equipped with apparatuses for light intensity adjustment as described for example in U.S. patent application Ser. No. 14/809,509 and light level intensifier tubes as described in U.S. patent application Ser. No. 09/771,140, which are all hereby incorporated herein by reference. The electrochromic substrates and devices used in European patent application No. 08103179.1, European patent No. 2202826, U.S. Pat. Nos. 7,999,992 and 8,537,451, which are all hereby incorporated herein by reference, can also be used for this purpose as well as a transflector to transmit or reflect light based on a corresponding input signal, as described in German patent application No. 102016106126.3, filed on Apr. 4, 2016 for IMAGING SYSTEM, which is hereby incorporated herein by reference.

The camera module or a cover adapted to the camera module can be moved using different actuators, drives and/or a flexible track, as for example described in German application No. 102016108247.3 and U.S. patent application Ser. No. 15/281,780, which are all hereby incorporated herein by reference.

Still further, the camera module can also include cleaning elements to clean the optical element facing outwards and being exposed to the environment. The cleaning element can for example include wipers, brushes, lips, nozzles, fans and similar elements as are described in European patent application No. 14165197.6, filed Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, German patent application No. 102016108247.3, European patent application No. 13163677.1, filed Apr. 15, 2013 for LENS WIPER, European patent application No. 15173201.3, filed Jun. 22, 2015 for LENS CLEANING WITH FLEXIBLE ACTUATOR and European patent No. 1673260, filed on Oct. 14, 2003 for CLEANING DEVICE which are all hereby incorporated herein by reference. The cleaning devices are not limited in composition, and may for example include any fabric, elastomeric, sponge, brush, or combination of these. Special wiper elements including wiper arms, wiper blades, wiping cloth, wiping tissue and combinations thereof are described in European patent application No. 14165197.6, which is hereby incorporated herein by reference. A wiper element may for example be controlled according to the method described in European patent application No. 130164250.6, filed Apr. 18, 2013 for METHOD FOR CONTROLLING A WIPER DEVICE, which is hereby incorporated herein by reference. A reservoir for holding a cleaning liquid as described in European patent application No. 14165197.6, which is hereby incorporated herein by reference. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, which are all hereby incorporated herein by reference.

Also light sources can be installed or integrated into the camera module to increase the visibility of surrounding objects, measure distances and directions and detect dirt, such as described in U.S. Pat. No. 8,031,224, U.S. patent application No. 62/470,658, filed on Mar. 13, 2017, 2016 for LIGHT EMITTING MIRROR BEZEL and U.S. patent application Ser. No. 09/771,140, which are all hereby incorporated herein by reference.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0, filed on Apr. 22, 2016 for HEATING DEVICE FOR A CAMERA LENS, which are all hereby incorporated herein by reference.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference.

In another example, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0, which is hereby incorporated herein by reference.

A conductor track can be embedded within plastic parts of the camera module as described in European patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, which are all hereby incorporated herein by reference.

The camera module can include a power harvesting system as described for example in European patent application No. 09171683.7, filed on Sep. 29, 2009 for SELF SUSTAINING REAR VIEW MIRROR, which is hereby incorporated herein by reference.

A fault detection system for electric consumers as described in U.S. Pat. No. 8,487,633 filed on Jan. 14, 2010 for FAULT DETECTION OF ELECTRIC CONSUMERS IN MOTOR VEHICLES, which is hereby incorporated herein by reference, can be used to detect failure of the camera module.

Different types of fixings can be used to fix the camera module to the vehicle or other components, such as for example the snap-fit connection described in European patent No. 2233360, filed on Mar. 27, 2009 for SNAP FIT CONNECTION IN A REAR VIEW MIRROR, which is hereby incorporated herein by reference.

Different control means and analyzing devices can be used, such as the computation units described in U.S. patent application Ser. No. 13/090,127, German patent application No. 102016106126.3, German patent application No. 102011053999, European patent No. 2146325, filed on July 16, for Recording Device for Receiving, Processing and Storing Image Files in a Vehicle and Method, and U.S. Pat. No. 8,849,104, filed on Jul. 16, 2008 for RECORDING DEVICE AND METHOD FOR CAPTURING AND PROCESSING IMAGE DATA IN A VEHICLE, which are all hereby incorporated herein by reference. In addition, HDR (high dynamical range) technology can be used according to U.S. patent application Ser. No. 14/830,406, filed on Aug. 19, 2015 for REAR VIEW DEVICE FOR A MOTOR and published as US 20150358590, which is hereby incorporated herein by reference.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 2 head section
4 housing section
6 lid section
8 direction of driving
10 electronic unit
12 hollow area
14 rear view means
16 flat portion
18 edge portions
20 coupling portion
22 sealing means
24 O-ring
26 printed circuit board
28 lamp
30 first housing part
32 opening
34 light window
36 lighting unit
38 optical element
40 housing seal
42 second housing part
61 base assembly
62 camera
63 base cap
64 base cover
65 base frame
66 camera connector
67 gasket
70 articulation assembly
71a upper cradle
71b lower cradle
72 base frame
73 camera
74 camera cradle
75 bezel
76a upper casing element
76b lower casing element
77 base assembly
78 lens
80 glass
81a cassette bezel
81b cassette bezel
81c cassette bezel
83a upper casing element
83b upper casing element
83c upper casing element
84a lower casing element
84b lower casing element
84a lower casing element
85a upper cradle
85b upper cradle
85c upper cradle
85c upper cradle
86a lower cradle
86b lower cradle
86c lower cradle
90 articulation assembly
91 upper cradle
92 lower cradle
93 base frame
94 pivot ball joint
95 centre of rotation
100 lid section
100' lid section
100" lid section
100'" lid section
120 bezel section
120' bezel section
120" bezel section
130' undercut
130" undercut
140' first rear view means section
140" first rear view means section
140'" first rear view means section
160' second rear view means section
160" second rear view means section
160'" second rear view means section
180 rim section
200" groove
210' step
220" groove
230" groove
300 first rear view means
300' rear view means
300'" rear view means
400 second rear view means
400' rear view means
501 rear view means
502 base
502' fastening element
503 mirror support
503' mirror support
504 outer contour
505 foot cover
506 housing cap
507 housing frame
508 axis of rotation
510 mirror head
511 mirror glass
512 rotary table
514 opening
515 glass adjusting drive 516 mirror glass carrier plate
517 connecting plate
518 mount
530 triangular plate
531 webs
532 disengagement line
533 central recess
534 space
601 rear view arrangement
602 base
603 head
604 viewing means
605 articulated joint
606 articulated joint
607 articulated joint
608 first joint axis
609 second joint axis
610 first electromotive adjusting drive
611 second electromotive adjusting drive
612 control device
613 ball joint
614 flashing light
615 imaginary axis
616 imaginary axis
617 door brace
618 vehicle surface
700 head assembly
701 articulation assembly
702 bezel
703 glass
704 actuator
705 actuator
706 memory module
707 pivot ball joint
708 case frame
709 lower casing element
800 mirror glass
801 mirror bezel
802 blind spot monitor
803 side turn indicator
804 BSM-SDI module
805 connecting rib
900A motor jack
900B motor jack
910 lower case
910a vertical fixation lugs
910b tab receiving portion
910c vertical control tabs
912 motor cradle
912a cradle projections
912b cradle teeth
914 actuator assembly
916 cradle clamp
916a clamp cam
916b clamp prong
916c clamp clip
918 side turn indicator (STI) module
918a STI tab
918b STI clip
1000 base assembly
1100 attachment part
1200 foot
1300 spherical seat
1400 carrier part
1500 cable exist
2000 frame means
2100 support part
2200 spherical seat
2200a extension
2200b extension
2300 fixation part
2400 cable exit
2500 spherical seat
2500a extension
2600 shoulder
2700 screw hole
2800 rim
3000 articulation assembly
3200 fixed part
3400 moveable part
3500 attachment means
3600 control system
4000 casing
4100 upper casing element
4200 lower casing element
4400 attachment part
4400a part ring
4400b cut-out
4500 attachment boss
4600 base part
4700 spherical seat
4800 spherical seat
4900 bezel
5000 camera
6000 head assembly

What is claimed is:

1. A rearview device for a vehicle, comprising:
a moveable head assembly;
an actuator assembly comprising a fixed part and a moveable part, the moveable part being attached to the head assembly;
a motor cradle configured to attach the actuator assembly to the moveable head assembly; and
a light module;
a cradle clamp configured to clamp the actuator assembly to the motor cradle, the lower case, and the light module,
wherein the moveable head assembly comprises a lower case and the actuator assembly is attached to the lower case of the moveable head assembly using the motor cradle, and
wherein the cradle clamp comprises
one or more clamp cams configured to be received by a space formed between the actuator assembly and the motor cradle;
one or more clamp prongs configured to be received by a space formed between the actuator assemble and the motor cradle; and
one or more clamp clips configured to clips on to corresponding features of the motor cradle.

2. The rearview device of claim 1, wherein the lower case comprises one or more vertical fixation lugs, the motor cradle comprises one or more cradle projections, and the one or more vertical fixation lugs are configured to engage the one or more cradle projections in response to the motor cradle being attached to the lower case.

3. The rearview device of claim 1, wherein the motor cradle is configured to attach to the lower case using a turn and snap or hook and snap connectivity.

4. The rearview device of claim 1, wherein the motor cradle further comprises one or more cradle teeth and the one or more cradle teeth of the motor cradle are configured to engage one or more corresponding gaps formed in a ring of the actuator assembly.

5. The rearview device of claim 1, wherein the cradle clamp comprises
one or more case locking prongs configured to lock the actuator assembly to the lower case; and
one or more light module locking prongs configured lock the actuator assembly to the light module.

6. The rearview device of claim 1, wherein the light module is attached to the lower case.

7. The rearview device of claim 6, wherein the light module comprises one or more tabs and one or more clips,
the lower case comprises one or more tab receiving portions, and
the one or more tab receiving portions of the lower case are configured to receive the one or more tabs of the light module.

8. The rearview device of claim 6, wherein the light module is configured to lock and attach to the lower case by pressing the light module on the lower case and sliding the light module with respect to the lower case.

9. A rearview device for a vehicle, comprising:
a moveable head assembly;
an actuator assembly comprising a fixed part and a moveable part, the moveable part being attached to the head assembly;
a motor cradle configured to attach the actuator assembly to the moveable head assembly; and
a light module which is attached to the lower case,
wherein the moveable head assembly comprises a lower case and the actuator assembly is attached to the lower case of the moveable head assembly using the motor cradle, and
wherein the light module is configured to lock and attach to the lower case by pressing the light module on the lower case and sliding the light module with respect to the lower case, and
wherein the cradle clamp comprises
one or more clamp cams configured to be received by a space formed between the actuator assemble and the motor cradle,
one or more clamp prongs configured to be received by a space formed between the actuator assembly and the motor cradle; and
one or more clamp clips configured to clip on to corresponding features of the motor cradle.

10. The rearview device of claim 9, wherein the cradle clamp comprises
one or more case locking prongs configured to lock the actuator assembly to the lower case; and
one or more light module locking prongs configured lock the actuator assembly to the light module.

11. A rearview device for a vehicle, comprising:
a moveable head assembly;
an actuator assembly comprising a fixed part and a moveable part, the moveable part being attached to the head assembly;
a motor cradle configured to attach the actuator assembly to the moveable head assembly; and
a cradle clamp configured to clamp the actuator assembly to the motor cradle, the lower case, and a light module, the cradle clamp comprising:
one or more clamp cams configured to be received by a space formed between the actuator assembly and the motor cradle;
one or more clamp prongs configured to be received by a space formed between the actuator assembly and the motor cradle;
one or more clamp clips configured to clip on to corresponding features of the motor cradle;
one or more case locking prongs configured to lock the actuator assembly to the lower case; and
one or more light module locking prongs configured to lock the actuator assembly to the light module,
wherein the moveable head assembly comprises a lower case and the actuator assembly is attached to the lower case of the moveable head assembly using the motor cradle.

* * * * *